United States Patent
Migita et al.

(10) Patent No.: US 6,807,623 B2
(45) Date of Patent: Oct. 19, 2004

(54) DATA PROCESSING CONTROL SYSTEM, CONTROLLER, DATA PROCESSING CONTROL METHOD, PROGRAM, AND MEDIUM

(75) Inventors: Manabu Migita, Neyagawa (JP); Junji Nishikawa, Osaka (JP); Ichiro Okabayashi, Takatsuki (JP); Shinji Furuya, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 542 days.

(21) Appl. No.: 09/916,050

(22) Filed: Jul. 26, 2001

(65) Prior Publication Data

US 2002/0013915 A1 Jan. 31, 2002

(30) Foreign Application Priority Data

Jul. 27, 2000 (JP) ..................................... 2000-227162
Sep. 21, 2000 (JP) ..................................... 2000-286708

(51) Int. Cl.$^7$ ............................. G06F 11/00; G06F 9/00
(52) U.S. Cl. ..................................... 712/214; 712/215
(58) Field of Search ................................ 712/214, 215, 712/22, 32; 711/114; 714/6, 10, 11

(56) References Cited

U.S. PATENT DOCUMENTS

| | | | | |
|---|---|---|---|---|
| 5,623,595 A | | 4/1997 | Bailey | |
| 5,819,056 A | * | 10/1998 | Favor | 712/204 |
| 5,826,073 A | * | 10/1998 | Ben-Meir et al. | 712/226 |
| 6,199,179 B1 | * | 3/2001 | Kauffman et al. | 714/26 |
| 6,237,079 B1 | * | 5/2001 | Stoney | 712/34 |

* cited by examiner

Primary Examiner—Henry W. H. Tsai
(74) Attorney, Agent, or Firm—RatnerPrestia

(57) ABSTRACT

A data processing control system has a controller wherein the controller (1) sends every received instruction to the plurality of data processing devices until the number of instructions being executed or waiting to be executed by the plurality of data processing devices reaches a predetermined number, (2) does not send any received instructions to the plurality of data processing devices but holds the received instructions in a queue once the number of instructions being executed or waiting to be executed by the plurality of data processing devices has reached the predetermined number, and (3) when the number of instructions being executed or waiting to be executed by the plurality of data processing devices has become zero by completing the execution thereof, starts sending the queued instructions in sequence to the plurality of data processing devices, and continues to send the queued instructions or every newly received instruction to the plurality of data processing devices until the number of instructions being executed or waiting to be executed by the plurality of data processing devices reaches the predetermined number.

21 Claims, 37 Drawing Sheets

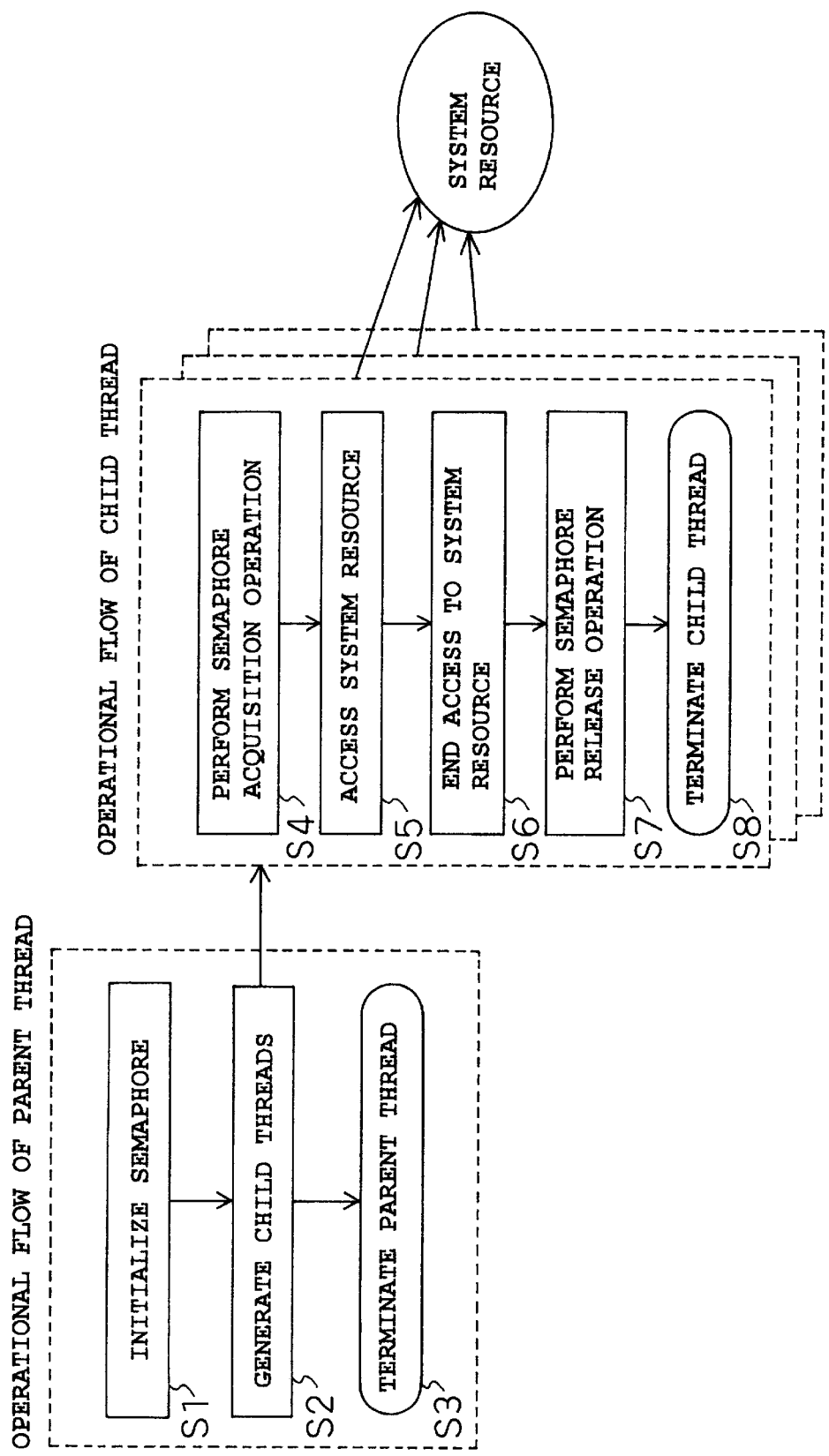

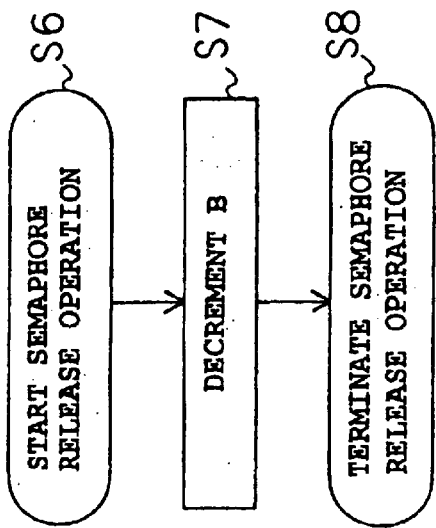
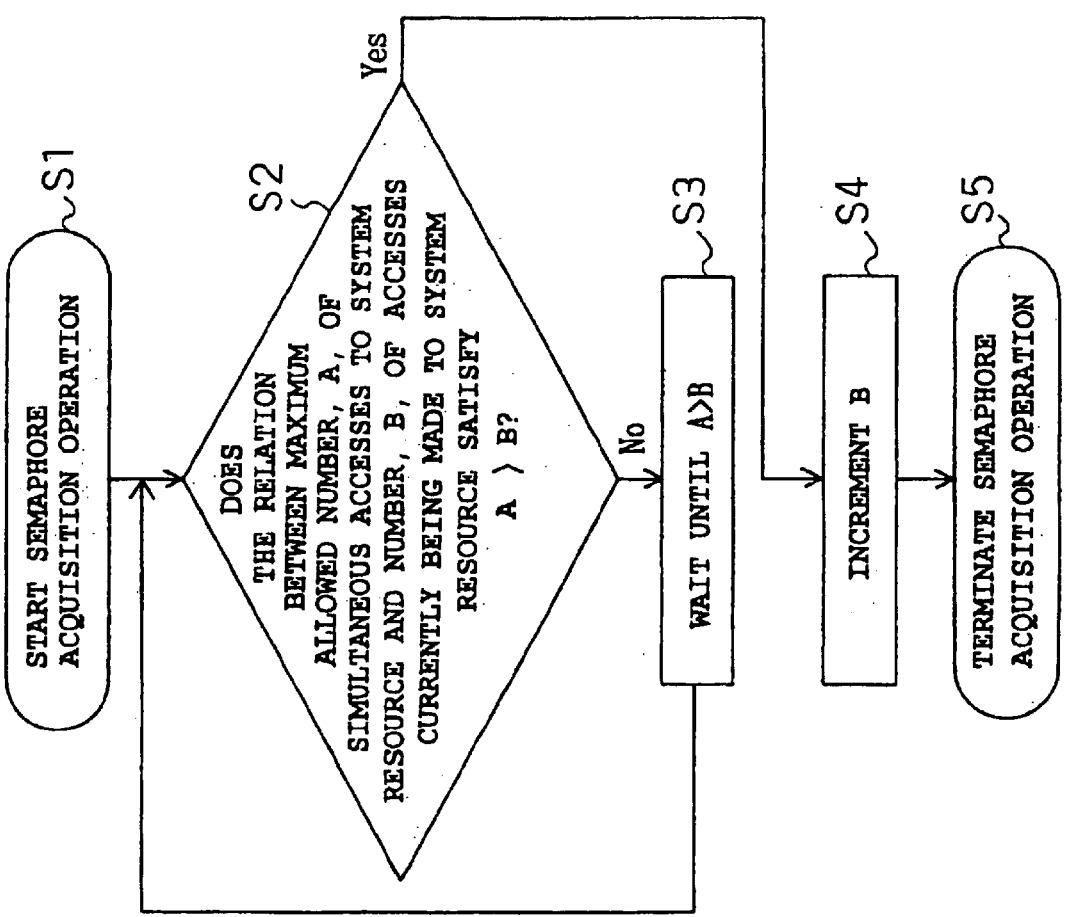
Fig. 11(b) PRIOR ART
Fig. 11(a) PRIOR ART

Fig. 17

SEMAPHORE VARIABLE'S STRUCTURE

| AREA FOR STORING MAXIMUM ALLOWED NUMBER, A, OF SIMULTANEOUS ACCESSES TO DATA STORAGE DEVICES 21, ..., 2n |
| --- |
| AREA FOR STORING NUMBER, B, OF ACCESSES CURRENTLY BEING MADE TO DATA STORAGE DEVICES 21, ..., 2n |
| AREA FOR STORING ACCESS INHIBIT FLAG C FOR DATA STORAGE DEVICES 21, ..., 2n |

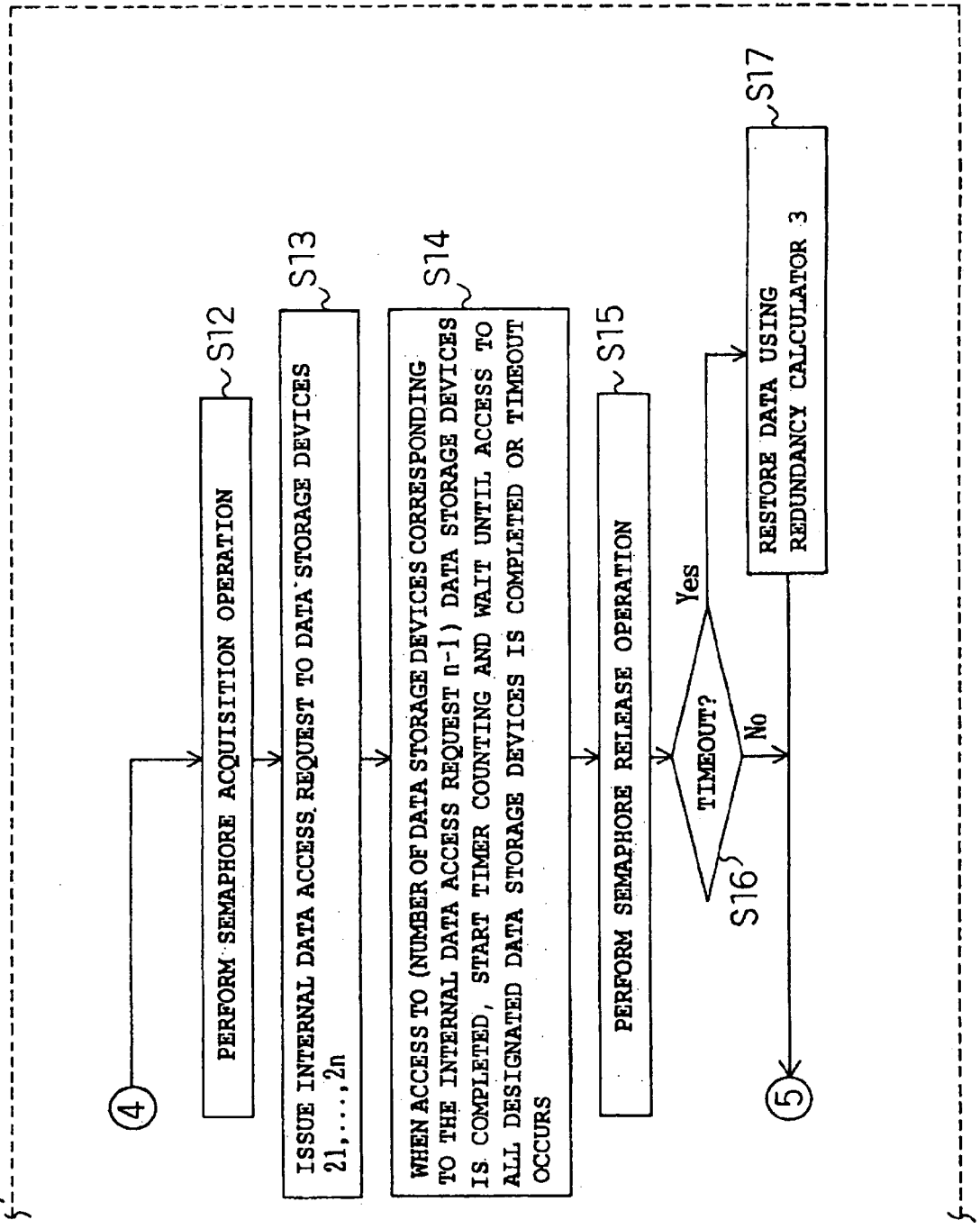
Fig. 26 (b) PRIOR ART

Fig. 28 PRIOR ART
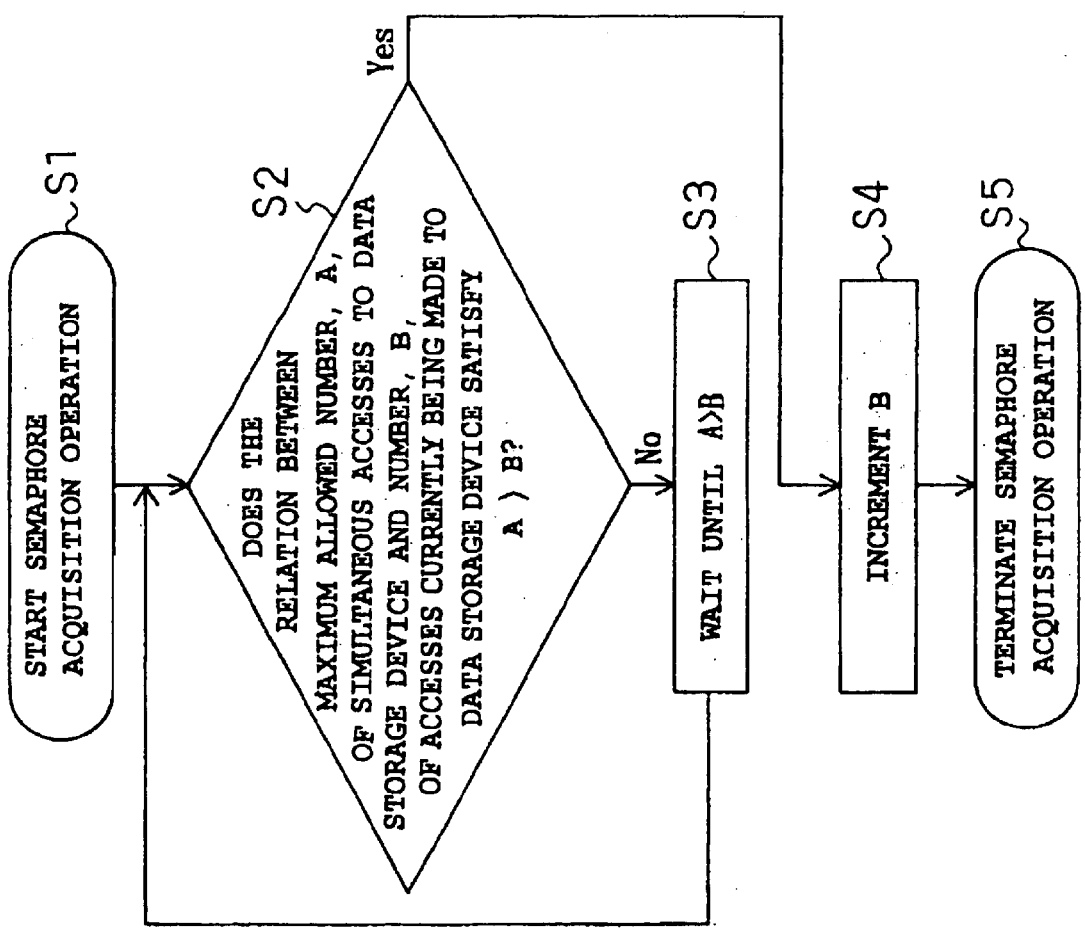
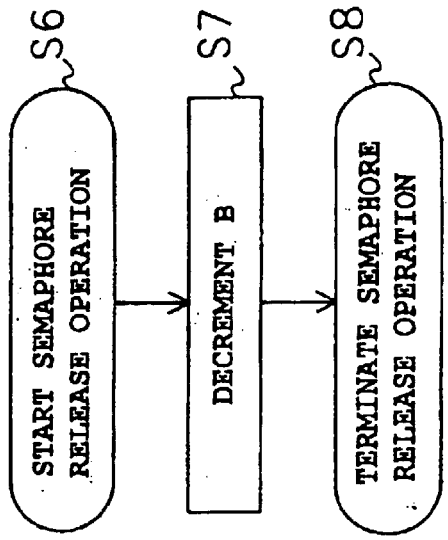

DATA PROCESSING CONTROL SYSTEM, CONTROLLER, DATA PROCESSING CONTROL METHOD, PROGRAM, AND MEDIUM

BACKGROUND OF THE INVENTION

1. Field of the Invention

The present invention relates to a data processing control system, a controller, a data processing control method, a program, and a medium.

2. Description of the Related Art (A) With recent advances in multimedia technology, continuous media data such as digitized moving image data, voice data, etc. have increasingly come to be stored on hard disks and other data storage devices (random access devices) Because of huge data sizes of continuous media data, it is becoming common to configure a plurality of random access devices into an array and make the array appear to the system as a single large capacity virtual device.

With this trend in mind, the configuration and operation of a prior art data storage array system will be described with reference to FIGS. 11(a), 11(b), and 13. FIG. 11(a) is a flow chart of a semaphore acquisition operation according to the prior art, and FIG. 11(b) is a flow chart of a semaphore release operation. FIG. 13 is a diagram showing the configuration of the prior art data storage array system.

As shown in FIG. 13, the prior art data storage array system comprises a controller 1001' and data storage devices 1021', 1022', . . . , 102n'.

When a data access request is received from an external host device 1003' (see FIG. 13), the controller 1001' generates a child thread to control access to the data storage devices 1021', . . . , 102n'. The data storage array system can thus accept a plurality of data access requests simultaneously (command queuing). With command queuing, the data storage array system can perform data access and command issuing operations in overlapping fashion on the data storage devices, and data access performance can thus be enhanced.

In the child thread, the data access request issued by the external host device 1003' is divided into a plurality of requests to issue to the data storage devices 10211, 102n'. When all the data access requests to the data storage devices 1021', . . . , 102n' are completed, the child thread sends a completion notification to the external host device 1003'.

In the child thread generated by the controller 1001', access control is performed using a synchronization mechanism called a semaphore in order to prevent excessive load from being applied to the data storage devices 1021', . . . , 102n'. To facilitate understanding, the semaphore will be briefly explain below.

A semaphore is a synchronization mechanism used to control access rights to system resources. In operation, access to the system is controlled by performing a semaphore acquisition operation just before accessing a system resource and by performing a semaphore release operation upon completing the access to the system resource.

Here, let A denote the maximum allowed number of simultaneous accesses to a system resource and B the maximum number of accesses currently being made to the system resource. Then, as shown in the process of FIG. 11(a), the semaphore acquisition operation is started (S1), and if A>B, the semaphore is successfully acquired, granting the request for access to the system resource, after which B is incremented and the semaphore acquisition operation is terminated (S2, S4, and S5). On the other hand, if A≦B, the semaphore acquisition operation waits until B becomes smaller than A (S3). In the process shown in FIG. 11(b), the semaphore release operation is started (S6), and then, B is decremented and the semaphore release operation is terminated (S7 and S8).

In this way, in the prior art data storage array system, the controller 1001' controls access rights to the data storage devices 1021', . . . , 102n' (system resources) by using semaphores in order to prevent excessive load from being applied to the data storage devices 1021', . . . , 102n'.

(B) With recent advances in multimedia technology, continuous media data such as digitized moving image data, voice data, etc. have increasingly come to be stored on hard disks and other data storage devices (random access devices). Because of huge data sizes of continuous media data, it is becoming common to configure a plurality of random access devices into an array and make the array appear to the system as a single large capacity virtual device. To implement this, RAID (Redundant Array of Inexpensive Disks) technology, which improves reliability by managing data storage by providing redundancy to continuous media data stored in an array of random access devices, has been attracting attention.

The configuration and operation of a prior art data storage array system of RAID 3 will be described below. FIG. 25 is a diagram showing the configuration of a data storage array system of RAID 3 according to the prior art. FIGS. 26(a) and 26(b) are flow charts illustrating the operation of a controller 1 in the prior art data storage array system of RAID 3. FIG. 28 is a flow chart of semaphore acquisition and release operations according to the prior art.

As shown in FIG. 25, the prior art data storage array system of RAID 3 comprises the controller 1, data storage devices 21 to 2n and a redundancy calculator 3. The controller 1 receives a data access request issued by an external host device 4, converts it into internal access requests, issues them to the data storage devices 21 to 2n, and sends a completion notification to the external host device 4 when the internal data access requests to the data storage devices 21 to 2n are completed or when a timeout has occurred. The data storage devices 21 to 2n are devices for storing data. When the data access request issued by the external host device 4 is a write request, the redundancy calculator 3 generates redundant data using the write data from the external host device 4 before issuing the internal data access requests to the data storage devices 21 to 2n; on the other hand, when it is a read request, the redundancy calculator 3 restores write data using redundant data if the write data is lost because of the occurrence of a timeout. The external host device 4 is a device that issues data access requests.

Next, the operations performed by the controller 1 in response to an external data access request will be described in detail with reference to FIGS. 26(a) and 26(b). The following description is given based on the premise that the controller 1 is operating in a multi-threaded programming (multi-processing programming) environment.

The controller 1 waits for a data access request from the external host device 4 (S1). When a data access request is received from the external host device 4, the controller 1 generates a child thread to process the data access request (S2). The data storage array system can thus accept a plurality of data access requests simultaneously (command queuing). In the generated child thread, the data access request is converted into n internal data access requests (S3).

In the case of RAID 3, the conversion to the internal data access requests (S3) is performed so that the access data designated by the data access request is divided across (n−1) disks and the redundant data generated based on the access data is stored on the remaining one disk. FIG. 27 shows how the conversion to the internal data access requests is accomplished. After S3, the controller 1 examines whether the data access request received from the external host device 4 is a read request or a write request (S4).

If the data access request received from the external host device 4 is a write request, the controller 1, using the redundancy calculator 3, generates redundant data by duplicating the write data (S5). Next, the controller 1 acquires access rights to the data storage devices 21 to 2n by performing the semaphore acquisition operation (S6). The controller 1, which has acquired the access rights to the data storage devices 21 to 2n in S6, issues the internal data access requests to the data storage devices 21 to 2n (S7); then, after starting timer counting from the time the internal access requests to (n−1) data storage devices are completed, when all the internal access requests are completed or a timeout error occurs (S8) the controller 1 performs the semaphore release operation (S9) to release the access rights acquired to the data storage devices 21 to 2n. Finally, the controller 1 issues a data access completion notification to the external host device 4 (S10) and terminates the child thread (S11).

On the other hand, if, in S4, the data access request received from the external host device 4 is a read request, the controller 1 acquires access rights to the data storage devices 21 to 2n by performing the semaphore acquisition operation (S12). The controller 1, which has acquired the access rights to the data storage devices 21 to 2n in S12, issues the internal data access requests to the data storage devices 21 to 2n (S13); then, after starting timer counting from the time the internal access requests to (n−1) data storage devices have been completed, when all the internal access requests are completed or a timeout error occurs (S14) the controller 1 performs the semaphore release operation (S15) to release the access rights acquired to the data storage devices 21 to 2n. Next, the controller 1 determines whether a timeout error or a read error has occurred in S14 (S16). If a timeout error or a read error has occurred, the controller 1 restores the data lost due to the error by using the redundancy calculator 3 (S17). Finally, the controller 1 issues a data access completion notification to the external host device 4 (S10) and terminates the child thread (S11).

In the above-described operational flow, the controller 1 performs access control by using a synchronization mechanism called a semaphore, as in the case of Section (A) first described, in order to prevent excessive load from being applied to the data storage devices 21 to 2n, thereby preventing the resources from becoming unavailable for internal processing due to excessive external load.

Here, let A denote the maximum allowed number of simultaneous accesses to a system resource and B the maximum number of accesses currently being made to the system resource. Then, as shown in FIG. 28, the semaphore acquisition operation is started (S1), and if A>B, the semaphore is successfully acquired, granting the request for access the system resource, after which B is incremented and the semaphore acquisition operation is terminated (S2, S4, and S5). On the other hand, if A≦B, the semaphore acquisition operation waits until B becomes smaller than A (S3) Further, as shown in FIG. 28, the semaphore release operation is started (S6), and then, B is decremented and the semaphore release operation is terminated (S7 and S8).

In this way, in the prior art data storage array system of RAID 3, the controller 1 controls access rights to the data storage devices 21 to 2n as system resources by using semaphores in order to prevent excessive load from being applied to the data storage devices 21 to 2n.

However, as can be seen from the explanation given in Section (A), when issuing data access requests simultaneously to a plurality of data storage devices (random access devices) such as hard disk drives and controlling them for synchronized operation, if data access requests to the plurality of data storage devices are placed in a command queue and remain in the queue, variations in data access time among the data storage devices will accumulate with time.

The inventor has concluded that the variations in data access time among the data storage devices occur mainly due to the following three factors.

(Factor 1) Even when the data storage devices are in factory-adjusted conditions (in normally operating conditions) variations occur in data access time because of the seek time, latency, alternate sector processing, retry processing, etc. that differ from device to device.

(Factor 2) The performance of the bus connecting between the controller 1001' and the data storage devices and the bus priorities assigned to the respective storage devices contribute to causing variations in data access time among the data storage devices.

(Factor 3) As the performance of the mechanism and storage medium degrades due to the aging of each data storage device, the seek time, latency, alternate sector processing, retry processing, etc. increase, causing variations in data access time among the data storage devices.

While the phenomena described in (Factor 1) and (Factor 2) occur even in a normally operating data storage array system, the phenomenon described in (Factor 3) is a kind of phenomenon that may cause trouble in the future.

The following description is given dealing with the phenomenon described in (Factor 3).

As the operating hours of a data storage device increase, the storage medium degrades and the number of data access retries and the number of bad sectors tend to increase, increasing the data access time.

When handling continuous media data such as moving image or voice data, the access time of each data storage device must not exceed the time limit required of the continuous media data.

If the time limit is exceeded, a frame or frames will be dropped in the case of a moving image; therefore, the controller 1001' must constantly monitor the data access time of each data storage device, and must immediately notify the external host device 1003' when any one of the data storage devices is detected exhibiting a data access delay of more than a predetermined time (a timeout situation) with respect to the other normally operating data storage devices.

The timeout interval is an important factor that determines the data access response performance and failure prediction accuracy of the data storage array system, and if a shorter timeout interval can be set, the accuracy of the failure prediction performed based on the detection of the data access response can be enhanced.

However, since the variations in data access time accumulate because of the Factor 1 and Factor 2 even in the case of normally operating data storage devices, the timeout interval cannot be shortened.

The longer the timeout interval, the lower is the accuracy in detecting a data storage array system that is about to fail and thus exhibiting a delay in data access time, which is not desirable when storing continuous media data such as moving image data; after all, it is of utmost importance to solve the problem of data access delays resulting from the accumulation of the variations in data access time caused by the Factor 1 and Factor 2.

Referring to FIGS. 12(a) and 12(b), the data access delay Tdelay occurring as a result of the accumulation of the variations in data access time will be described in further detail below. FIGS. 12(a) and 12(b) are operational chart diagrams illustrating data write operations in the data storage array system. FIG. 12(b) is the continuation of FIG. 12(a), and the right-hand edge of part 12(a) indicates the state at the same instant of time as the left-hand edge of part 12(b).

Here, the external host device 1003' issues a data access request in such a manner that a constant load will be maintained in the data storage array system; that is, the external host device 1003' issues a data access request to the controller 1001' only when the condition A>B is satisfied, where A is the maximum allowed number of simultaneous accesses to the data storage devices 1021', . . . , 102n', and B is the number of data accesses currently being made to the data storage devices 1021', . . . , 102n'.

To simplify the explanation, A and n are both set to 3, and it is assumed that the data storage device 1022' has a longer data access time than the other data storage devices 1021' and 1023'. This delay in data access time is assumed to be within an allowable range as a data storage device.

As can be seen from FIG. 12, the external host device 1003' (FIG. 13) issues a data access request the instant that the condition A>B is satisfied. Accordingly, at any instant in time, data access requests are being issued to the data storage devices 1021', 1022', 1023', and the inventor has noticed that the delay in the data access time of the data storage device 1022' accumulates with time.

More specifically, this data access time delay reaches a steady state partway through the process as shown in FIG. 12 and, in the steady state condition, the data access time delay Tdelay of the data storage device 1022' is expressed as $$\text{Tdelay} = Td \times A - Tn - Tr - Tx$$

where Td is the data access time of the data storage device 1022', Tn is the data access time of each of the data storage devices 1021' and 1023', Tr is the time at which the data access request is issued from the controller 1001', and Tx is the data transfer time between the external host device 1003' and the controller 1001'.

Accordingly, even when provisions are made not to apply excessive load to the data storage array system by using a semaphore, the data access time of the data storage array system increases because of the data access time delay Tdelay. As a result, the timeout interval in the data storage array system must be set equal to Tdelay at the shortest.

If the timeout interval is set shorter than Tdelay, a situation occurs where the data storage array system reports a timeout error to the external host device 1003' when the data storage device 1022' is operating normally. Conversely, if the timeout interval is set longer than Tdelay, then if any one of the other data storage devices 1021' and 1023' falls into a condition about to fail, causing a delay in the data access time, the faulty condition cannot be detected until after a timeout occurs; this, as a matter of course, results in degradation of the failure prediction performance and causes inconvenience in handling continuous media data.

On the other hand, as can be seen from the explanation given in Section (B), when it is desired to synchronize the operation among data storage devices (random access devices) such as hard disk drives as in the prior art data storage array system of RAID 3, if a situation continues where data access requests are incessantly issued to the data storage devices, variations in data access time among the data storage devices will accumulate with time. This is because variations are caused in the data access time due to such factors as the latency, alternate sector processing, and retry processing that differ from device to device. Even if the data access performance is the same among the data storage devices, since the performance of the bus connecting between the controller 1 and each data storage device differs, the variations in data access time among the data storage devices accumulate with time.

Consider, for example, the case where the data storage devices are connected to the controller 1 via a SCSI bus. In this case, the priority for the use of the SCSI bus is determined by the ID assigned to each data storage device such that the access time increases with decreasing priority, and this phenomenon causes variations in the access time among the data storage devices. Further, in the case of a conventional bus (such as a PCI bus) where each connected device has the same bus priority, variations in the data access time occur due to differences between the data transfer timing within each data storage device and the data transfer timing on the bus connected to it. Thus, variations in the data access time become a factor that hampers the synchronized operations of the plurality of data storage devices.

The feature that RAID offers when handling continuous media data such as moving image or voice data is that to ensure real time processing of continuous media data, the data to be output can be restored using redundancy if the last one data storage device does not respond within a predefined time interval (the timeout interval) after the data access requests to the (n−1) data storage devices have been completed. The setting of the timeout value is very important in order to ensure the real time processing. It goes without saying that the shorter the real time interval can be set, the better result can be obtained. This is because in the case of a moving image, for example, the possibility of frame dropping increases as the timeout value increases.

The data access time delay Tdelay that increases the data access time as described above will be explained in more detail with reference to FIG. 29. FIG. 29 is an operational chart diagram illustrating data write operations in the prior art data storage array system of RAID 3; the lower part of the diagram is the continuation of the upper part, and the right-hand edge of the upper part of FIG. 29 indicates the state at the same instant of time as the lower part.

Here, the external host device 4 issues a data access request in such a manner that a constant load will be maintained in the data storage array system. That is, the external host device 4 issues a data access request to the controller 1 only when the condition A>B is satisfied, where A is the maximum allowed number of simultaneous accesses to the data storage devices 21 to 2n, and B is the number of data accesses currently being made to the data storage devices 21 to 2n.

To simplify the explanation, A and n are both set to 3, and it is assumed that the data storage device 22 has a longer data access time than the other data storage devices 21 and 23. As can be seen from FIG. 29, the external host device 4 issues a data access request the instant that the condition A>B is satisfied. Accordingly, at any instant in time, data access requests are being issued to the data storage devices 21 to 23, and it is seen that the delay in the data access time of the data storage device 22 accumulates with time.

More specifically, this data access time delay reaches a steady state partway through the process as shown in FIG. 29 and, in the steady state condition, the data access time delay Tdelay of the data storage device 22 is expressed as $$Tdelay = Td \times A - Tn - Tr - Tx$$

where Tn is the data access time of each of the data storage devices 21 and 23, Td is the data access time of the data storage device 22, Tr is the time at which the data access request is issued from the controller 1, and Tx is the data transfer time between the external host device 4 and the controller 1.

Accordingly, even when provisions are made not to apply excessive load to the data storage array system by using a semaphore, the data access time of the data storage array system increases because of the data access time delay Tdelay, and synchronized operations of the plurality of data storage devices become difficult to implement. Furthermore, since the timeout value needs to be set equal to Tdelay at the shortest, the prior art data storage array system of RAID 3 is not suitable for handling continuous media data such as moving image data.

SUMMARY OF THE INVENTION

In view of the above-described problems of the prior art, it is an object of the present invention to provide a data processing control system capable of appropriately handling continuous media data, etc., and a controller, a data processing control method, a program, and a medium for use with such a data processing control system.

One aspect of the present invention is a data processing control system comprising a controller for receiving an instruction directing a data processing operation, and for causing said received instruction to be executed across a plurality of data processing devices, wherein said controller (1) sends every received instruction to said plurality of data processing devices until the number of instructions being executed or waiting to be executed by said plurality of data processing devices reaches a predetermined number, (2) does not send any received instructions to said plurality of data processing devices but holds said received instructions in a queue once the number of instructions being executed or waiting to be executed by said plurality of data processing devices has reached said predetermined number, and (3) when the number of instructions being executed or waiting to be executed by said plurality of data processing devices has become zero by completing the execution thereof, starts sending said queued instructions in sequence to said plurality of data processing devices, and continues to send said queued instructions or every newly received instruction to said plurality of data processing devices until the number of instructions being executed or waiting to be executed by said plurality of data processing devices reaches said predetermined number.

Another aspect of the present invention is a data processing control system comprising a controller for receiving an instruction directing a data processing operation, and for causing said received to be executed across a plurality of data processing devices, wherein said controller (1) detects a difference in execution end timing of said instruction between designated two of said plurality of data processing devices across which said instruction is executed, (2) sends every received instruction to said plurality of data processing devices until said detected difference exceeds a prescribed limit, (3) does not send any received instructions to said plurality of data processing devices but holds said received instructions in a queue once said difference has exceeded said prescribed limit, (4) starts sending said queued instructions in sequence to said plurality of data processing devices when the number of instructions being executed or waiting to be executed by said plurality of data processing devices has become zero by completing the execution thereof, and (5) detects said difference again and continues to send said queued instructions or every newly received instruction to said plurality of data processing devices until said detected difference exceeds said prescribed limit.

Still another aspect of the present invention is a data processing control system comprising a controller for receiving an instruction directing a data processing operation, and for causing said received instruction to be executed across a plurality of data processing devices, wherein said controller (1) detects a difference in execution end timing of said instruction between designated two of said plurality of data processing devices across which said instruction is executed, (2) sends every received instruction to said plurality of data processing devices until the number of instructions being executed or waiting to be executed by said plurality of data processing devices reaches a predetermined number, (3) does not send any received instructions to said plurality of data processing devices but holds said received instructions in a queue once the number of instructions being executed or waiting to be executed by said plurality of data processing devices has reached said predetermined number, and (4) when the number of instructions being executed or waiting to be executed by said plurality of data processing devices has become zero by completing the execution thereof, starts sending said queued instructions in sequence to said plurality of data processing devices, and continues to send said queued instructions or every newly received instruction to said plurality of data processing devices until the number of instructions being executed or waiting to be executed by said plurality of data processing devices reaches said predetermined number, and wherein said predetermined number is varied according to said detected difference.

Yet still another aspect of the present invention is data processing control system, wherein said data processing operation is a data read or data write operation.

Still yet another aspect of the present invention is data processing control system, wherein said data processing operation is a data write operation for writing data containing redundant data which is used to restore data based on successfully readout data when data cannot be read correctly on any one of said plurality of data processing devices.

A further aspect of the present invention is a data processing control system, wherein said data processing operation is a data read operation for reading data containing redundant data which is used to restore data based on successfully readout data when data cannot be read correctly on any one of said plurality of data processing devices.

A still further aspect of the present invention is a data processing control system, wherein said data processing operation is a data write operation for writing data redundantly so that data can be restored in case data cannot be read correctly on any one of said plurality of data processing devices, and wherein said plurality of data processing devices are arranged in two or more pairs for writing data redundantly.

A yet further aspect of the present invention is a data processing control system, wherein when said difference is detected again, and the number of said queued or newly received instructions issued until said detected difference exceeds said prescribed limit becomes smaller than a predetermined threshold value, said controller determines that a data access delay error has occurred on one of said plurality of data processing devices.

A still yet further aspect of the present invention is a data processing control system, wherein when said predetermined number which is varied according to said detected difference becomes smaller than a predetermined threshold value, said controller determines that a data access delay error has occurred on one of said plurality of data processing devices.

An additional aspect of the present invention is a controller for receiving an instruction directing a data processing operation, and for causing said received instruction to be executed across a plurality of data processing devices, wherein said controller (1) sends every received instruction to said plurality of data processing devices until the number of instructions being executed or waiting to be executed by said plurality of data processing devices reaches a predetermined number, (2) does not send any received instructions to said plurality of data processing devices but holds said received instructions in a queue once the number of instructions being executed or waiting to be executed by said plurality of data processing devices has reached said predetermined number, and (3) when the number of instructions being executed or waiting to be executed by said plurality of data processing devices has become zero by completing the execution thereof, starts sending said queued instructions in sequence to said plurality of data processing devices, and continues to send said queued instructions or every newly received instruction to said plurality of data processing devices until the number of instructions being executed or waiting to be executed by said plurality of data processing devices reaches said predetermined number.

A still additional aspect of the present invention is a controller for receiving an instruction directing a data processing operation, and for causing said received instruction to be executed across a plurality of data processing devices, wherein said controller (1) detects a difference in execution end timing of said instruction between designated two of said plurality of data processing devices across which said instruction is executed, (2) sends every received instruction to said plurality of data processing devices until said detected difference exceeds a prescribed limit, (3) does not send any received instructions to said plurality of data processing devices but holds said received instructions in a queue once said difference has exceeded said prescribed limit, (4) starts sending said queued instructions in sequence to said plurality of data processing devices when the number of instructions being executed or waiting to be executed by said plurality of data processing devices has become zero by completing the execution thereof, and (5) detects said difference again and continues to send said queued instructions or every newly received instruction to said plurality of data processing devices until said detected difference exceeds said prescribed limit.

A yet additional aspect of the present invention is controller for receiving an instruction directing a data processing operation, and for causing said received instruction to be executed across a plurality of data processing devices, wherein said controller (1) detects a difference in execution end timing of said instruction between designated two of said plurality of data processing devices across which said instruction is executed, (2) sends every received instruction to said plurality of data processing devices until the number of instructions being executed or waiting to be executed by said plurality of data processing devices reaches a predetermined number, (3) does not send any received instructions to said plurality of data processing devices but holds said received instructions in a queue once the number of instructions being executed or waiting to be executed by said plurality of data processing devices has reached said predetermined number, and (4) when the number of instructions being executed or waiting to be executed by said plurality of data processing devices has become zero by completing the execution thereof, starts sending said queued instructions in sequence to said plurality of data processing devices, and continues to send said queued instructions or every newly received instruction to said plurality of data processing devices until the number of instructions being executed or waiting to be executed by said plurality of data processing devices reaches said predetermined number, and wherein said predetermined number is varied according to said detected difference.

A still yet additional aspect of the present invention is a data processing control method for receiving an instruction directing a data processing operation, and for causing said received instruction to be executed across a plurality of data processing devices, comprising the step of:

sending every received instruction to said plurality of data processing devices until the number of instructions being executed or waiting to be executed by said plurality of data processing devices reaches a predetermined number;

not sending any received instructions to said plurality of data processing devices but holding said received instructions in a queue once the number of instructions being executed or waiting to be executed by said plurality of data processing devices has reached said predetermined number; and starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number.

A supplementary aspect of the present invention is a data processing control method for receiving an instruction directing a data processing operation, and for causing said received instruction to be executed across a plurality of data processing devices, comprising the steps of:

detecting a difference in execution end timing of said instruction between designated two of said plurality of data processing devices across which said instruction is executed;

sending every received instruction to said plurality of data processing devices until said detected difference exceeds a prescribed limit;

not sending any received instructions to said plurality of data processing devices but holding said received instructions in a queue once said difference has exceeded said prescribed limit;

starting sending said queued instructions in sequence to said plurality of data processing devices when the number of instructions being executed or waiting to be executed by said plurality of data processing devices has become zero by completing the execution thereof; and detecting said difference again and continuing to send said queued instructions or every newly received instruction to said plurality of data processing devices until said detected difference exceeds said prescribed limit.

A still supplementary aspect of the present invention is a data processing control method for receiving an instruction directing a data processing operation, and for causing said received instruction to be executed across a plurality of data processing devices, comprising the steps of:

detecting a difference in execution end timing of said instruction between designated two of said plurality of data processing devices across which said instruction is executed;

sending every received instruction to said plurality of data processing devices until the number of instructions being executed or waiting to be executed by said plurality of data processing devices reaches a predetermined number;

not sending any received instructions to said plurality of data processing devices but holding said received instructions in a queue once the number of instructions being executed or waiting to be executed by said plurality of data processing devices has reached said predetermined number;

starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number; and varying said predetermined number according to said detected difference.

A yet supplementary aspect of the present invention is a program for causing a computer in the data processing control method to carry out all or part of the steps of: sending every received instruction to said plurality of data processing devices until the number of instructions being executed or waiting to be executed by said plurality of data processing devices reaches a predetermined number; not sending any received instructions to said plurality of data processing devices but holding said received instructions in a queue once the number of instructions being executed or waiting to be executed by said plurality of data processing devices has reached said predetermined number; and starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number.

A still yet supplementary aspect of the present invention is a program for causing a computer in the data processing control method to carry out all or part of the steps of: detecting a difference in execution end timing of said instruction between designated two of said plural of data processing devices across which said instruction is executed; sending every received instruction to said plurality of data processing devices until said detected difference exceeds a prescribed limit; not sending any received instructions to said plurality of data processing devices but holding said received instructions in a queue once said difference has exceeded said prescribed limit; starting sending said queued instructions in sequence to said plurality of data processing devices when the number of instructions being executed or waiting to be executed by said plurality of data processing devices has become zero by completing the execution thereof; and detecting said difference again and continuing to send said queued instructions or every newly received instruction to said plurality of data processing devices until said detected difference exceeds said prescribed limit.

Another aspect of the present invention is a program for causing a computer in the data processing control method to carry out all or part of the steps of: detecting a difference in execution end timing of said instruction between designated two of said plurality of data processing devices across which said instruction is executed; sending every received instruction to said plurality of data processing devices until the number of instructions being executed or waiting to be executed by said plurality of data processing devices reaches a predetermined number; not sending any received instructions to said plurality of data processing devices but holding said received instructions in a queue once the number of instructions being executed or waiting to be executed by said plurality of data processing devices has reached said predetermined number; starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number; and varying said predetermined number according to said detected difference.

Still another aspect of the present invention is a computer readable medium having a program recorded thereon for causing a computer in the data processing control method to carry out all or part of the steps of: sending every received instruction to said plurality of data processing devices until the number of instructions being executed or waiting to be executed by said plurality of data processing devices reaches a predetermined number; not sending any received instructions to said plurality of data processing devices but holding said received instructions in a queue once the number of instructions being executed or waiting to be executed by said plurality of data processing devices has reached said predetermined number; and starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number.

Yet still another aspect of the present invention is computer readable medium having a program recorded thereon for causing a computer in the data processing control method to carry out all or part of the steps of: detecting a difference in execution end timing of said instruction between designated two of said plurality of data processing devices across which said instruction is executed; sending every received instruction to said plurality of data processing devices until said detected difference exceeds a described limit; not sending any received instructions to said plurality of data processing devices but holding said received instructions in a queue once said difference has exceeded said prescribed limit; starting sending said queued instructions in sequence to said plurality of data processing devices when the number of instructions being executed or waiting to be execute by said plurality of data processing devices has become zero by completing the execution thereof; and detecting said difference again and continuing to send said queued instructions or every newly received instruction to said plurality of data processing devices until said detected difference exceed said prescribed limit.

Still yet another aspect of the present invention is computer readable medium having a program recorded thereon for causing a computer in the data processing control method to carry out all or part of the steps of: detecting a difference in execution end timing of said instruction between designated two of said plurality of data processing devices across which said instruction is executed; sending every received instruction to said plurality of data processing devices until the number of instructions being executed or waiting to be executed by said plurality of data processing devices reaches a predetermined number; not sending any received instructions to said plurality of data processing devices but holding said received instructions in a queue once the number of instructions being executed or waiting to be executed by said plurality of data processing devices has reached said predetermined number; starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number; and varying said predetermined number according to said detected difference.

BRIEF DESCRIPTION OF THE DRAWINGS

FIG. 2 is an explanatory diagram illustrating a configuration where system resources are shared for use according to a first embodiment of the present invention;

FIGS. 11(a) and 11(b) are operational flow diagrams illustrating a semaphore acquisition operation and a semaphore release operation, respectively, according to the prior art;

FIG. 17 is an explanatory diagram of a semaphore variable's structure according to the fourth embodiment;

FIGS. 26(a) and 26(b) are operational flow diagrams of a controller 1 according to the prior art;

FIG. 28 is a diagram illustrating an external to internal data access conversion process in the data storage array system according to the prior art;

DESCRIPTION OF THE REFERENCE NUMERALS

1001. CONTROLLER
1021, . . . , 102*n*. DATA STORAGE DEVICE
1003. EXTERNAL HOST DEVICE

DESCRIPTION OF THE PREFERRED EMBODIMENTS

The preferred embodiments of the present invention will be described below with reference to drawings.

Embodiment 1

First, the configuration and operation of a data storage array system (data processing control system) will be described by referring primarily to FIGS. 1 to 3 and 10. While describing the operation of the data storage array system of this embodiment, one embodiment of a data processing control method according to the present invention will also be described.

Figure 10:
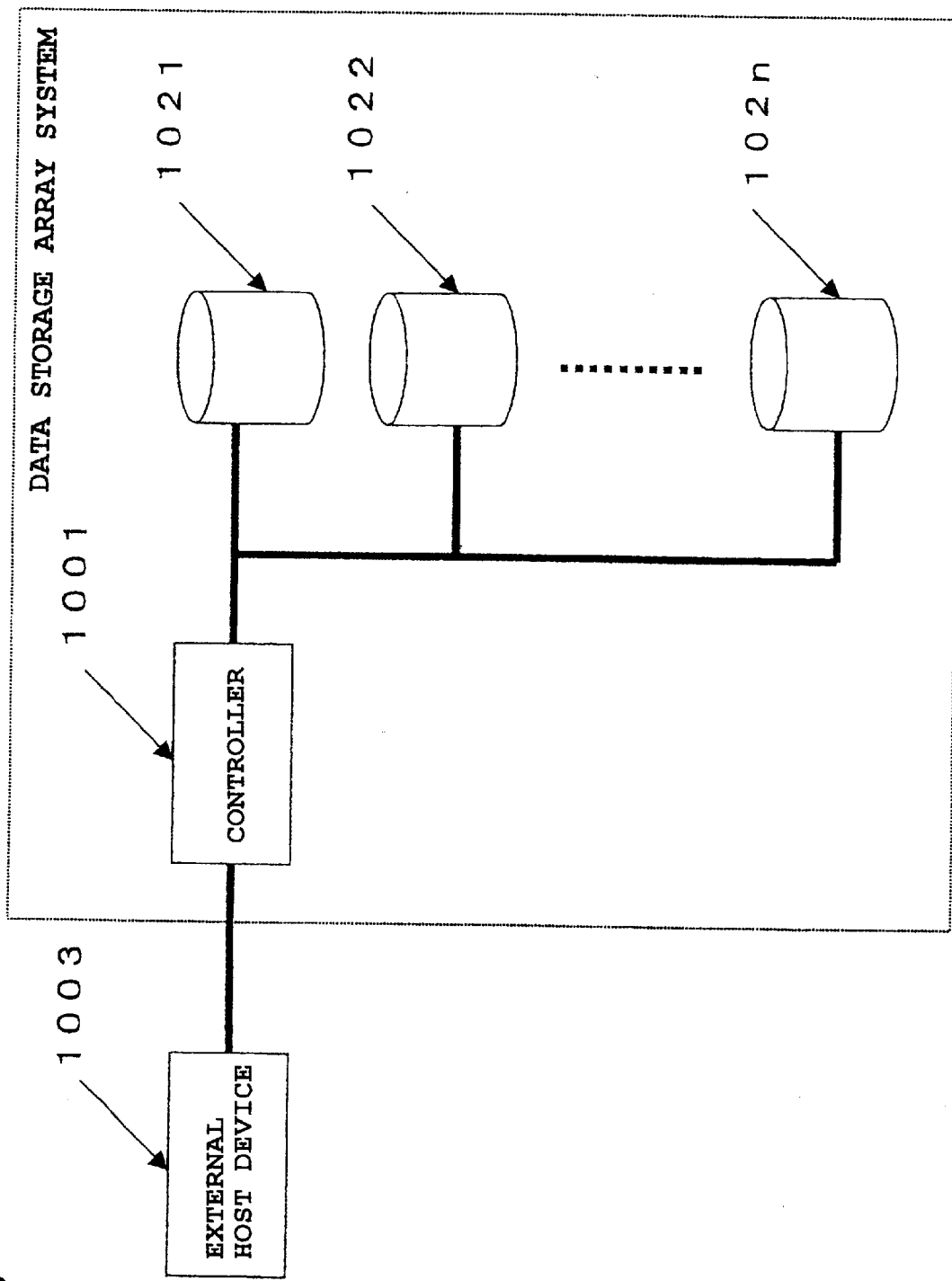
FIG. 10 is a diagram showing the configuration of the data storage array system according to the embodiment of the present invention.
Figure 12A:
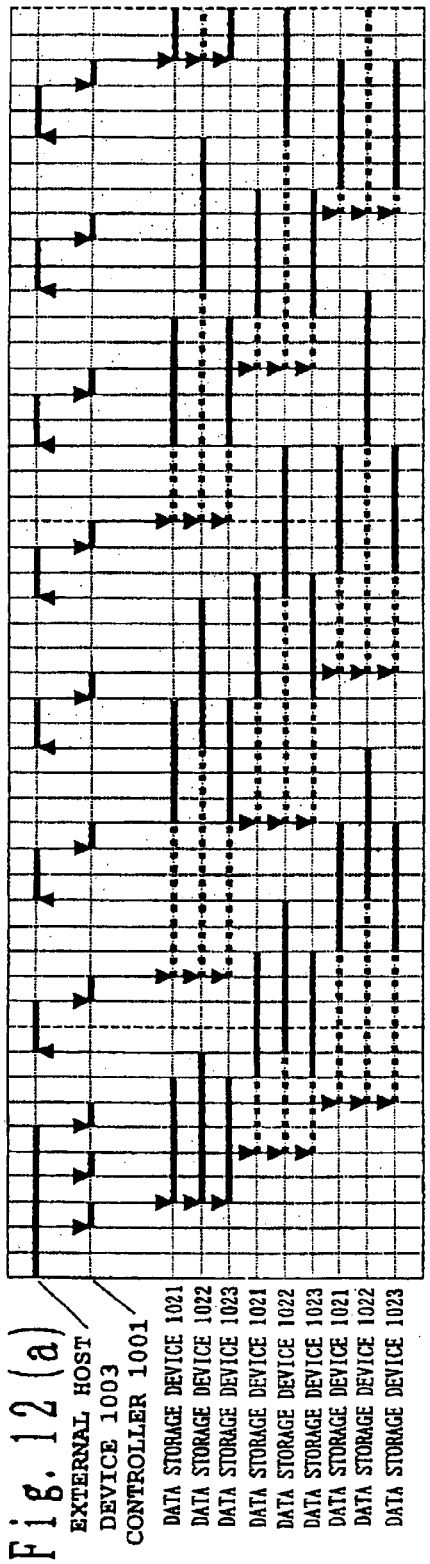
FIG. 12(a) is a first operational chart diagram illustrating data write operations in a prior art data storage array system.
Figure 12B:
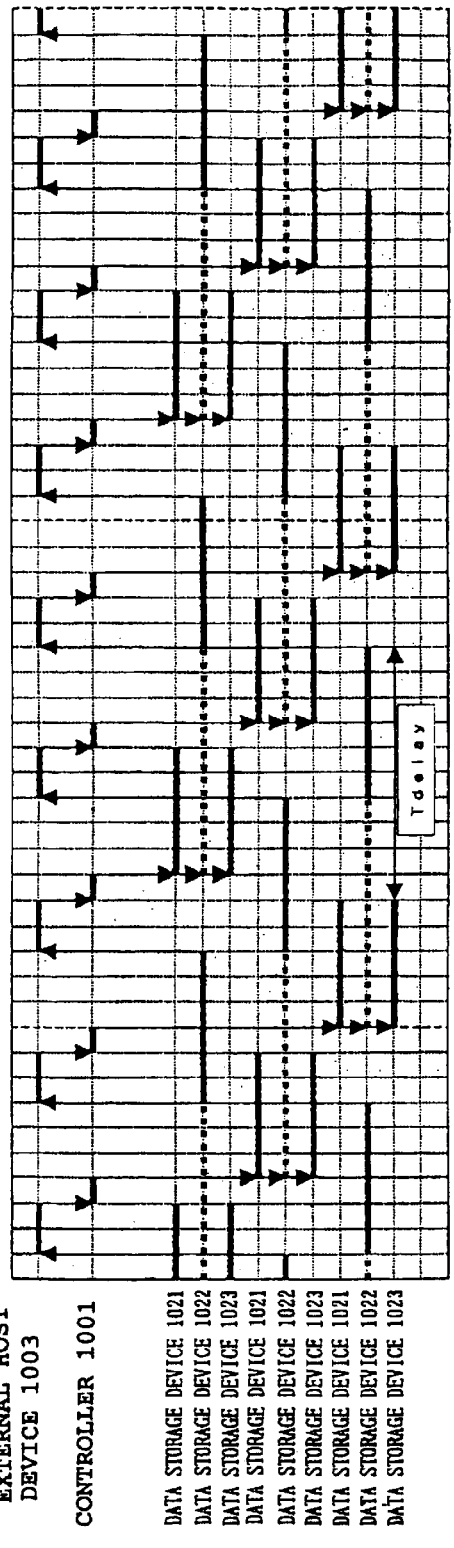
FIG. 12(b) is a second operational chart diagram which is the continuation of the first chart diagram.
Figure 13:
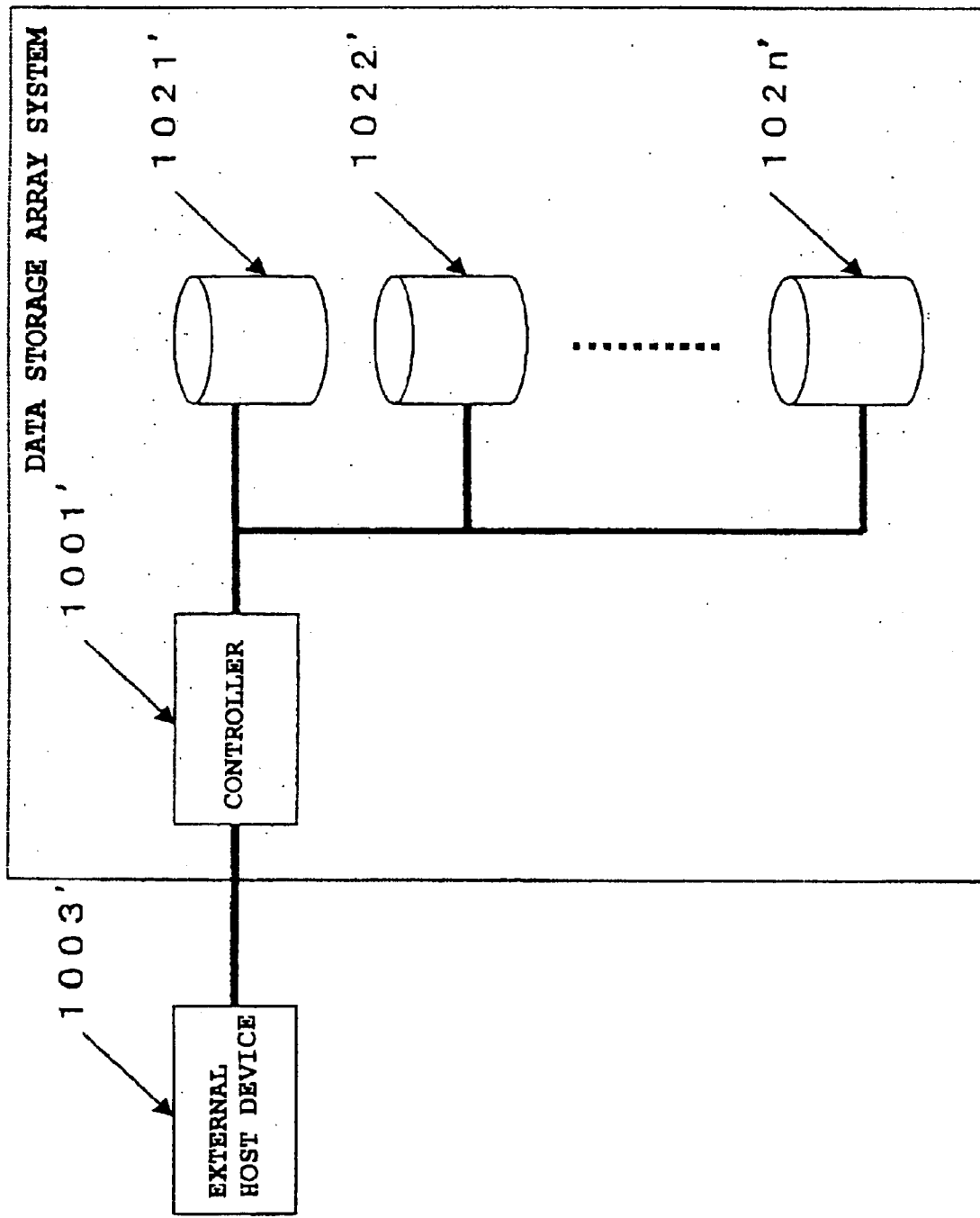
FIG. 13 is a diagram showing the configuration of the prior art data storage array system.

As shown in FIG. 10, the data storage array system of this embodiment comprises a controller 1001 and data storage devices (data processing devices) 1021, 1022, . . . , 102*n*.

The controller 1 is a means that accepts a data access request from an external host device 1003 (see FIG. 10), issues the data access request by dividing it across the data storage devices 1021, . . . , 102*n*, and sends a completion notification to the external host device 1003 upon completion of the data access requests to the data storage devices 1021, . . . , 102*n*. The data storage devices 1021, . . . , 102*n* are means of storing data, and the external host device 1003 is a means of issuing data access requests. To simplify the explanation, the data storage devices 1021, . . . , 102*n* will be referred to as the system resources.

Referring to FIG. 2, a description will be given below by dealing primarily with the operation of the controller 1001 in one example that uses a software synchronize function. FIG. 2 shows the configuration where a plurality of threads (also called processes) share the system resources in a multi-threaded programming (also called multi-process programming) environment.

The method of using the software synchronize function is essentially the same as that for a semaphore in the prior art. That is, as shown in FIG. 2, the parent thread first initializes the semaphore variable (S1), then generates child threads that use the system resources (S2), and terminates the process (S3). Each child thread performs the semaphore acquisition operation just before accessing the designated system resource (S4, S5), performs the semaphore release operation when access to the system is completed (S6, S7), and terminates the process (S8). Access rights to the system are controlled in this way.

Figure 3:
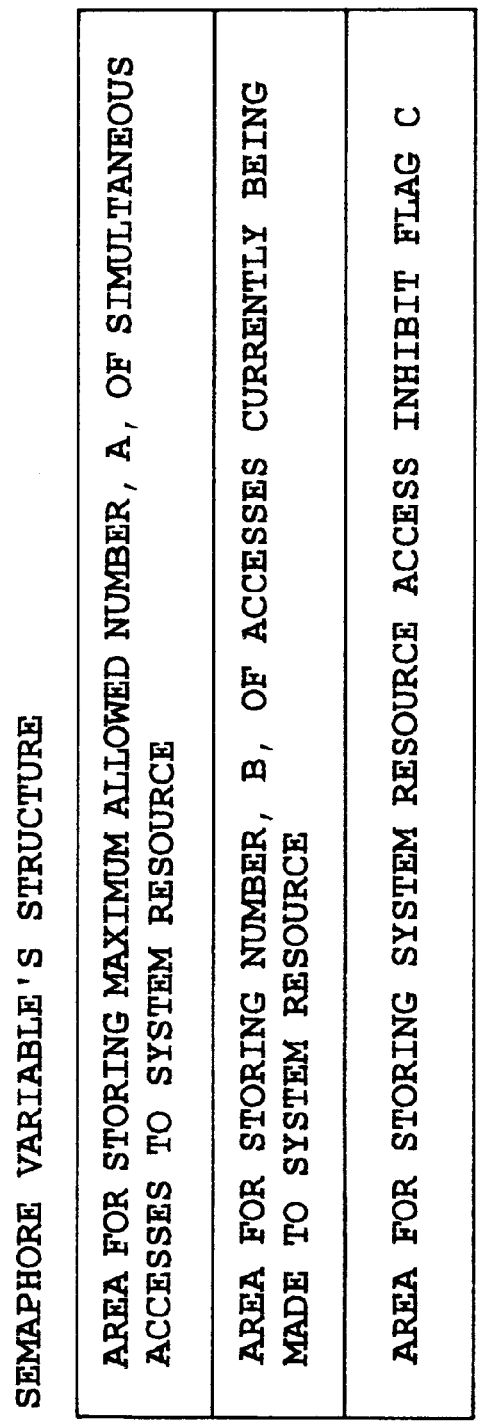
FIG. 3 is an explanatory diagram showing the structure of a semaphore variable used to control access rights to the system resources according to the embodiment of the present invention.

FIG. 3 shows the structure of the semaphore variable used for the control of the access rights to the system resources. The semaphore variable's structure contains an area for storing the maximum allowed number, A, of simultaneous accesses to a system resource, an area for storing the number, B, of accesses currently being made to the system resource, and an area for storing a flag C for inhibiting the access to the system resource. The maximum allowed number, A, of simultaneous accesses corresponds to the predetermined reference number in the present invention.

Figure 1A:
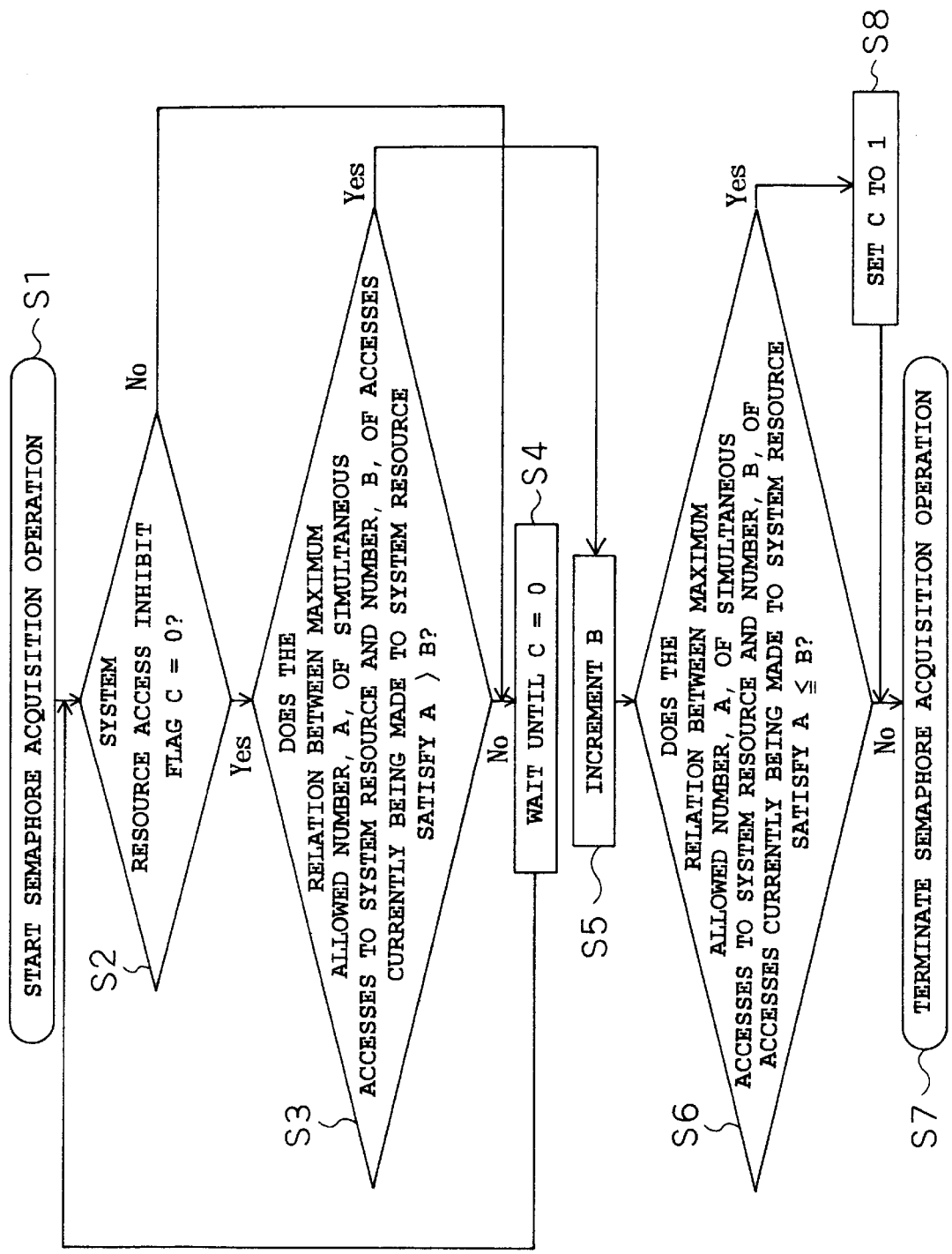
FIGS. 1(a) and 1(b) are operational flow diagrams illustrating a semaphore acquisition operation and a semaphore release operation, respectively, according to an embodiment of the present invention.
Figure 1B:
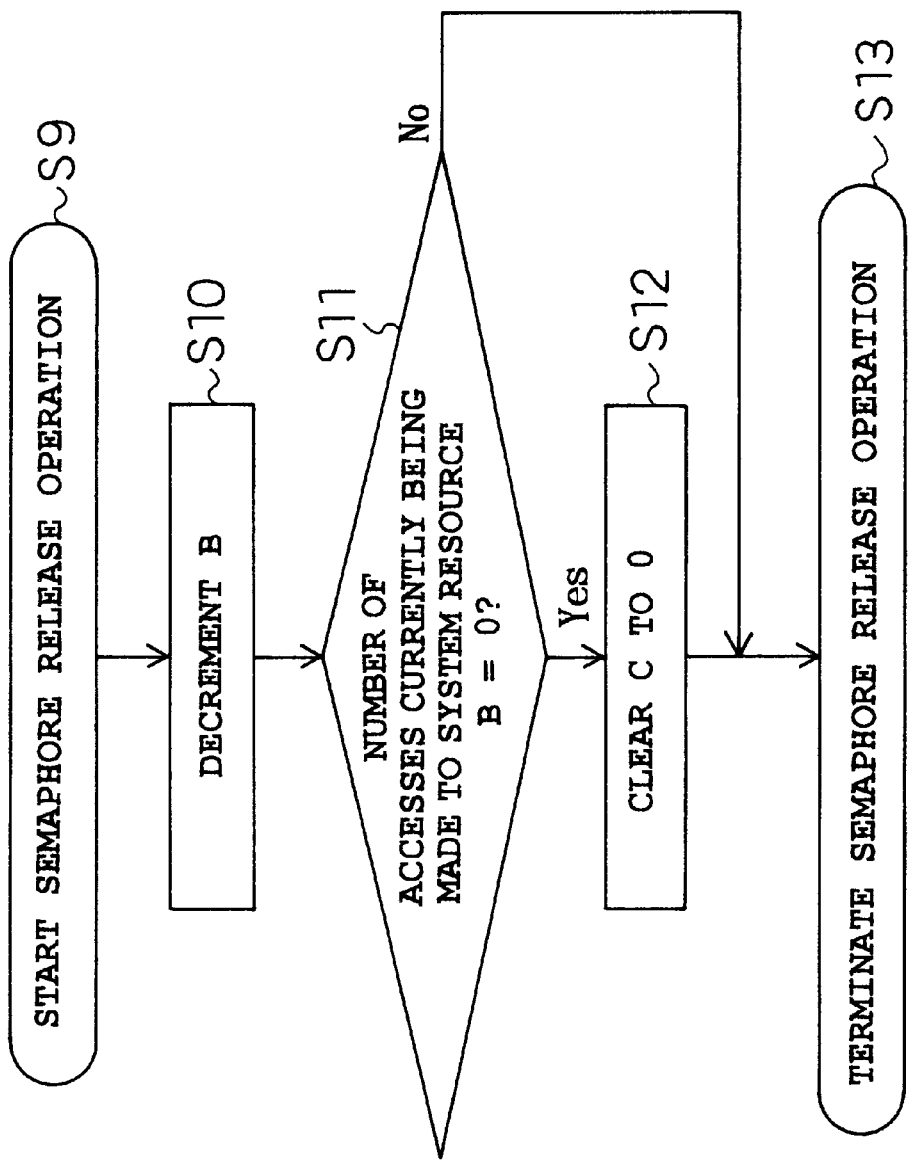

The semaphore acquisition and semaphore release operations according to the present embodiment will be described with reference to FIGS. 1(*a*) and 1(*b*) which illustrate the operational flows in the semaphore acquisition and semaphore release operations, respectively. In the semaphore variable initialization step of the parent thread, the maximum allowed number, A, of simultaneous accesses to each system resource is set, and the number, B, of accesses currently being made to the system resource and the system resource access inhibit flag C are cleared to zero, but as will be described hereinafter, in the semaphore acquisition operation in each child thread, the operation differs depending on the states of A, B, and C.

When the semaphore acquisition operation is started (S1) if A>B and if C=0, then access to the system resource is allowed (S2, S3), and B is incremented (S5). Here, if B reaches A, C is set to 1 (S6, S8), and the semaphore acquisition operation is terminated (S7). Not only in the case of A≦B, but also in the case of A>B, if C=1, it is important that the semaphore acquisition operation wait until C is cleared to 0 (S4).

In the semaphore release operation in the child thread, when the semaphore release operation is started, and B is decremented (S9, S10), if B becomes equal to 0, then C is cleared to 0 (S11, S12), and the semaphore release operation is terminated (S13).

Figure 4:
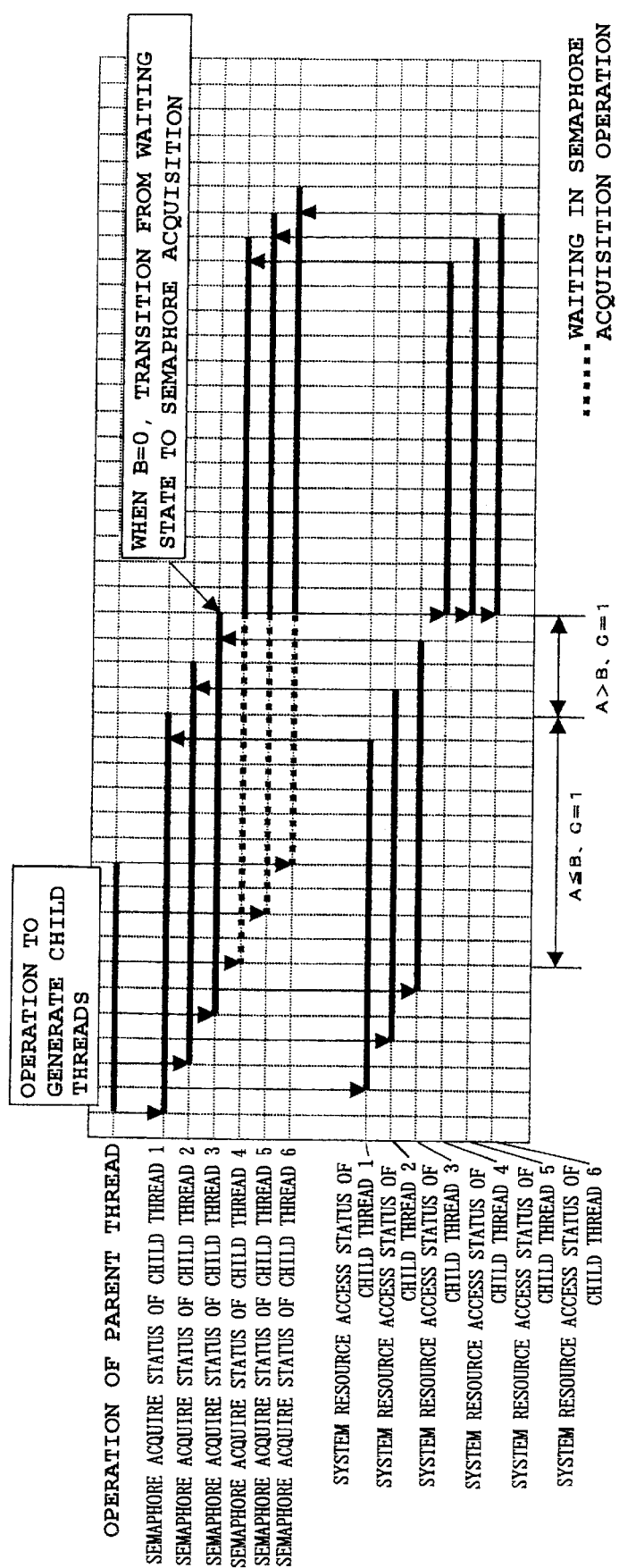
FIG. 4 is an operational chart diagram of a data storage array system according to the first embodiment of the present invention.

Next, a detailed description will be given below with reference to the operational chart of FIG. 4 by assuming the case where the maximum allowed number, A, of simultaneous accesses is set to 3, and where the external host device 1003 issues data access requests so that, at any instant in time, there are three data access requests being processed in the data storage array system.

When the semaphore acquisition operation is performed in sequence starting with child thread 1, since A=3, child threads 1, 2, and 3 are all allowed to access the system resource. When the child thread 3 has performed the semaphore acquisition operation, B reaches A and the system resource access inhibit flag C is therefore set to 1. At this time, since A≦B, child threads 4, 5, and 6 wait in the semaphore acquisition operation.

Thereafter, when the child thread 1 completes access to the system resource and performs the semaphore release operation, B becomes smaller than A, but since C is still 1, the child threads 4, 5, and 6 waiting in the semaphore acquisition operation are not yet allowed to access the system resource.

As the time elapses, the child thread 2 performs the semaphore release operation, and as the time further elapses, the child thread 3 performs the semaphore release operation and B becomes equal to 0, whereupon C is cleared to 0; as a result, the child threads 4, 5, and 6 waiting in the semaphore acquisition operation successfully acquire the semaphore simultaneously and are thus allowed to access the system resource. Here, by making provisions not to allow the child threads 4, 5, and 6 to acquire the semaphore until B and C both become 0, it becomes possible to prevent the variations in operating time caused by the execution of the child threads 1, 2, and 3 from being further accumulated among the system resources.

Accordingly, command queuing becomes possible without applying excessive load to the system resources, while reducing the accumulation of the variations in operating time among the system resources.

Embodiment 2

Figure 5:
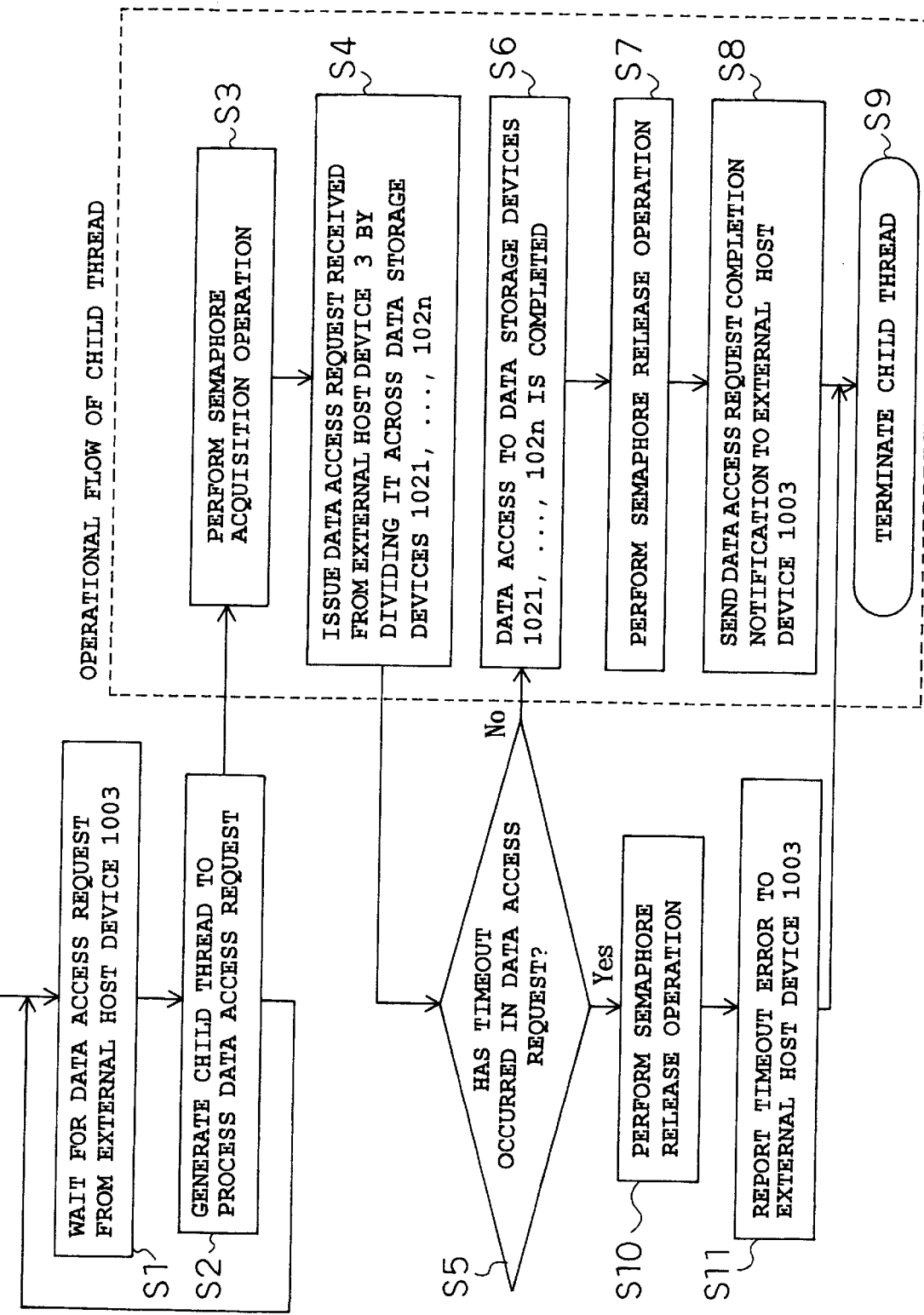
FIG. 5 is an operational flow diagram of a controller according to a second embodiment of the present invention.

Next, the configuration and operation of a data storage array system as one embodiment using the data processing control system of the invention will be described by referring primarily to FIG. 5 which illustrates the operational flow of the controller in the present embodiment. While describing the operation of the data storage array system of this embodiment, one embodiment of a data processing control method according to the present invention will also be described.

The data storage array system of the present embodiment has the same configuration as the data storage array system of the foregoing first embodiment, but in the present embodiment, the controller 1001 first waits for a data access request from the external host device 1003 (S1), and then generates a child thread to process the data access request (S2). Next, access rights to the n data storage devices 1021, ..., 102n are acquired by performing the semaphore acquisition operation (S3), the data access request received from the external host device 1003 is issued by dividing it across the data storage devices 1021, ..., 102n (S4), the data storage devices 1021, ..., 102n are monitored using a timer (S5), and when the data access requests to the data storage devices 1021, ..., 102n are all completed without causing a timeout error (S6), the semaphore release operation is performed in the child thread (S7), a data access completion notification is sent to the external host device 1003 (S8), and the child thread is completed (S9). If a timeout error occurs, the semaphore release operation is performed in the child thread (S10), and the timeout error is reported to the external host device 1003 (S11).

Next, a detailed description will be given below with reference to the operational charts of FIGS. 6 and 7 by assuming the case where the maximum allowed number, A, of simultaneous accesses is set to 3 and the number of data storage devices is 3 (that is, n=3), and where the external host device 1003 issues data access requests so that, at any instant in time, there are three data access requests being processed in the data storage array system. The description will be given first for the case (1) where the data access requests are data read requests, then for the case (2) where the data access requests are data write requests.

Figure 6:
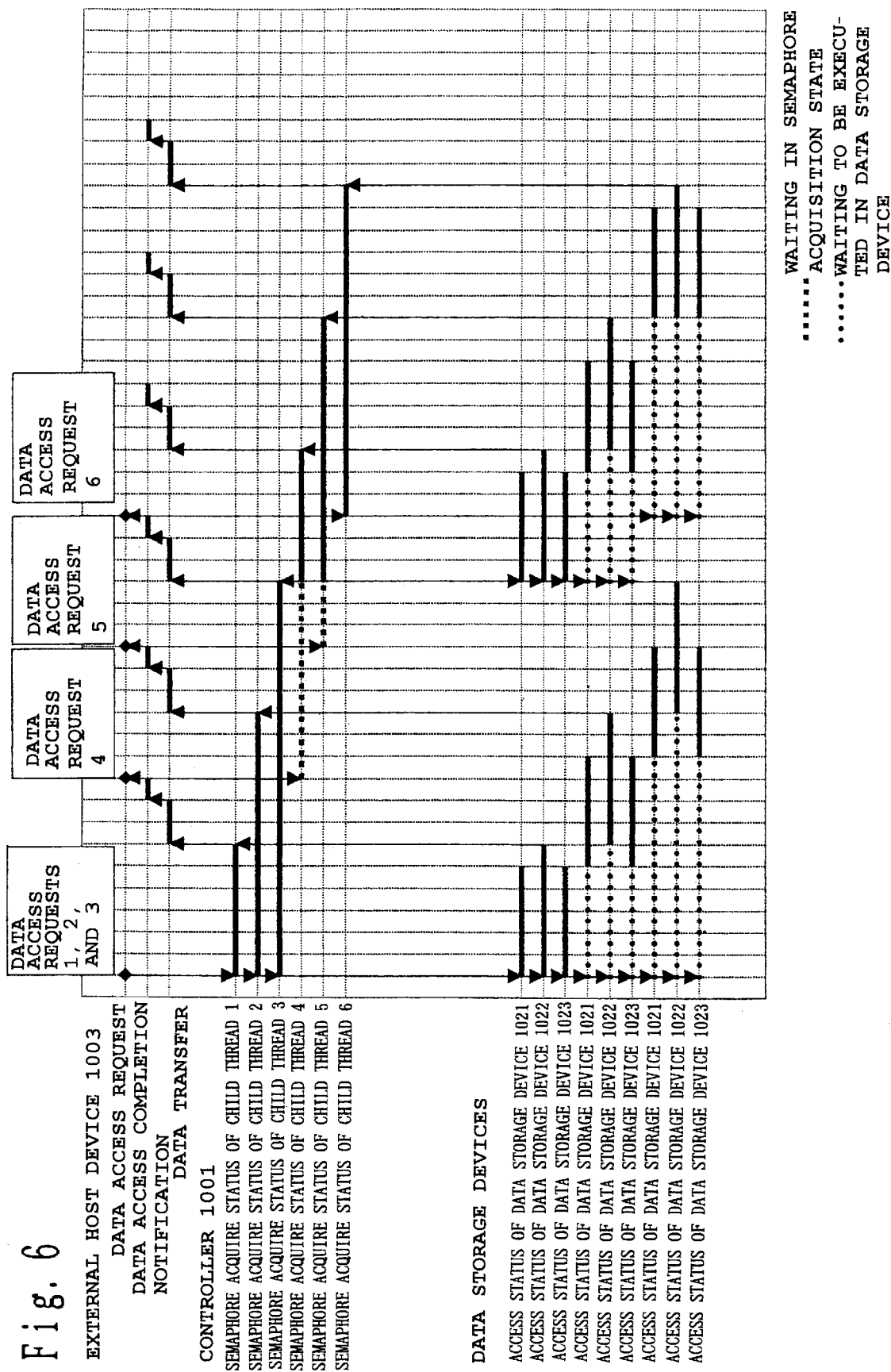
FIG. 6 is an operational chart diagram illustrating read operations in a data storage array system according to the second embodiment of the present invention.

(1) When the data access requests are data read requests, the external host device 1003 issues data access requests 1, 2, and 3, as shown in FIG. 6, and waits until they are completed; on the other hand, the controller 1001, upon receiving the data access requests 1, 2, and 3 from the external host device 1003, generates child threads 1, 2, and 3 to process the received requests.

In order that access can be made to the data storage devices 1021, 1022, and 1023, the child threads 1, 2, and 3 perform the semaphore acquisition operation in the order stated (but in effect, simultaneously). In the semaphore acquisition operation, since B<A, the child threads 1, 2, and 3 are each allowed to access all the data storage devices 1021, 1022, and 1023. When the child thread 3 has performed the semaphore acquisition operation, the number, B, of data access requests currently being executed on the data storage devices the access rights to which have been acquired by the semaphore becomes equal to A, whereupon the access inhibit flag C is set to 1 for the data storage devices 1021, 1022, and 1023.

Thereafter, when the child thread 1 completes the access to the data storage devices 1021, 1022, and 1023 and performs the semaphore release operation, the readout data is transferred to the external host device 1003 together with a data access request completion notification 1.

Upon receiving the data access request completion notification 1, the external host device 1003 issues a data access request 4.

In response to the data access request 4 received from the external host device 1003, the controller 1001 generates a child thread 4 to process the received request. In the semaphore acquisition operation in the child thread 4, A>B, but since C=1, the child thread 4 waits in the semaphore acquisition operation.

Next, when the child thread 2 completes the access to the data storage devices 1021, 1022, and 1023 and performs the semaphore release operation, the readout data is transferred to the external host device 1003 together with a data access request completion notification 2.

Upon receiving the data access request completion notification 2, the external host device 1003 issues a data access request 5.

In response the data access request 5 received from the external host device 1003, the controller 1001 generates a child thread 5 to process the received request. As in the case of the child thread 4 described above, in the semaphore acquisition operation in the child thread 5, A>B, but since C=1, the child thread 5 waits in the semaphore acquisition operation.

Finally, when the child thread 3 completes the access to the data storage devices 1021, 1022, and 1023 and performs the semaphore release operation, B=0 and hence C=0, and the child threads 4 and 5 waiting in the semaphore acquisition operation can now acquire access rights to the data storage devices 1021, 1022, and 1023.

After performing the semaphore release operation, the child thread 3 transfers the readout data to the external host device 1003 together with a data access request completion notification 3, upon receiving which the external host device 1003 issues a data access request 6.

Figure 7:
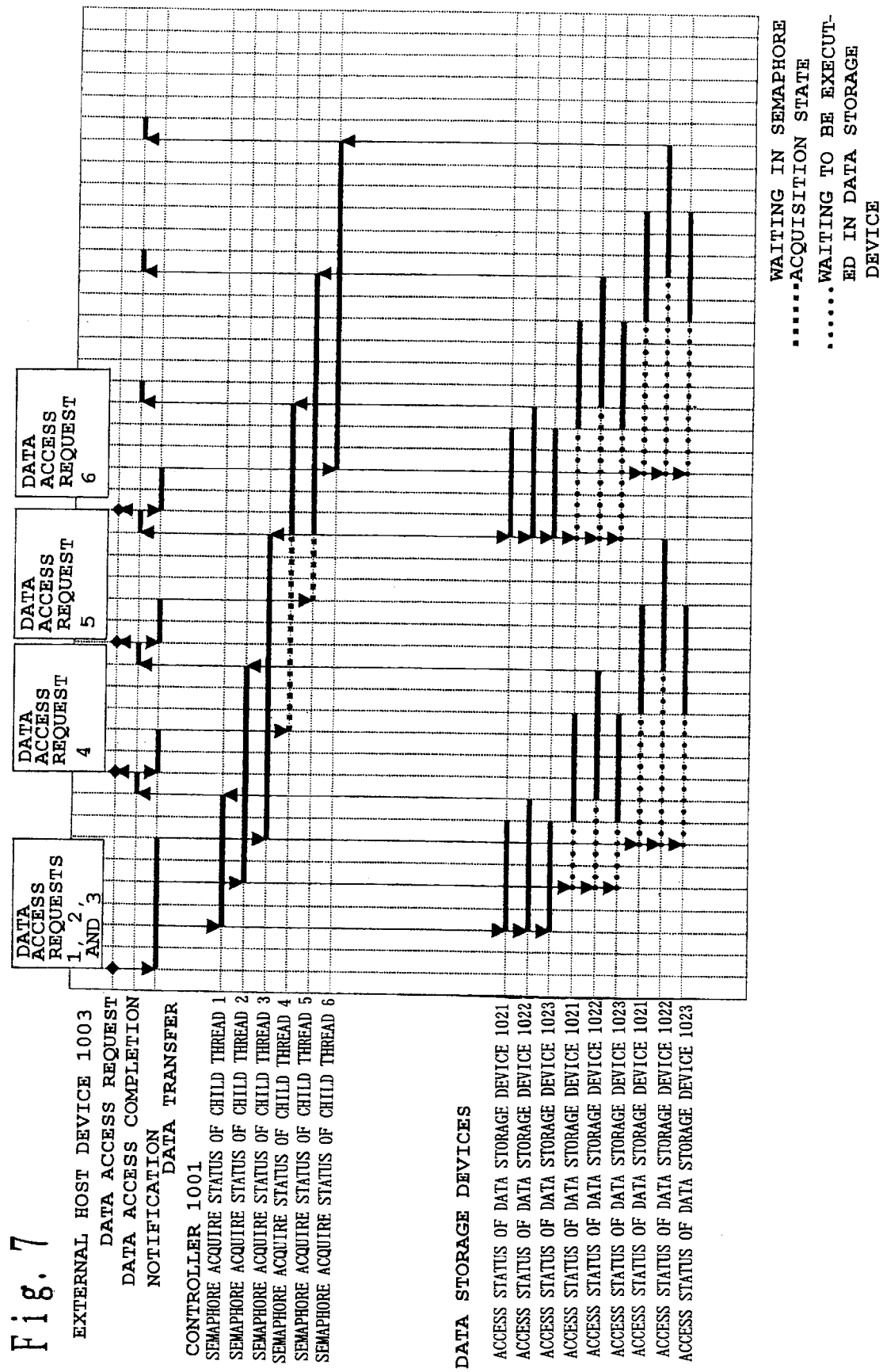
FIG. 7 is an operational chart diagram illustrating write operations in the data storage array system according to the second embodiment of the present invention.

(2) When the data access requests are data write requests, the external host device 1003 issues data access requests 1, 2, and 3, as shown in FIG. 7, and waits until they are completed; on the other hand, the controller 1001, upon receiving the data access requests 1, 2, and 3 from the external host device 1003, generates child threads 1, 2, and 3 to process the received requests (the process up to this point is the same as the process performed when the data access requests are data read requests).

After write data has been transferred from the external host device 1003, the child threads 1, 2, and 3 perform the semaphore acquisition operation in sequence in the order that the write data was transferred. Here, in the semaphore acquisition operation, since B<A, the child threads 1, 2, and 3 are each allowed to access all the data storage devices 1021, 1022, and 1023, and when the child thread 3 has performed the semaphore acquisition operation, the number, B, of data access requests currently being executed on the data storage devices the access rights to which have been acquired by the semaphore becomes equal to A, whereupon the access inhibit flag C is set to 1 for the data storage devices 1021, 1022, and 1023, as in the first described case.

Thereafter, the child thread 1 completes the access to the data storage devices 1021, 1022, and 1023 and performs the semaphore release operation. After performing the semaphore release operation, the child thread 1 sends a data access request completion notification 1 to the external host device 1003. Upon receiving the data access request completion notification 1, the external host device 1003 issues a data access request 4.

In response to the data access request 4 received from the external host device 1003, the controller 1001 generates a child thread 4 to process the received request. In the semaphore acquisition operation performed in the child thread 4 after write data has been transferred from the external host device 1003, A>B, but since C=1, the child thread 4 waits in the semaphore acquisition operation.

Next, the child thread 2 completes the access to the data storage devices 1021, 1022, and 1023 and performs the semaphore release operation, and sends a data access request completion notification 2 to the external host device 1003. Upon receiving the data access request completion notification 2, the external host device 1003 issues a data access request 5.

In response to the data access request 5 received from the external host device 1003, the controller 1001 generates a child thread 5 to process the received request. In the semaphore acquisition operation performed in the child thread 5 after write data has been transferred from the external host device 1003, A>B, but since C=1, the child thread 5 waits in the semaphore acquisition operation.

Finally, when the child thread 3 completes the access to the data storage devices 1021, 1022, and 1023 and performs the semaphore release operation, B=0 and hence C=0, and the child threads 4 and 5 waiting in the semaphore acquisition operation can now acquire access rights to the data storage devices 1021, 1022, and 1023.

After performing the semaphore release operation, the child thread 3 sends a data access request completion notification 3 to the external host device 1003 and, upon receiving the data access request completion notification 3, the external host device 1003 issues a data access request 6.

By repeating the above-described operations, regardless of whether the data access requests are data read requests or data write requests, command queuing can be implemented without applying excessive loads to the data storage devices 1021, 1022, and 1023, while reducing the accumulation of the variations in operating time among the data storage devices 1021, 1022, and 1023.

Embodiment 3

Figure 8:
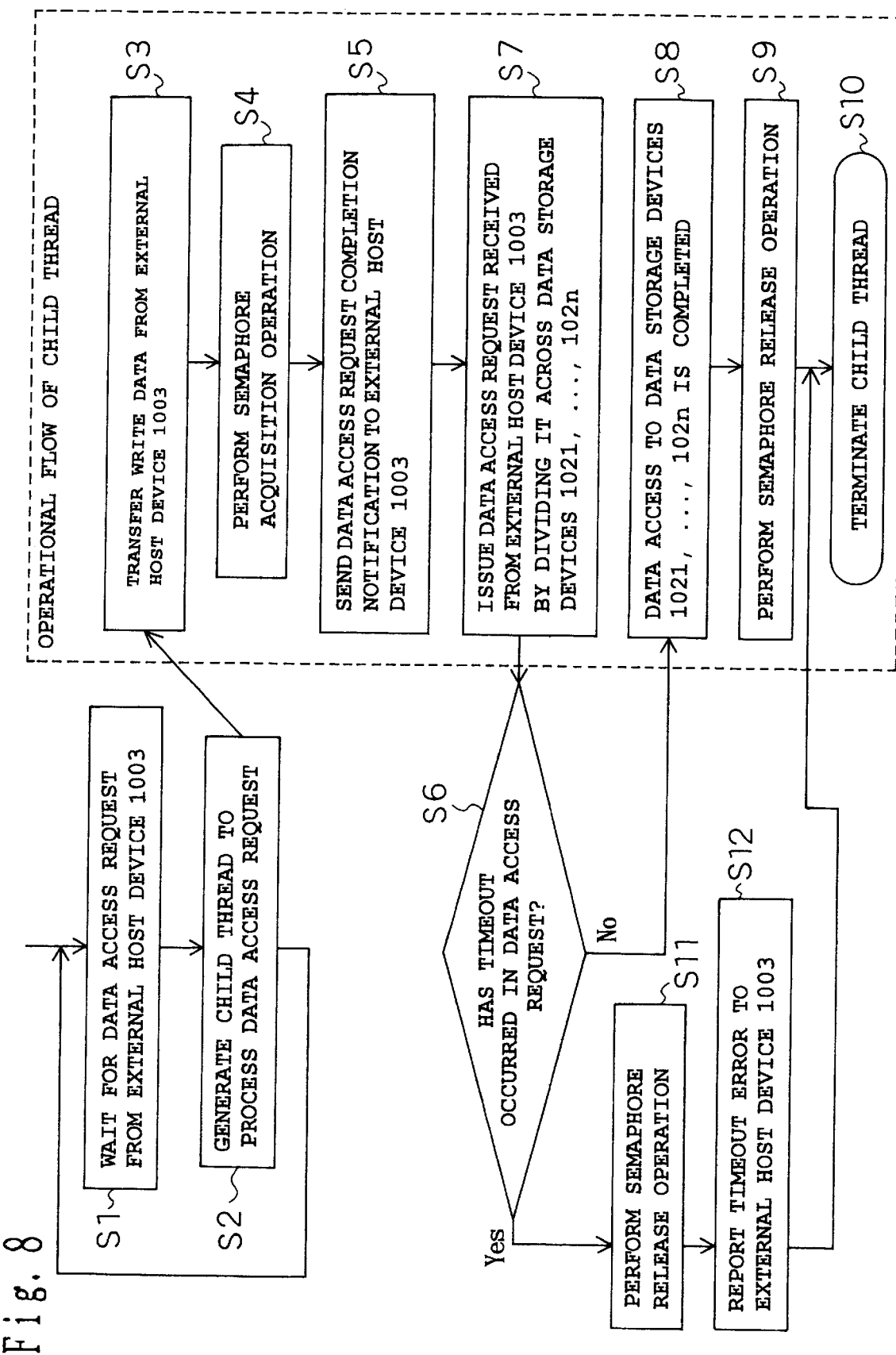
FIG. 8 is an operational flow diagram of a controller according to a third embodiment of the present invention.

Next, the configuration and operation of a data storage array system as one embodiment using the data processing control system of the invention will be described by referring primarily to FIG. 8 which illustrates the operational flow of the controller according to the present embodiment. While describing data write operations performed in the data storage array system of this embodiment, one embodiment of a data processing control method according to the present invention will also be described.

The data storage array system of the present embodiment has the same configuration as the data storage array system of the first embodiment, but in the present embodiment, when a write request is received from the external host device 1003 for writing to the data storage devices 1021, 1022, and 1023, the controller 1001 can send a data access completion notification to the external host device 1003 upon receiving write data from the external host device 1003.

The controller 1001 first waits for a data access request for a data write from the external host device 1003 (S1), and then generates a child thread to process the data access request (S2).

The following describes the operation of the child thread by dealing with differences from the foregoing embodiment. After the write data has been transferred from the external host device 1003, access rights to the data storage devices 1021, . . . , 102n are acquired by performing the semaphore acquisition operation (S3, S4), a data access completion notification is sent to the external host device 1003 (S5), and the data access request received from the external host device 1003 is issued by dividing it across the data storage devices 1021, . . . , 102n (S6).

Next, the data storage devices 1021, . . . , 102n are monitored using a timer (S7), and when the data access requests to the data storage devices 1021, . . . , 102n are all completed without causing a timeout error (S8), the semaphore release operation is performed in the child thread (S9), and the child thread is terminated (S10). If a timeout error occurs, the semaphore release operation is performed in the child thread (S11), and the timeout error is reported to the external host device 1003 (S12).

In the above process, the data access completion notification is sent after performing the semaphore acquisition operation, in order to prevent excessive load from being applied to the data storage array system.

Figure 9:
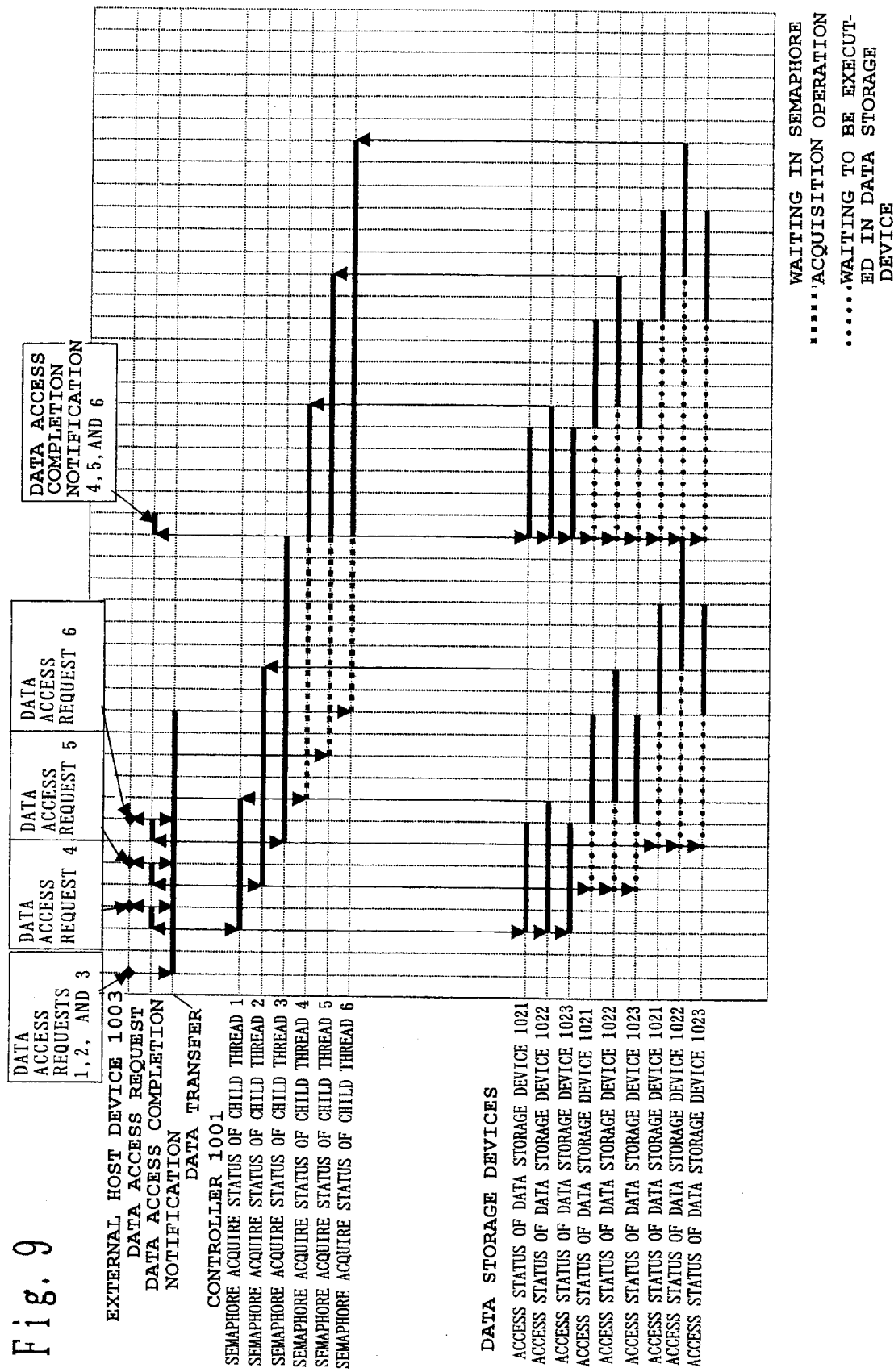
FIG. 9 is an operational chart diagram illustrating write operations in a data storage array system according to the third embodiment of the present invention.

Next, a detailed description will be given below with reference to the operational chart of FIG. 9 by assuming the case where the maximum allowed number, A, of simultaneous accesses is set to 3 and the number of data storage devices is 3 (that is, n=3), and where the external host device 1003 issues data access requests so that, at any instant in time, there are three data access requests being processed in the data storage array system.

The external host device 1003 issues data access requests 1, 2, and 3 and waits until they are completed. On the other hand, the controller 1001, upon receiving the data access requests 1, 2, and 3 from the external host device 1003, generates child threads 1, 2, and 3 to process the received requests. After write data has been transferred from the external host device 1003, the child threads 1, 2, and 3 perform the semaphore acquisition operation in sequence. In the semaphore acquisition operation, since B<A, the child threads 1, 2, and 3 are each allowed to access all the data storage devices 1021, 1022, and 1023.

As earlier described, in the present embodiment, the child threads 1, 2, and 3 send data access request completion notifications 1, 2, and 3 to the external host device 1003 before accessing the data storage devices 1021, 1022, and 1023, and after that, each thread accesses the data storage devices 1021, 1022, and 1023.

When the child thread 3 following the child threads 1 and 2 has performed the semaphore acquisition operation, the number, B, of data access requests currently being executed on the data storage devices the access rights to which have been acquired by the semaphore becomes equal to A, whereupon the access inhibit flag C is set to 1 for the data storage devices 1021, 1022, and 1023.

When the data access request completion notifications 1, 2, and 3 are received, the external host device 1003 issues data access requests 4, 5, and 6, respectively, in this order. Then, in response to the data access requests 4, 5, and 6 issued from the external host device 1003, the controller 1001 generates child threads 4, 5, and 6, respectively, in this order. However, in the semaphore acquisition operation performed after write data has been transferred from the external host device 1003, since A<B or since A>B and C=1, the child threads 4, 5, and 6 wait in the semaphore acquisition operation.

Thereafter, when the child threads 1, 2, and 3 finish accessing the data storage devices 1021, 1022, and 1023 and perform the semaphore release operation in sequence, B=0 and hence C=0, and the child threads 4, 5, and 6 waiting in the semaphore acquisition operation can, in this order, and in effect, simultaneously, acquire access rights to the data storage devices 1021, 1022, and 1023.

By repeating the above-described operations, regardless of whether the data access requests are data read requests or data write requests, command queuing can be implemented without applying excessive loads to the data storage devices 1021, 1022, and 1023, while reducing the accumulation of the variations in operating time among the data storage devices 1021, 1022, and 1023.

Thus, the present invention provides a system resource access right control mechanism wherein, for example, when the number of accesses being executed simultaneously on a system resource reaches n where n is the maximum number of simultaneously executable accesses on the system resource, any new system execution request for the system resource is queued and, when all the processes being executed on the system resource are completed, up to n execution requests that have been queued for the system resource are executed.

The invention also provides a data storage array system comprising, for example, a plurality of data storage devices and a controller for controlling the data storage devices, wherein the controller executes up to a predetermined number, A, of externally issued data access requests to access the data storage devices and, when access requests exceeding the predetermined number A are issued by the external device, such access requests are all queued in the controller, and wherein when the predetermined number, A, of data access requests have been executed on the data storage devices, up to the predetermined number, A, of data access requests that have been queued in the controller are issued to the data storage devices, after which the controller notifies the external device of the completion of the data access requests.

The invention further provides a data storage array system comprising, for example, a plurality of data storage devices and a controller for controlling the data storage devices, wherein when data write access requests are received from an external device, the controller executes up to a predetermined number, A, of externally issued data access requests to access the data storage devices and then notifies the external device of the completion of the data write access requests, and wherein when write access requests exceeding the predetermined number A are issued by the external device, such access requests are all queued in the controller, and when the predetermined number, A, of data write access requests have been executed on the data storage devices, up to the predetermined number, A, of data write access requests that have been queued in the controller are issued to the data storage devices.

The plurality of data processing devices of the present invention have been described as being the data storage devices 1021, . . . , 102n in the above embodiments, but they are not limited to this particular type of device; for example, personal computers (PCs) or the like may be used as the data processing devices.

Further, the data processing operations of the present invention have been described as being data access requests such as data write, but it is not limited to this particular type of processing; for example, the data processing may be one that involves mathematical operations.

The wording "until the plurality of data processing devices complete the execution of all of the predetermined number of instructions" used in the present invention has been used in the above embodiments to mean "when the number of instructions received and remaining unexecuted reaches or exceeds a predefined number, then until the execution of all the predefined number of instructions is completed." However, the wording is not limited to this particular meaning; for example, the wording "until the plurality of data processing devices complete the execution of all of the predetermined number of instructions" used in the present invention may be used to mean "when the number of data processing devices on which instructions are being executed reaches or exceeds a predefined number, then until the instructions the execution of which has been started but not yet completed have all been executed."

For example, when there are three data storage devices, and the number of data storage devices on which instructions are being executed reaches three, then the execution of any new instructions received for the data storage devices is not started until the instructions the execution of which has been started but not yet completed have all been executed. More specifically, as in the case of one example of the second embodiment where A=3 and n=3, when the external host device 3 is constructed to issue three data access requests at all times as previously described, and when the data storage array system is constructed from an array of data storage devices 1021, 1022, and 1023 (see FIG. 10), the data storage array system does not process the next data access request until the current data access request has been processed (in this case, the variation in data access time does not accumulate with time but is kept constant).

As is apparent from the above description, the inventor has noticed that the following two requirements must be considered to ensure real time processing of continuous media data in the data storage array system.

(Requirement 1) To prevent degradation in the access performance of the data storage device as a whole.

(Requirement 2) To eliminate variations in access processing time among a plurality of data devices.

Here, the Requirement 1 affects the bandwidth of the reproduction and recording of continuous media data that can be handled by the data storage array system, while the Requirement 2 affects the failure prediction/detection accuracy.

One method of satisfying the Requirement 2 is to inhibit command queuing that allows a plurality of processing requests to be issued simultaneously to each data storage device. In this method, new processing requests are not issued to any data storage device until all the processing requests issued to the plurality of data storage devices have been completed. To implement this method, the maximum allowed number of simultaneous accesses in the previously described semaphore should be set to 1.

In this method, however, since new processing requests cannot be issued to any data storage device until the currently issued processing requests are completed, waiting time during which nothing is done (hereinafter also called the idle time) arises between the completion of the current processing request and the initiation of the next processing request in each data storage device, and this leads to the degradation of the access performance of the data storage device itself, and hence, the degradation of the access performance of the data storage array system as a whole.

One method of satisfying the Requirement 1 is to allow command queuing for the data storage devices. In a specific method, the maximum allowed number of simultaneous accesses in the previously describe semaphore is set to 2 or more. In this case, since the next processing request can be initiated while the current processing request is being handled in each data storage device, the idle time is eliminated and the performance of the data storage device itself does not degrade.

However, when the maximum allowed number of simultaneous accesses is set to 2 or more, there occurs the possibility that the Requirement 2 may not be satisfied.

The inventor has found that if both the Requirement 1 and the Requirement 2 are to be satisfied simultaneously, variations in data access time occurring among the data storage devices 1021, ..., 102n should be eliminated by controlling the access rights to the data storage devices, i.e., the system resources, and by eliminating the state in which data access requests are being issued at any instant in time.

In a specific example, a system resource access right control mechanism is constructed so that once the number of accesses currently being executed on the system resources has reached n where n is the maximum number of accesses simultaneously executable on the system resources, newly issued system execution requests are all placed in a queue, and when all the accesses currently being executed on the system resources are completed, up to n system resource execution requests that have been queued are executed.

To describe in further detail, access rights to the system are controlled by performing the semaphore acquisition operation just before accessing the system resources, and the semaphore release operation upon completion of the access to the system resources. When the maximum allowed number of simultaneous accesses to the system resources is denoted by A, and the number of accesses currently being made to the system resources is denoted by B, then in the semaphore acquisition operation, if A>B, the semaphore is successfully acquired, access to the system resources is allowed, and B is incremented; here if A≦B, the semaphore acquisition operation waits until B=0. In the semaphore release operation, B is decremented.

Since the maximum number of system resource access rights that can be issued is limited to A, it can be seen that excessive load is not applied to the system resources. Further, once the state A≦B is entered, if B becomes smaller than A, access to the system is not allowed until B=0; this eliminates the state in which data access requests are being issued to the system resources at any instant in time. That is, the system resource access rights are controlled by a hysteresis characteristic such as shown in FIG. 14.

In the present invention, when the state A≦B is entered, the controller 1 does not issue data access requests to the data storage devices 1021, ..., 102n until B=0; as a result, when B=0, the data storage devices 1021, ..., 102n are in a synchronized state, and thus the variations in data access time among the data storage devices caused by the Factor 1 or the Factor 2 can be prevented from accumulating.

Figure 15:
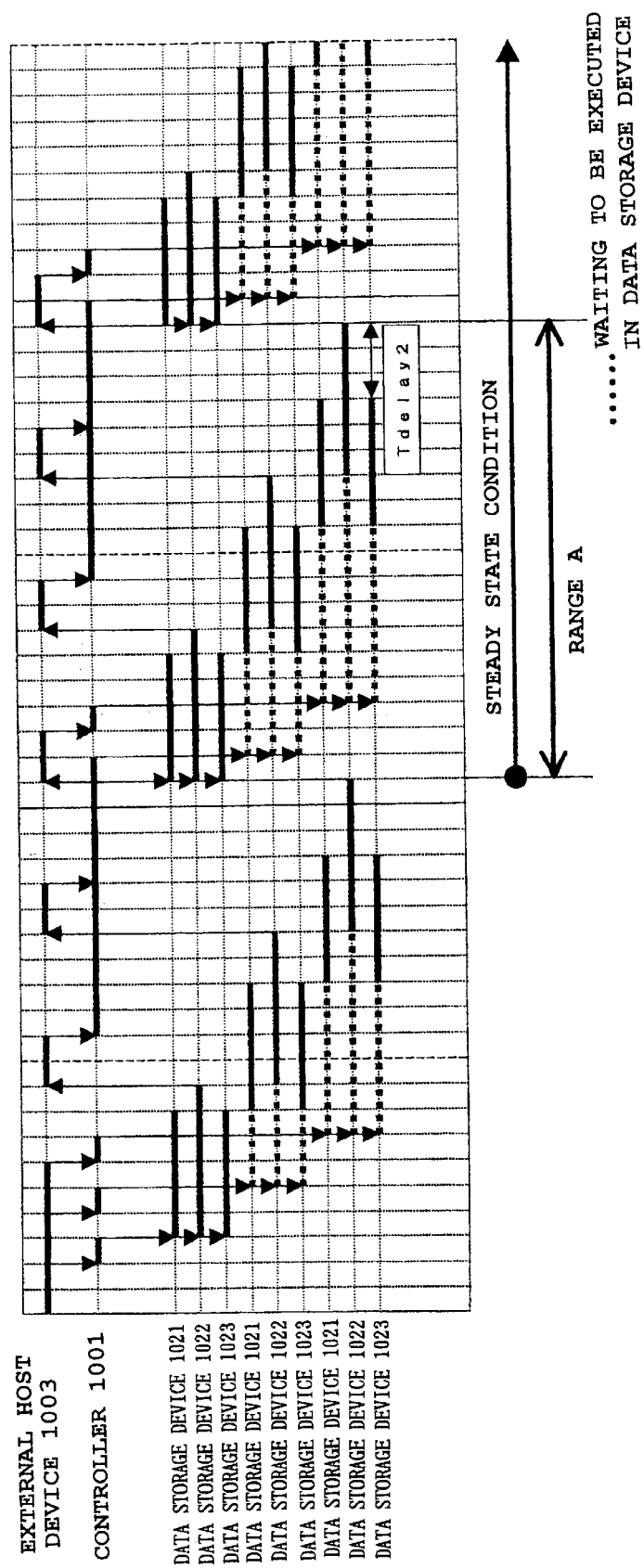
FIG. 15 is an operational flow chart diagram of the data storage array system of the present invention.

For example, as in one example of the prior art, both A and n are set to 3, and it is assumed that the data storage device 1022 has a longer data access time than the other data storage devices 1021 and 1023. FIG. 15 is an operational chart illustrating data write operations in a data storage array system to which the access right control mechanism of the present invention is applied.

Figure 14:
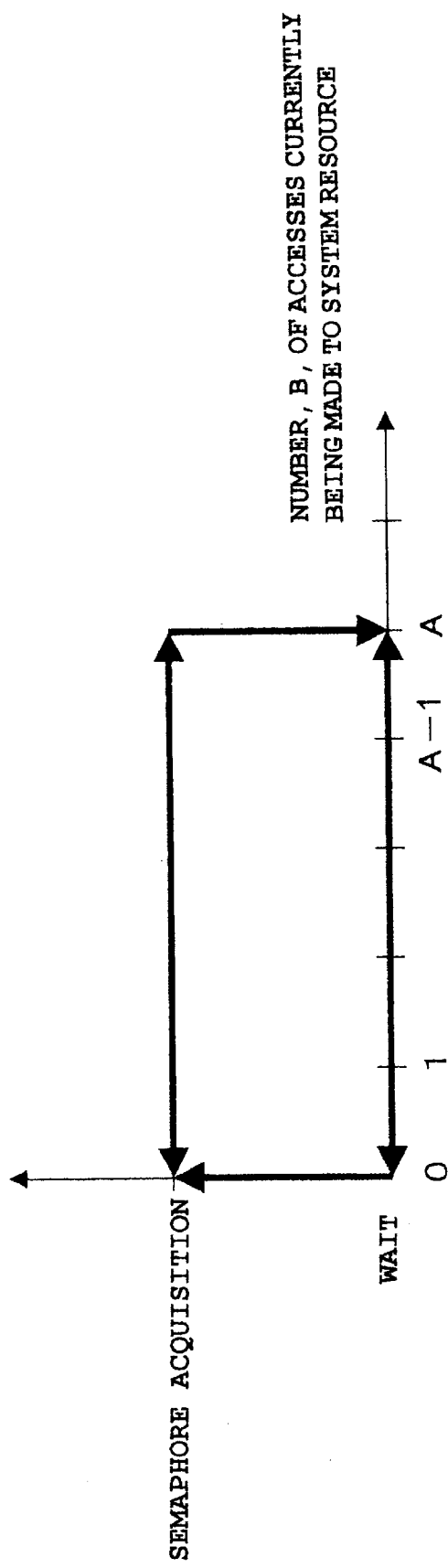
FIG. 14 is a hysteresis characteristic diagram of a semaphore according to the present invention.

As can be seen from FIG. 14, data access requests from the controller 1001 are queued for a period from the moment A=B to the moment B=0; therefore, when B=0, the data storage devices 1021, 1022, and 1023 are in a synchronized state.

As a result, it can be seen that the delay of the data access time of the data storage device 1022 is eliminated by the time B=0.

As shown in FIG. 15 which illustrates the operational flow of the data storage array system of the present invention, the data access time delay Tdelay2 of the data storage device 1022 is expressed as $$\text{Tdelay2} = (Td - Tn) \times A$$

The data access time delay Tdelay2 is smaller than the Tdelay of the prior art by $$\text{Tdelay} - \text{Tdelay2} = Tn \times (A-1) - Tr - Tx$$

and the failure prediction/detection accuracy can be enhanced accordingly.

When attention is paid to the range A, a relatively slight delay (due to the Factor 3), though larger than that occurring due to the Factor 1 or the Factor 2, is caused in one of the data storage devices; in this case also, since the delay due to the Factor 3 is accumulated in Tdelay2, the controller can easily monitor such delays by using a timer.

This feature is therefore advantageous when handling continuous media data such as moving image data.

As described above, according to the present invention, since access rights to the system are controlled by performing the semaphore acquisition operation just before accessing the system resources, and the semaphore release operation upon completion of the access to the system resources, in the same manner as in the prior art, the method can be quite easily implemented in software.

When the present invention is applied to an access right control mechanism for a plurality of data storage devices in a data storage array system, it becomes possible to implement command queuing for the plurality of data storage devices; as a result, since the data access bandwidth can be expanded and the failure prediction/detection accuracy enhanced, and since a data storage array system suitable for continuous media data can be constructed, its practical advantage is enormous.

The invention described above also includes a system resource access right control mechanism, etc. for the data storage devices in the data storage array system.

The present invention can also be applied to RAID described in the prior art example. Examples adapted to various RAID levels will be described in the following embodiments.

Embodiment 4

A data storage array system according to a fourth embodiment will be described by dealing with the case where the present invention is applied to a RAID 3 system. In the case of RAID 3, the configuration of the data storage array system and the operational flow of the controller 1, except the semaphore processing in the controller 1, are the same as those described in the prior art example (FIGS. 25 and 26) and therefore, will not be described here. The following description is given based on the premise that the controller 1 is operating in a multi-threaded programming (multiprocessing programming) environment, but the same operation may be implemented in hardware. The description given hereinafter focuses on the semaphore acquisition and semaphore release operations which constitute the feature of the present invention.

Figure 16A:
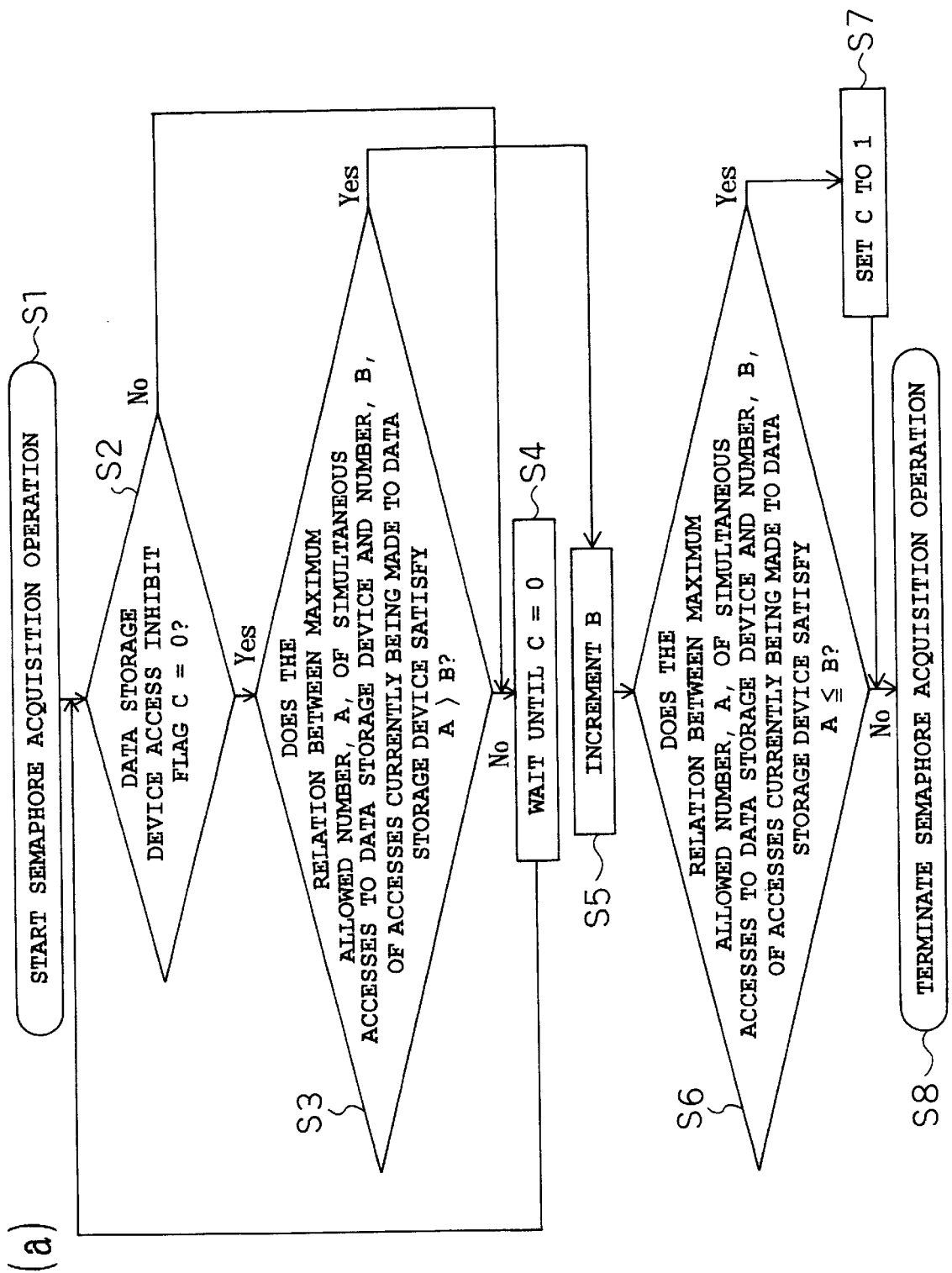
FIGS. 16(a) and 16(b) are operational flow diagrams of a semaphore according to a fourth embodiment.
Figure 16:
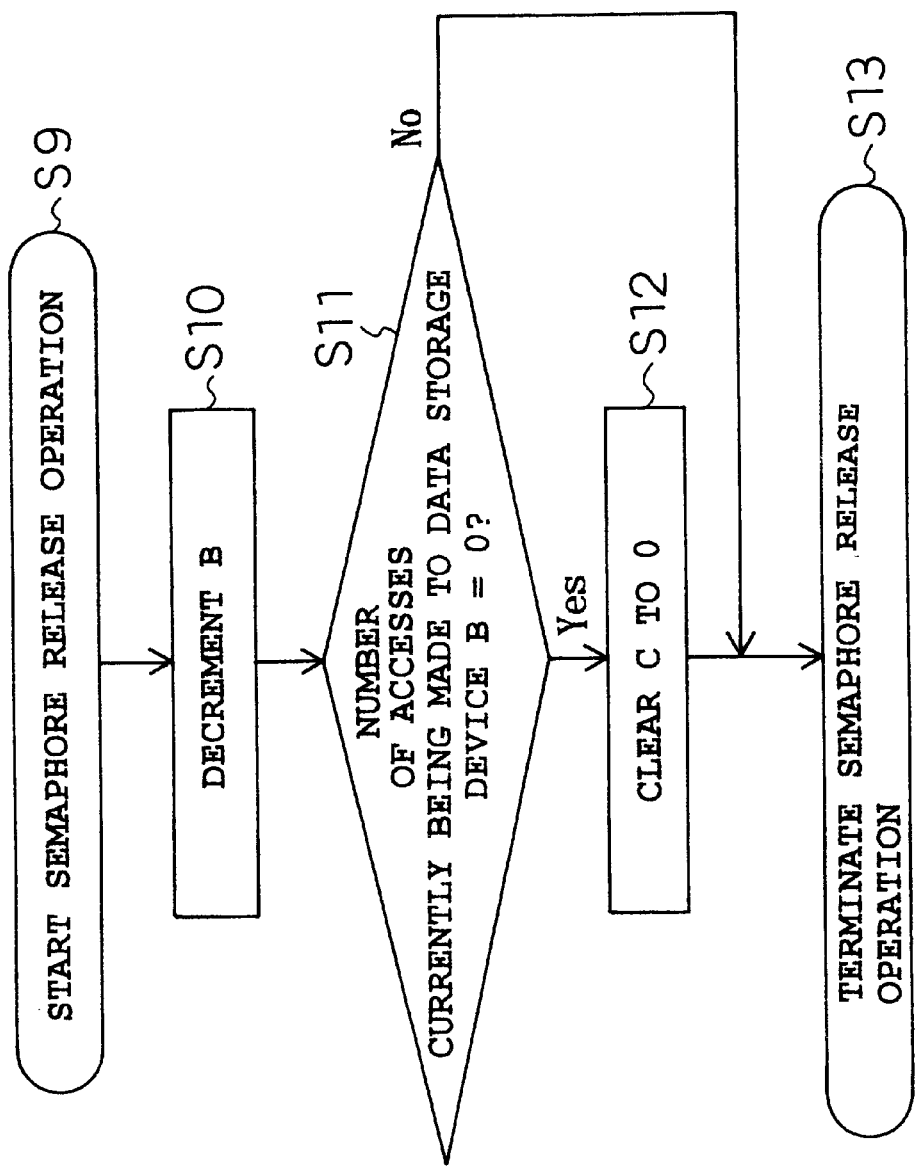
Figure 25:
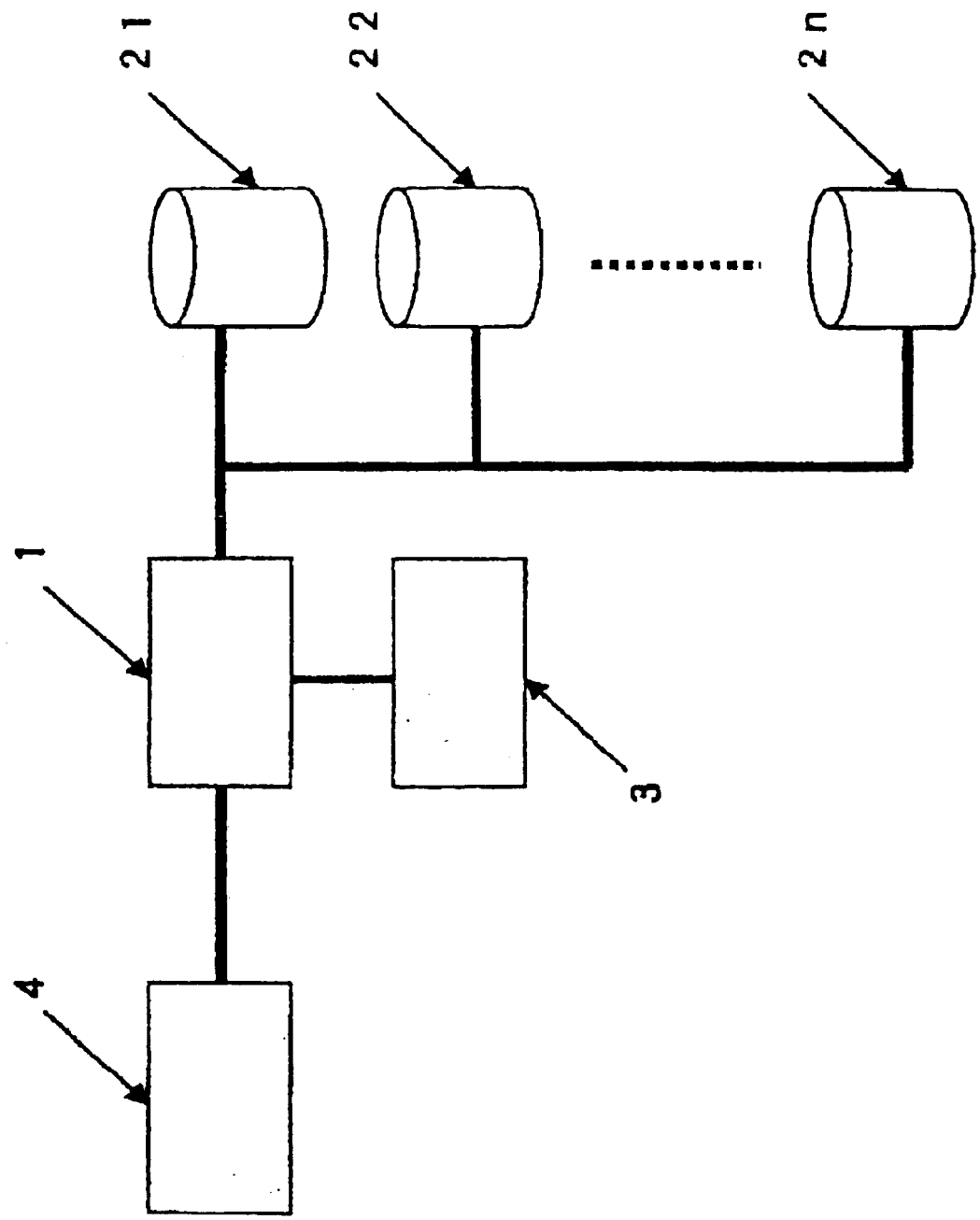
FIG. 25 is a schematic diagram showing the configuration of a data storage array system according to the prior art.
Figure 26A:
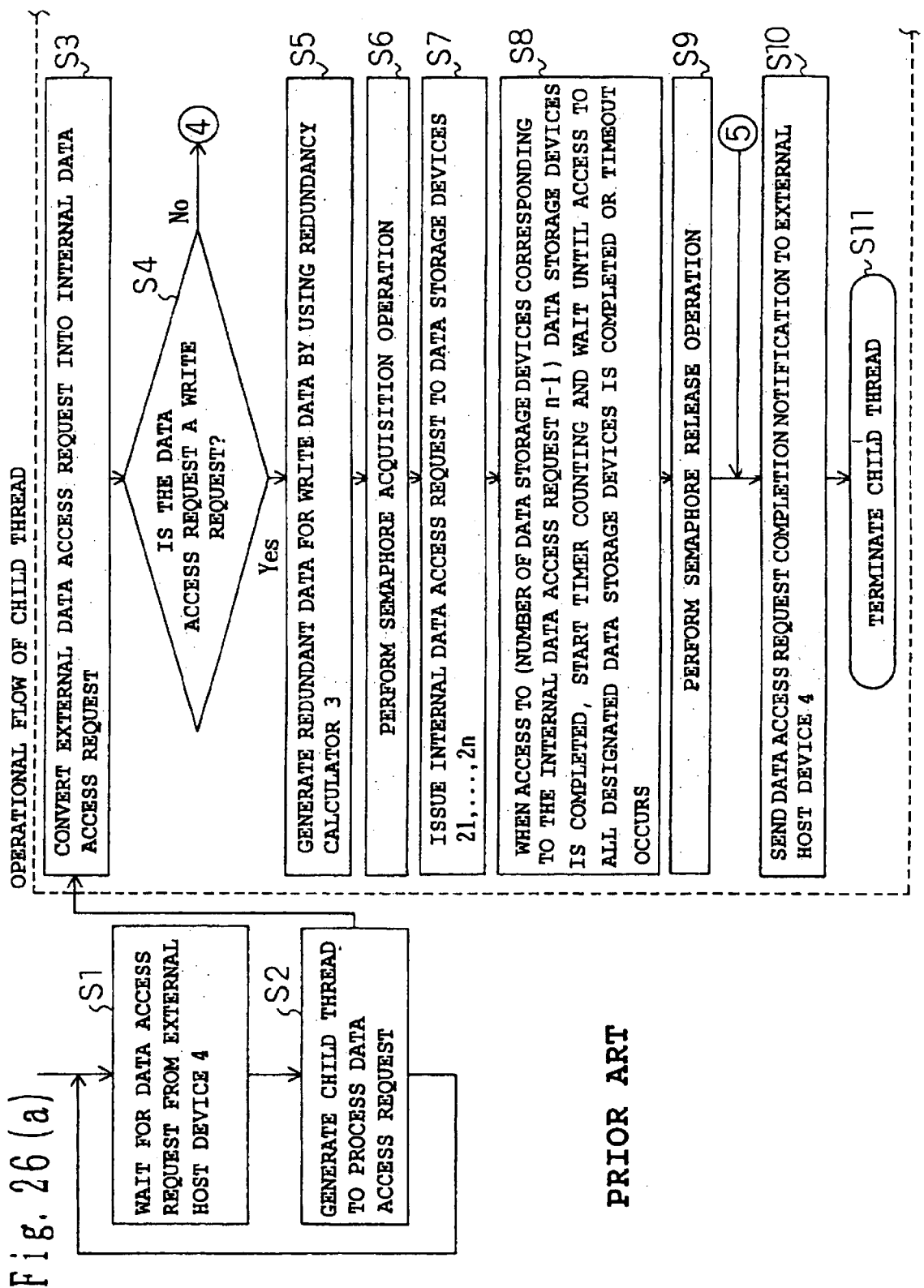
Figure 27:
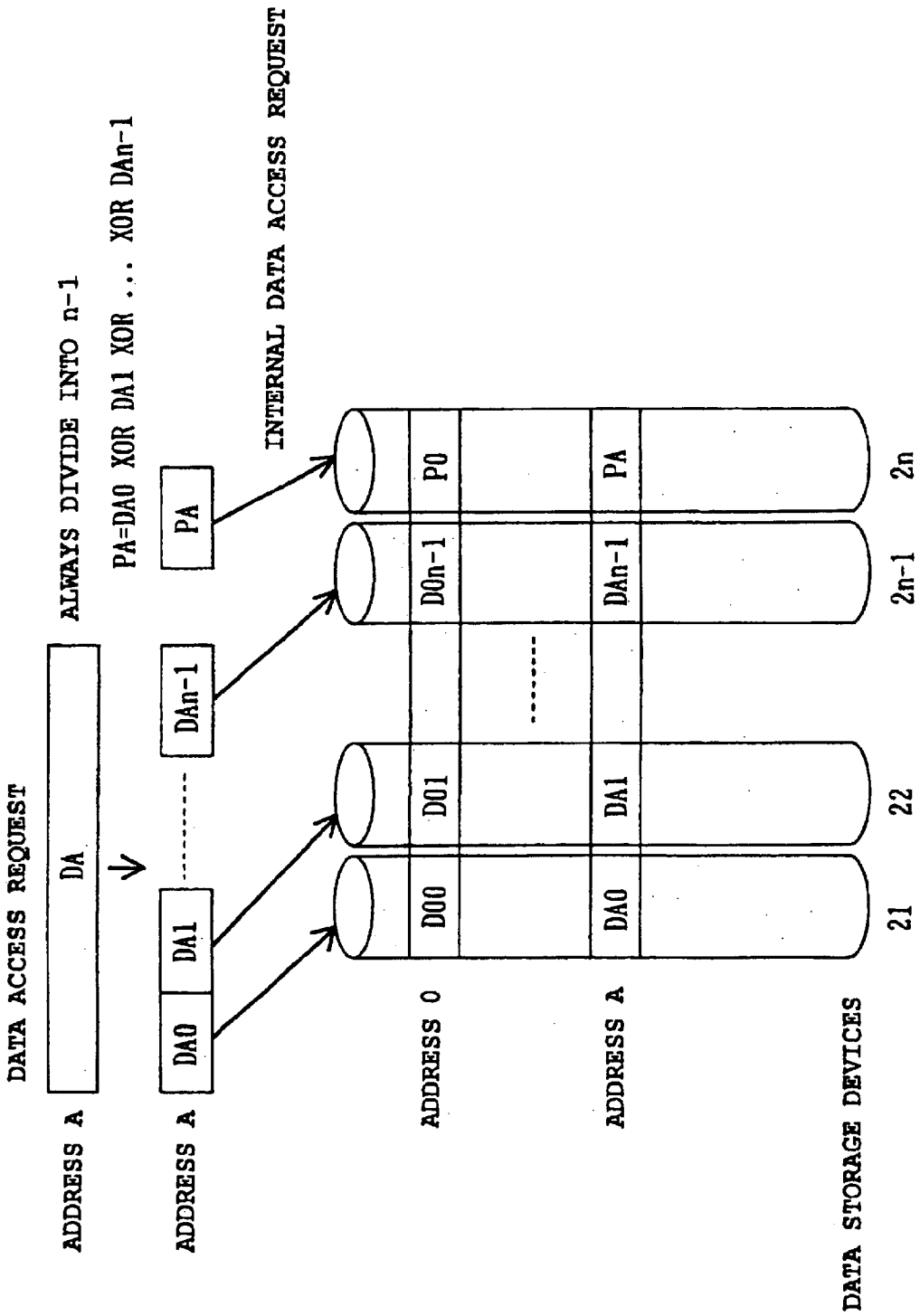
FIG. 27 is an operational flow diagram of a semaphore according to the prior art.
Figure 29:
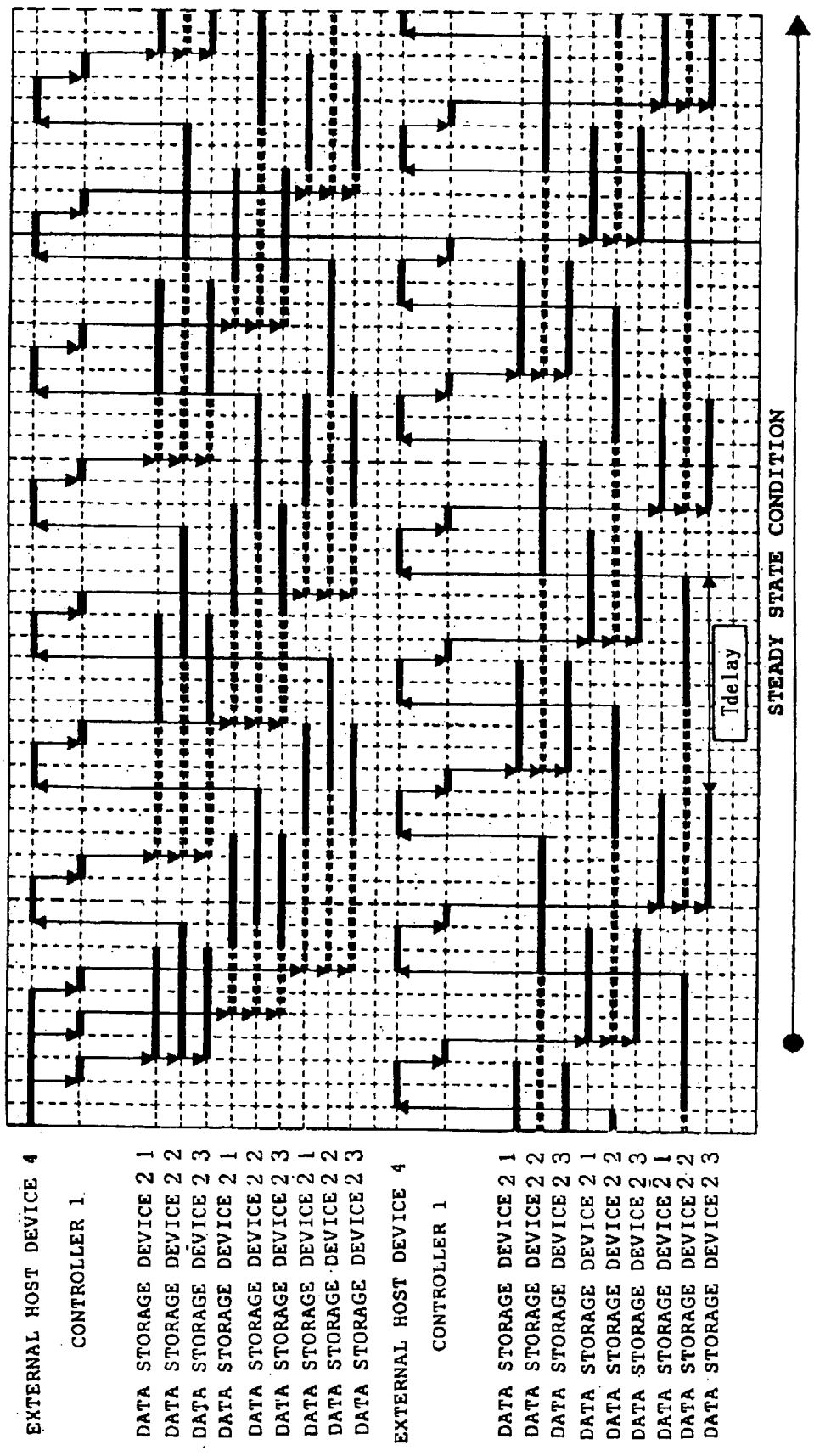
FIG. 29 is an operational chart of the data storage array system according to the prior art.

The details of the semaphore acquisition operation for acquiring access rights to the data storage devices 21 to 2n (S6, S12) and the semaphore release operation (S9, S15) in FIG. 25 are shown in FIGS. 16(a) and 16(b). A semaphore variable's structure is shown in FIG. 17. In the data storage array system of the fourth embodiment, there is only one semaphore variable's structure, and the semaphore variable's structure contains entries or areas for storing the maximum allowed number "A" of simultaneous accesses to the data storage devices 21 to 2n, the number "B" of accesses currently being made to the data storage devices 21 to 2n, and a flag "C" for inhibiting the access to the data storage devices 21 to 2n. The semaphore variable's structure is initialized during power up of the data storage array system of the fourth embodiment; that is, the maximum allowed number "A" of simultaneous accesses to the data storage devices 21 to 2n is set, and the number "B" of accesses currently being made to the data storage devices 21 to 2n and the flag "C" for inhibiting access to the data storage devices 21 to 2n are respectively cleared to zero.

The semaphore acquisition operation for acquiring access rights to the data storage devices 21 to 2n will be described below. When the semaphore acquisition operation for acquiring access rights to the data storage devices 21 to 2n is started (S1), if A>B and C=0 (S2, S3), B is incremented (S5). At this time, if A=B, C is set to 1 (S6, S7), allowing access to the data storage devices 21 to 2n, and the semaphore acquisition operation is terminated (S8). On the other hand, if A<B or C=1 (S2, S3), then the semaphore acquisition operation waits until C=0 (S4). What is important here is that even when A>B, if C=1, the semaphore acquisition operation waits until C=0.

Next, the semaphore release operation for releasing the access rights acquired to the data storage devices 21 to 2n will be described. The semaphore release operation is started to release the access rights acquired to the data storage devices 21 to 2n (S9), B is decremented (S10), and when B=0, C is cleared to 0 (S11, S12) and the semaphore release operation is terminated (S13).

Referring next to the operational chart of FIG. 18, a detailed description will be given by assuming the case where the maximum number of accesses A=3 and the number of data storage devices is 3 (n=3), and where the external host device 4 issues data access requests to the data storage array system of the fourth embodiment so that, at any instant in time, there are three data write access requests being processed in the data storage array system. It is assumed here that the data storage device 22 has a longer data access time than the other data storage devices 21 and 23.

Figure 18:
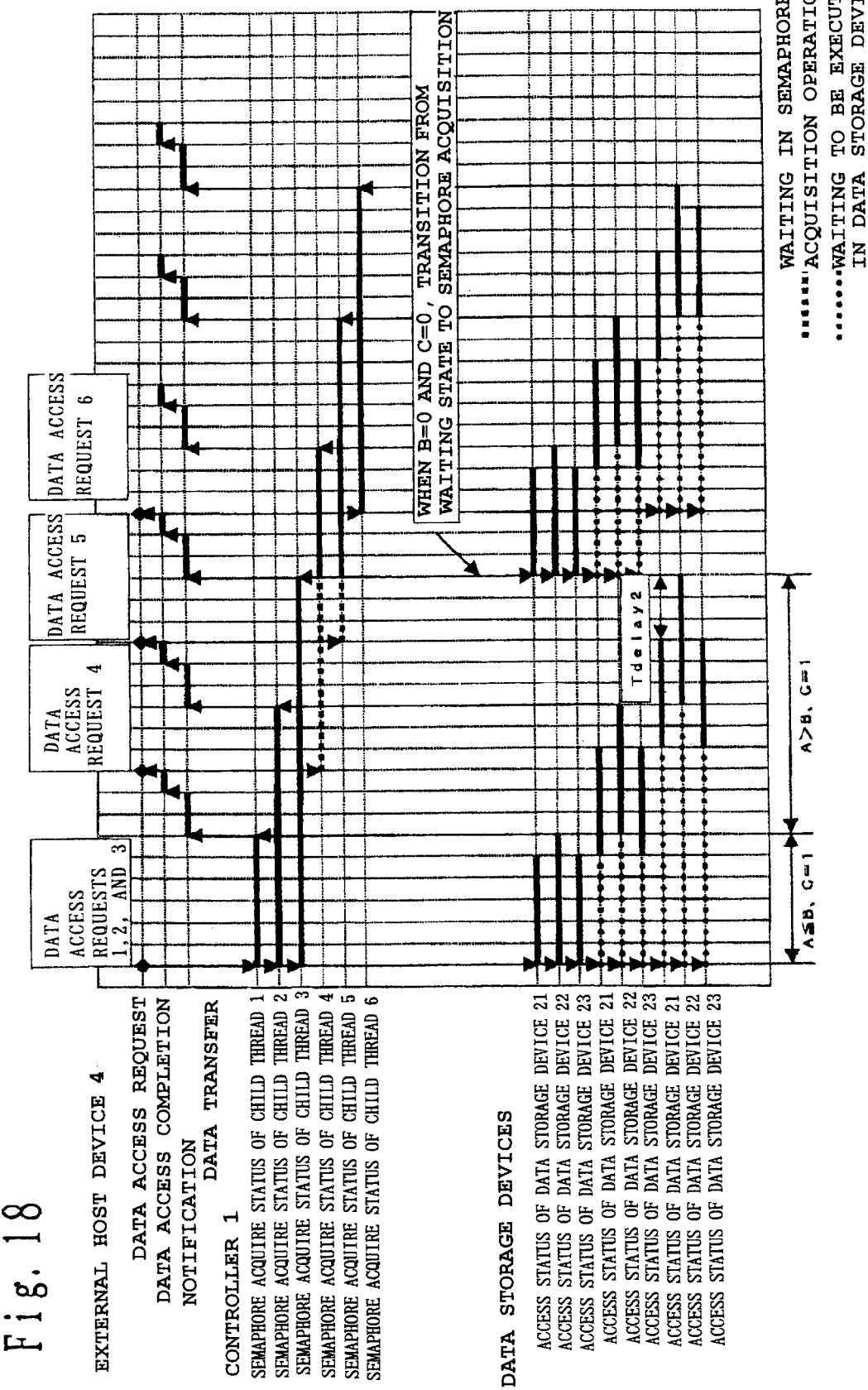
FIG. 18 is an operational chart illustrating read operations in a data storage array system according to the fourth embodiment of the present invention.

As shown in FIG. 18, the external host device 4 issues data access requests 1 to 3, and waits for the completion of the requested access. The controller 1 generates child threads 1 to 3 to process these data access requests. The child threads 1 to 3 respectively convert the data access requests 1 to 3 into internal data access requests 1 to 3, respectively, and perform the semaphore acquisition operation in the order stated (but in effect, simultaneously) to access the data storage devices 21 to 23. In the semaphore acquisition operation, since B<A, any of the child threads 1 to 3 can acquire access to the data storage devices 21 to 23. Here, when the child thread 3 has performed the semaphore acquisition operation, the number, B, of data access requests currently being executed on the data storage devices the access rights to which have been acquired by the semaphore becomes equal to A, whereupon the flag C for inhibiting access to the data storage devices 21 to 23 is set to 1.

The child threads 1 to 3 that have acquired the access rights to the data storage devices 21 to 23 by the semaphore acquisition operation issue the internal data access requests 1 to 3 to the data storage devices 21 to 23. Thereafter, when the internal data access request 1 to the data storage devices 21 to 23 is normally completed, the child thread 1 performs the semaphore release operation to release the access rights acquired to the data storage devices 21 to 23, and transfers the readout data to the external host device 4 along with a data access request completion notification 1.

Upon receiving the data access request completion notification 1, the external host device 4 issues a data access request 4.

In response to the data access request 4 received from the external host device 4, the controller 1 generates a child thread 4 to process the received request. The child thread 4 converts the request into an internal data access request 4, and performs the semaphore acquisition operation in order to access the data storage devices 21 to 23. In the semaphore acquisition operation, A>B, but since C=1, the semaphore acquisition operation waits until C=0.

Next, when the internal data access request 2 to the data storage devices 21 to 23 is normally completed, the child thread 2 performs the semaphore release operation to release the access rights acquired to the data storage devices 21 to 23, and transfers the readout data to the external host device 4 along with a data access request completion notification 2.

Upon receiving the data access request completion notification 2, the external host device 4 issues a data access request 5.

In response to the data access request 5 received from the external host device 4, the controller 1 generates a child thread 5 to process the received request. The child thread 5 converts the request into an internal data access request 5, and performs the semaphore acquisition operation in order to access the data storage devices 21 to 23. In the semaphore acquisition operation in the child thread 5, A>B, but since C=1, the semaphore acquisition operation waits until C=0.

Finally, when the internal data access request 3 to the data storage devices 21 to 23 is normally completed, the child thread 3 performs the semaphore release operation to complete the access to the data storage devices 21 to 23. At this time, B=0 and C=0, so that the child threads 4 and 5 waiting in the semaphore acquisition operation can now acquire access rights to the data storage devices 21 to 23.

After performing the semaphore release operation, the child thread 3 transfers the readout data to the external host device 4 along with a data access request completion notification 3, upon receiving which the external host device 4 issues a data access request 6.

By repeating the above-described operations, data access requests can be handled so as not to apply excessive load to the data storage devices 21 to 23, while at the same time, achieving synchronized operations of the data storage devices 21 to 23.

As shown in FIG. 18, the delay, Tdelay2, of the data storage device 22 with respect to the other data storage devices is expressed as $$Tdelay2=(Td-Tn)\times A$$

which is smaller than the Tdelay in the prior art example.

Since the synchronized operations can be achieved as described above, it becomes possible to substantially prevent operating time variations among the data storage devices from accumulating with time, which has been the problem with the prior art. Accordingly, in a RAID or like configuration where after issuing data access requests to (n−1) data storage devices, when no response is received from the last one data storage device within a predetermined time interval (a timeout error) the data supposed to be retrieved from that last one data storage device can be restored using redundancy, a shorter timeout interval than that employed in the prior art can be employed, offering an advantageous effect in ensuring real time processing of continuous media data such as moving image and voice data.

Embodiment 5

Figure 19:
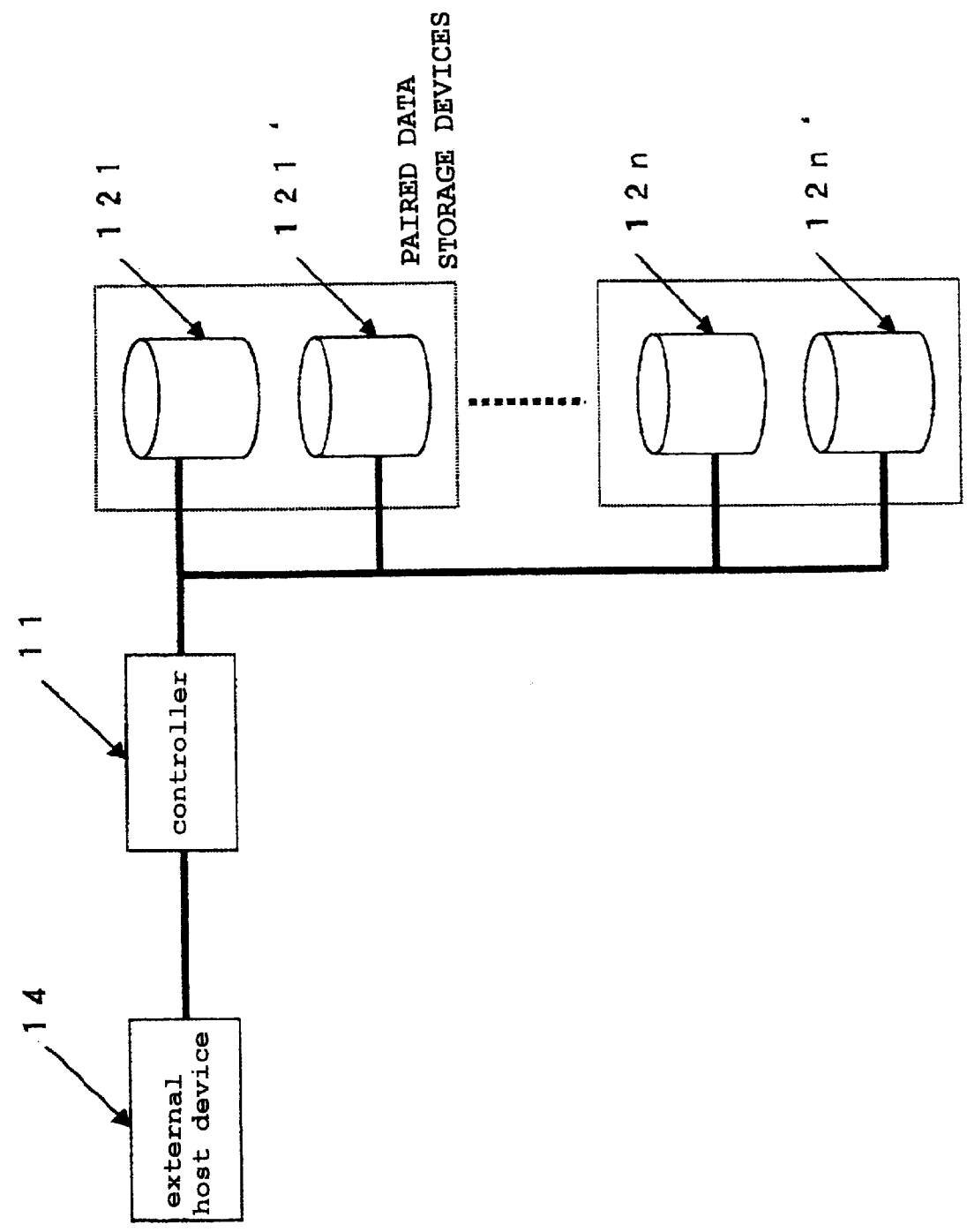
FIG. 19 is a schematic diagram showing the configuration of a data storage array system according to a fifth embodiment.
Figure 20A:
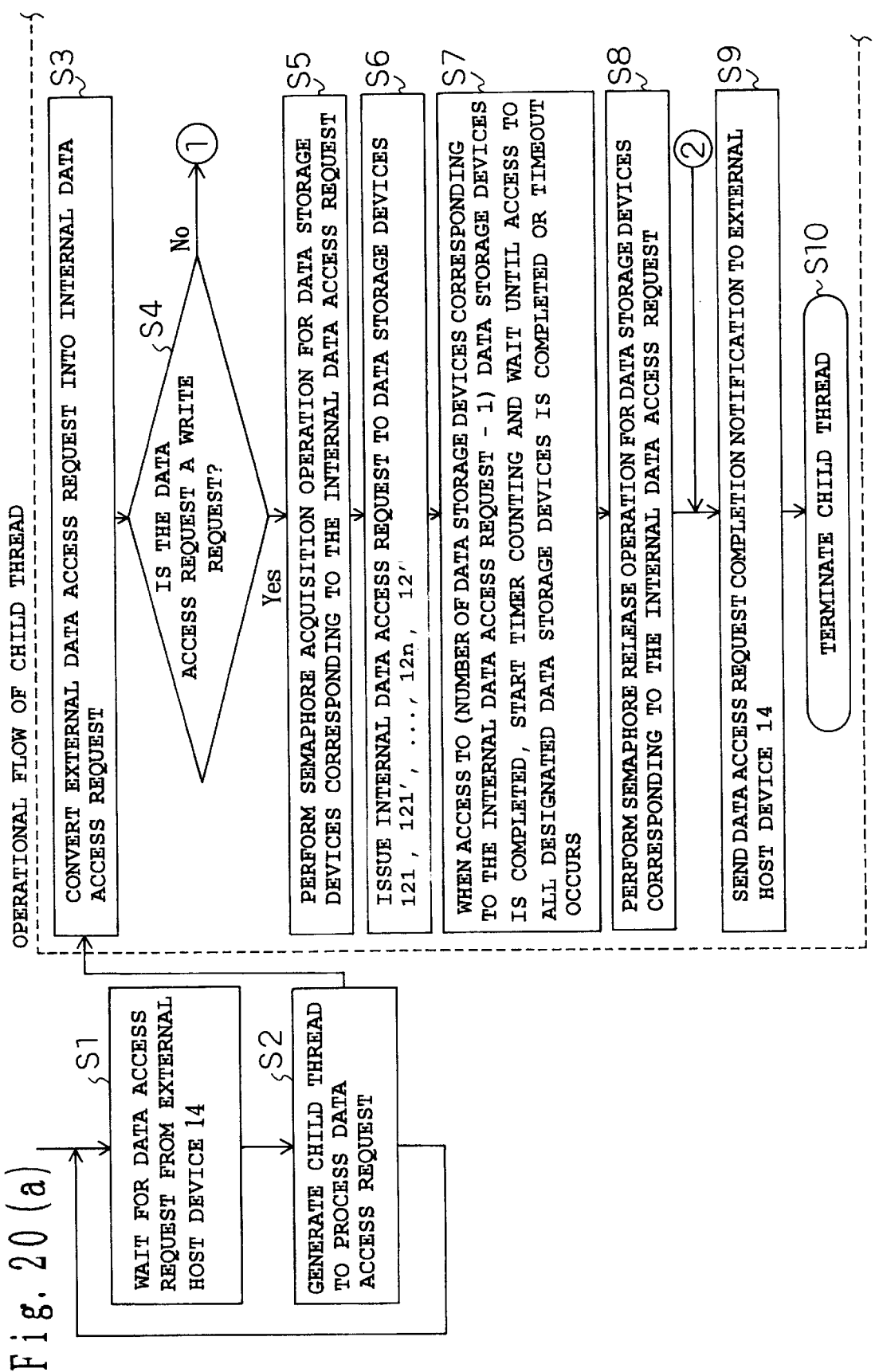
FIGS. 20(a) and 20(b) are operational flow diagrams of a controller 11 according to the fifth embodiment.
Figure 20B:
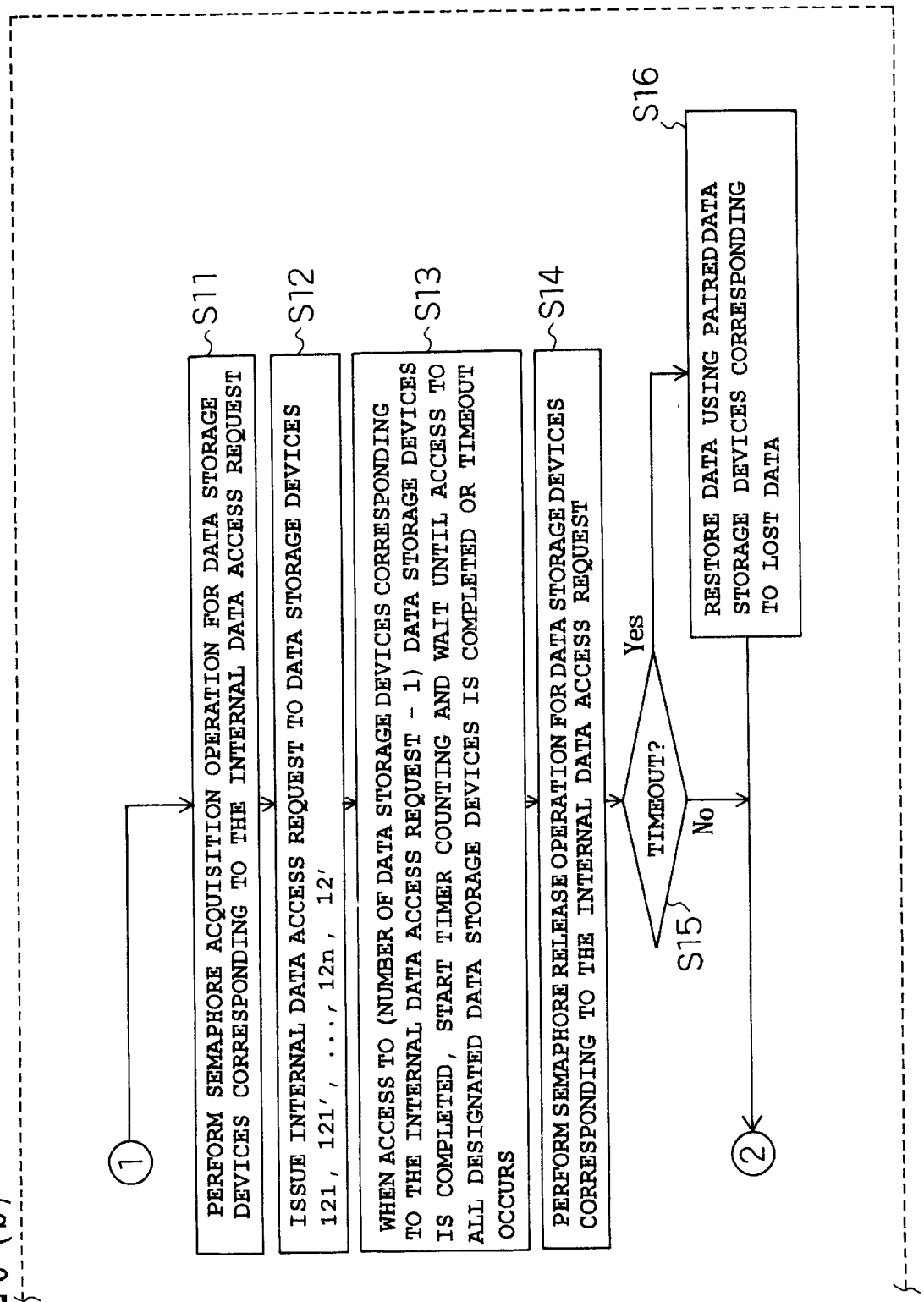

A data storage array system according to a fifth embodiment will be described by dealing with the case where the present invention is applied to a RAID 10 system in which several pairs of data storage devices, with data duplicated across paired storage devices, are constructed into an array. In the case of RAID 10, the data storage array system comprises a controller 11 and data storage devices 121, 121', . . . , 12n, 12n', as shown in the block diagram of FIG. 19. FIGS. 20(a) and 20(b) are operational flow diagrams of the controller 11 in the RAID 10 data storage array system. As in the case of the fourth embodiment, the following description is given based on the premise that the controller 11 is operating in a multi-threaded programming (multi-processing programming) environment, but the same operation may be implemented in hardware.

The controller 11 is a means that accepts a data access request from the external host device 14, converts it into an internal access request, issues the internal access request to the data storage devices 121, 121', ..., 12n, 12n', and sends a completion notification to the external host device 14 when the internal data access request issued to the data storage devices 121, 121', ... 12n, 12n' is completed or when a timeout occurs. The data storage devices 121, 121', ..., 12n, 12n' are means of storing data. Here, 12k, 12k' (k=1 to n) indicates a pair of data storage devices across which data is duplicated. The external host device 14 is a means of issuing data access requests.

Next, the operations performed by the controller 11 in response to an external data access request will be described in detail with reference to FIGS. 20(a) and 20(b).

Figure 21:
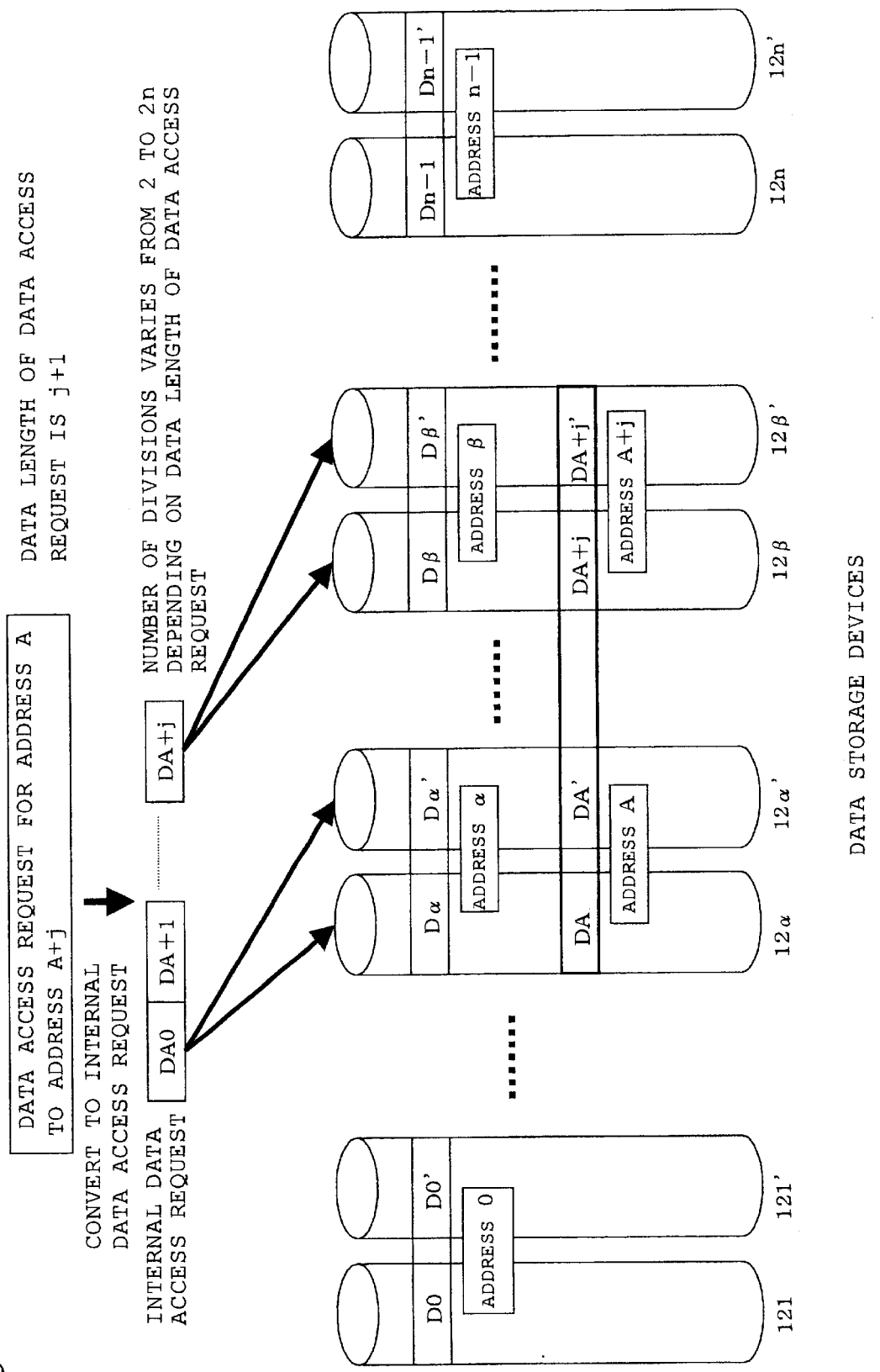
FIG. 21 is a diagram illustrating an external to internal data access conversion process in the data storage array system according to the fifth embodiment.

The controller 11 waits for a data access request from the external host device 14 (S1). When a data access request is received from the external host device 14, the controller 11 generates a child thread to process the data access request (S2). The data storage array system can thus accept a plurality of data access requests simultaneously (command queuing). In the generated child thread, the data access request is converted into an internal data access request (S3). In the case of RAID 10, the conversion to the internal data access request (S3) is performed so that the access data designated by the data access request is divided across n storage devices; the number of data storage devices used at this time varies depending on the access data length. FIG. 21 shows how the conversion to the internal data access request is accomplished. After S3, the controller 11 examines whether the data access request received from the external host device 14 is a read request or a write request (S4).

If the data access request received from the external host device 14 is a write request, the controller 11 acquires access rights only to the data storage devices 12α, 12α', ..., 12β, 12β' that correspond to the internal data access request by performing the semaphore acquisition operation, where α and β are arbitrary integers satisfying $0 \leq \alpha \leq \beta \leq n$ (S5) The controller 11, which has acquired the access rights only to the data storage devices 12α, 12α', ..., 12β, 12β'that correspond to the internal data access request, issues the internal data access request to the corresponding data storage devices 12α, 12α', ..., 12β, 12β'(S6). When access to (number of data storage devices corresponding to the internal data access request−1) data storage devices is completed, the controller 11 starts timer counting, and waits until access to all the designated data storage devices is completed or a timeout error occurs (S7). The controller 11 then performs the semaphore release operation (S8) to release the access rights acquired to the data storage devices 12α, 12α', ..., 12β, 12β' that correspond to the internal data access request. Finally, the controller 11 issues a data access completion notification to the external host device 14 (S9), and terminates the child thread (S10).

On the other hand, if, in S4, the data access request received from the external host device 14 is a read request, the controller 11 acquires access rights only to the data storage devices 12α, 12α', ..., 12β, 12β' that correspond to the internal data access request by performing the semaphore acquisition operation (S11). The controller 11, which has acquired in S11 the access rights only to the data storage devices 12α, 12α', ..., 12β, 12β' that correspond to the internal data access request, issues the internal data access request to the corresponding data storage devices 12α, 12α', ..., 12β, 12β'(S12). When access to (number of data storage devices corresponding to the internal data access request−1) data storage devices is completed, the controller 11 starts timer counting, and waits until access to all the designated data storage devices is completed or a timeout error occurs (S13). The controller 11 performs the semaphore release operation (S14) to release the access rights acquired to the data storage devices 12α, 12α', ..., 12β, 12β' that correspond to the internal data access request. Next, the controller 11 determines whether a timeout error or a read error has occurred in S13 (S15). If a timeout error or a read error has occurred, the controller 11 restores the data lost due to the error by using the corresponding storage device pair (S16). Finally, the controller 11 issues a data access completion notification to the external host device 14 (S9), and terminates the child thread (S10).

Next, the semaphore acquisition operation and semaphore release operation performed in the controller 11 will be described.

Figure 22:
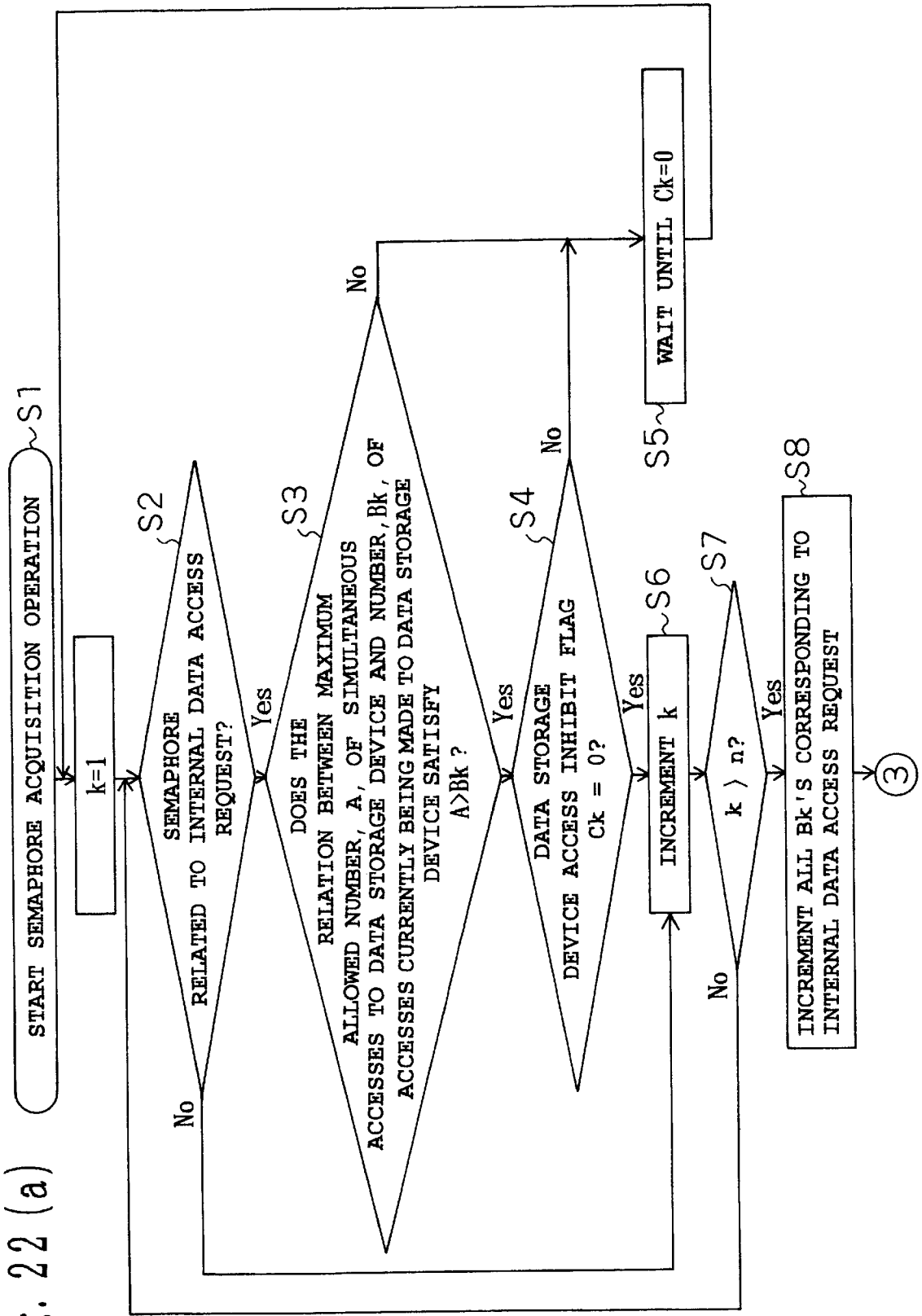
FIGS. 22(a), 22(b) and 22(c) are operational flow diagrams of a semaphore according to the fifth embodiment.
Figure 22:
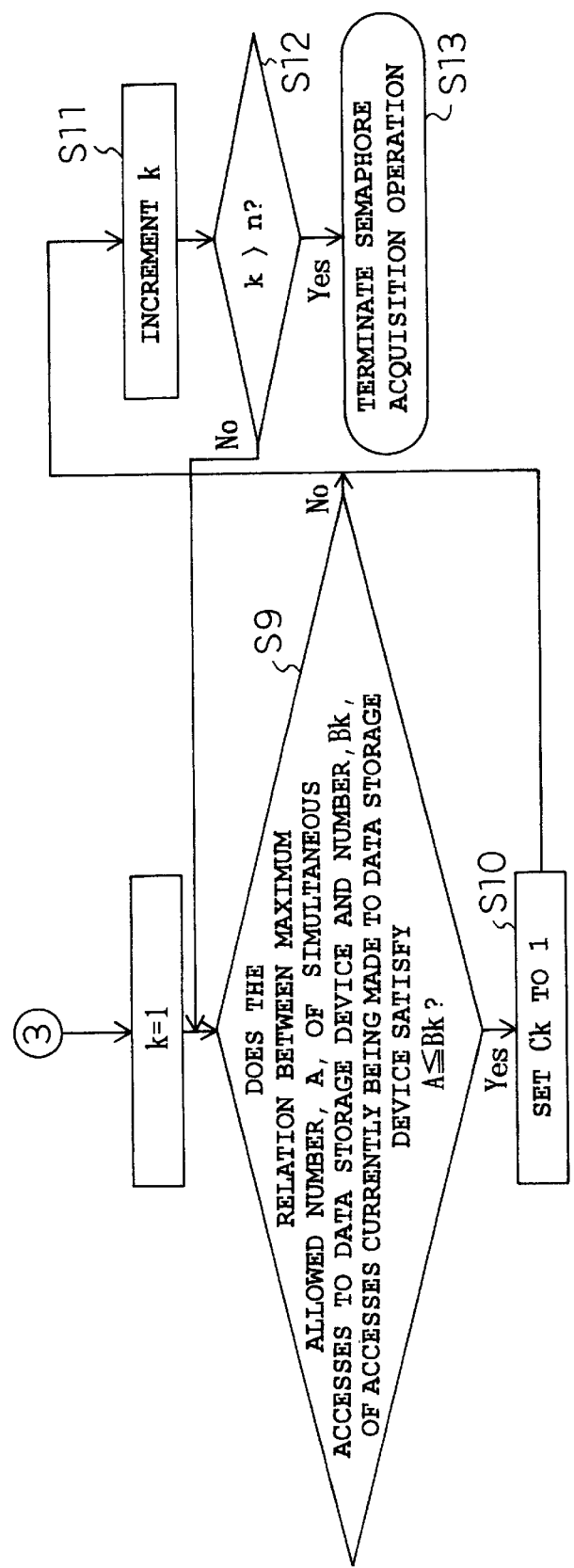
Figure 22:
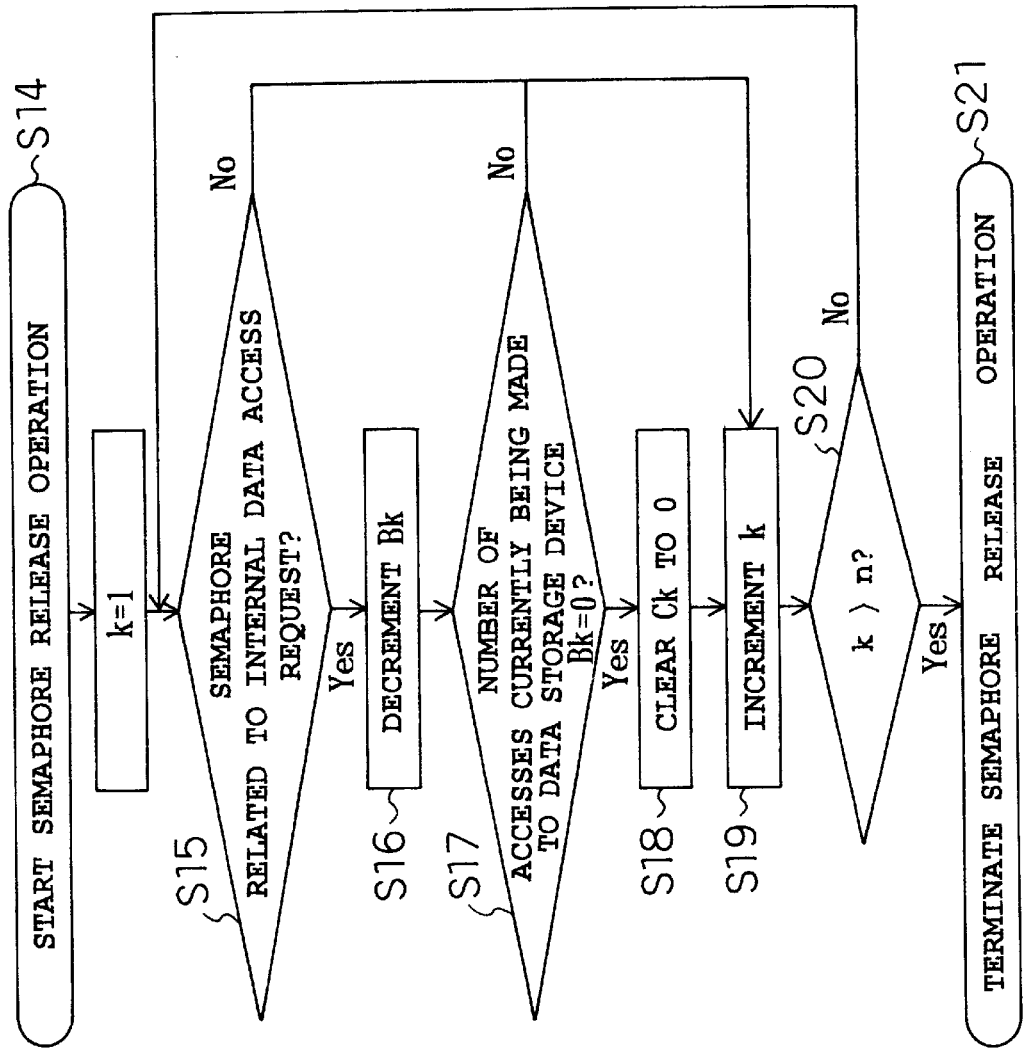
Figure 23:
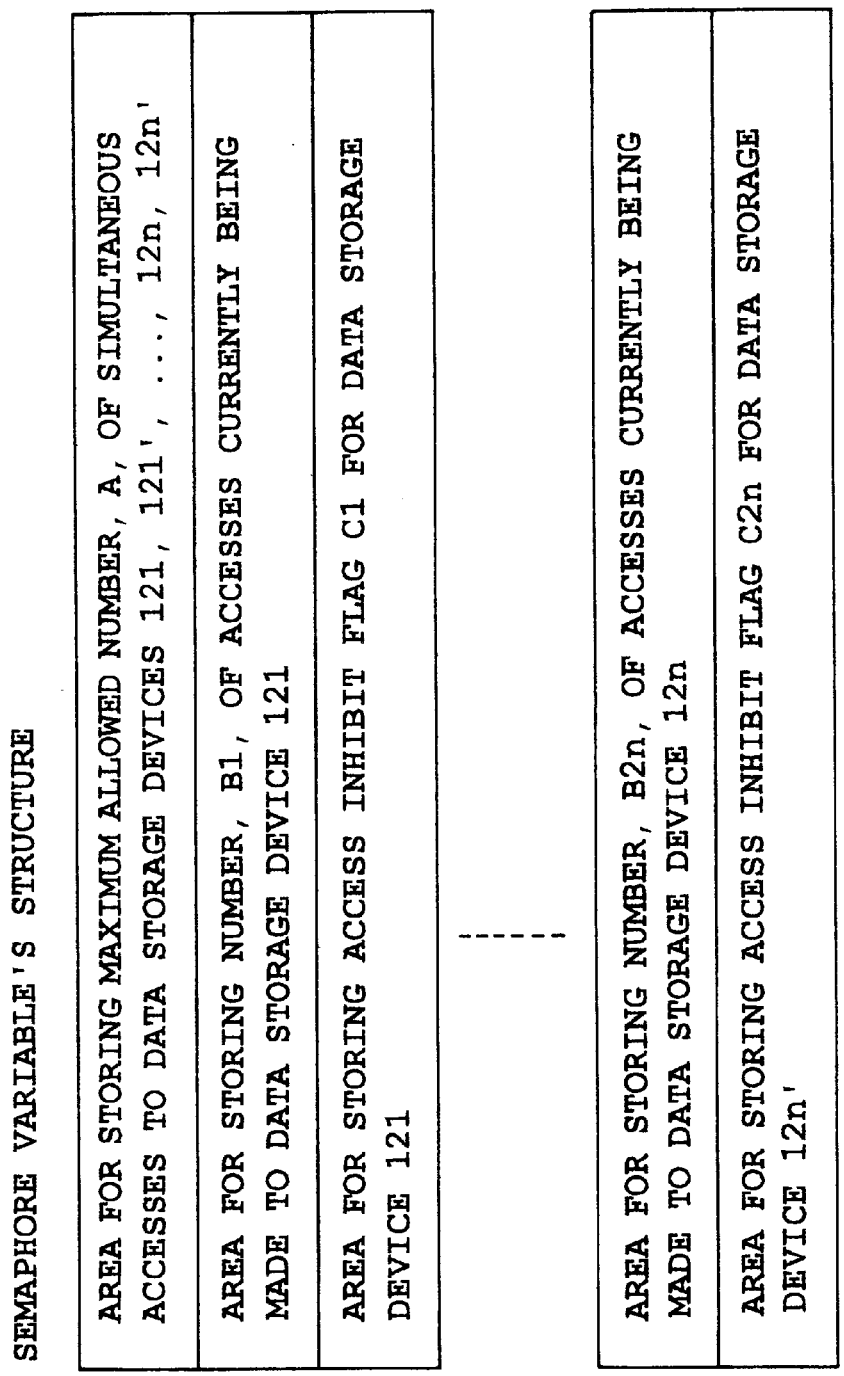
FIG. 23 is an explanatory diagram of a semaphore variable's structure according to the fifth embodiment.

The details of the semaphore acquisition operation for acquiring access rights to the data storage devices 12α, 12α', ..., 12β, 12β' (S5, S11) and the semaphore release operation for releasing the access rights acquired to the data storage devices 12α, 12α', ..., 12β, 12β' (S8, S14) in FIGS. 20(a) and 20(b) are shown in FIGS. 22(a), 22(b) and 22(c). A semaphore variable's structure is shown in FIG. 23. The semaphore variable's structure contains entries or areas for storing the maximum allowed number, A, of simultaneous accesses to the data storage devices 12α, 12α', ..., 12β, 12β', the numbers, B1 to B2n, of accesses currently being made to the respective data storage devices 12α, 12α', ..., 12β, 12β', and flags C1 to C2n for inhibiting access to the respective data storage devices 12α, 12α', ..., 12β, 12β'.

The semaphore variable's structure is initialized during power up of the data storage array system of the fifth embodiment; that is, the maximum allowed number, A, of simultaneous accesses to the data storage devices 121, 121', ..., 12n, 12n' is set, and the numbers, B1 to B2n, of accesses currently being made to the respective data storage devices 121, 121', ..., 12n, 12n' and the flags C1 to C2n for inhibiting access to the respective data storage devices 121, 121', ..., 12n, 12n' are respectively cleared to zero.

The semaphore acquisition operation for acquiring access rights to the data storage devices 12α, 12α', ..., 12β, 12β' that correspond to the internal data access request will be described below. When the semaphore acquisition operation for acquiring access rights to the data storage devices 12α, 12α', ..., 12β, 12β' that correspond to the internal data access request is started by initializing k to 1 (S1), it is determined whether the semaphore is one related to the internal data access request (S2) If A>Bk and Ck=0 (S3, S4) then k is incremented (S6) At this time, if k>n (S7), all Bk's corresponding to the internal data access request are incremented (S8), and Ck for which Bk≧A for all Bk's is set to 1 (S9, S10, S11, S12). After that, the semaphore acquisition operation is terminated (S13). If A≧Bk or Ck=1 (S3, S4), then the semaphore acquisition operation waits until Ck=0 (S5). What is important here is that even when A>Bk, if C=1 k, the semaphore acquisition operation waits until Ck=1.

Next, the semaphore release operation for releasing the access rights acquired to the data storage devices 12α, 12α', ..., 12β, 12β' that correspond to the internal data access request will be described below. The semaphore release operation for releasing the access rights acquired to the data storage devices 12α, 12α', ..., 12β, 12β' is started by initializing k to 1 (S14), and it is determined whether the semaphore is one related to the internal data access request (S15). Then, Bk is decremented (S16), and if Bk=0, then Ck is cleared to 0 (S17, S18). Then, k is incremented (S19) Here, it is determined whether the condition k>n is satisfied (S20), and if k>n, the semaphore release operation is terminated (S21).

Referring to the operational chart of FIG. 24, a detailed description will be given by assuming the case where the maximum number of accesses A is 3 and the number of data storage devices is 4 (n=4), and where the external host device 14 issues data access requests to the data storage array system of the fifth embodiment so that, at any instant in time, there are three data write access requests being processed in the data storage array system.

To simplify the explanation, A is set to 3 and n to 4, and it is assumed that the data storage device 121' has a longer data access time than the other data storage devices 121, 122, and 122'. It is also assumed that data access requests 1, 3, and 5 are issued for access to the data storage devices 121, 121', 122, and 122', while data access requests 2, 4, and 6 are issued for access only to the data storage devices 121 and 121'.

Figure 24:
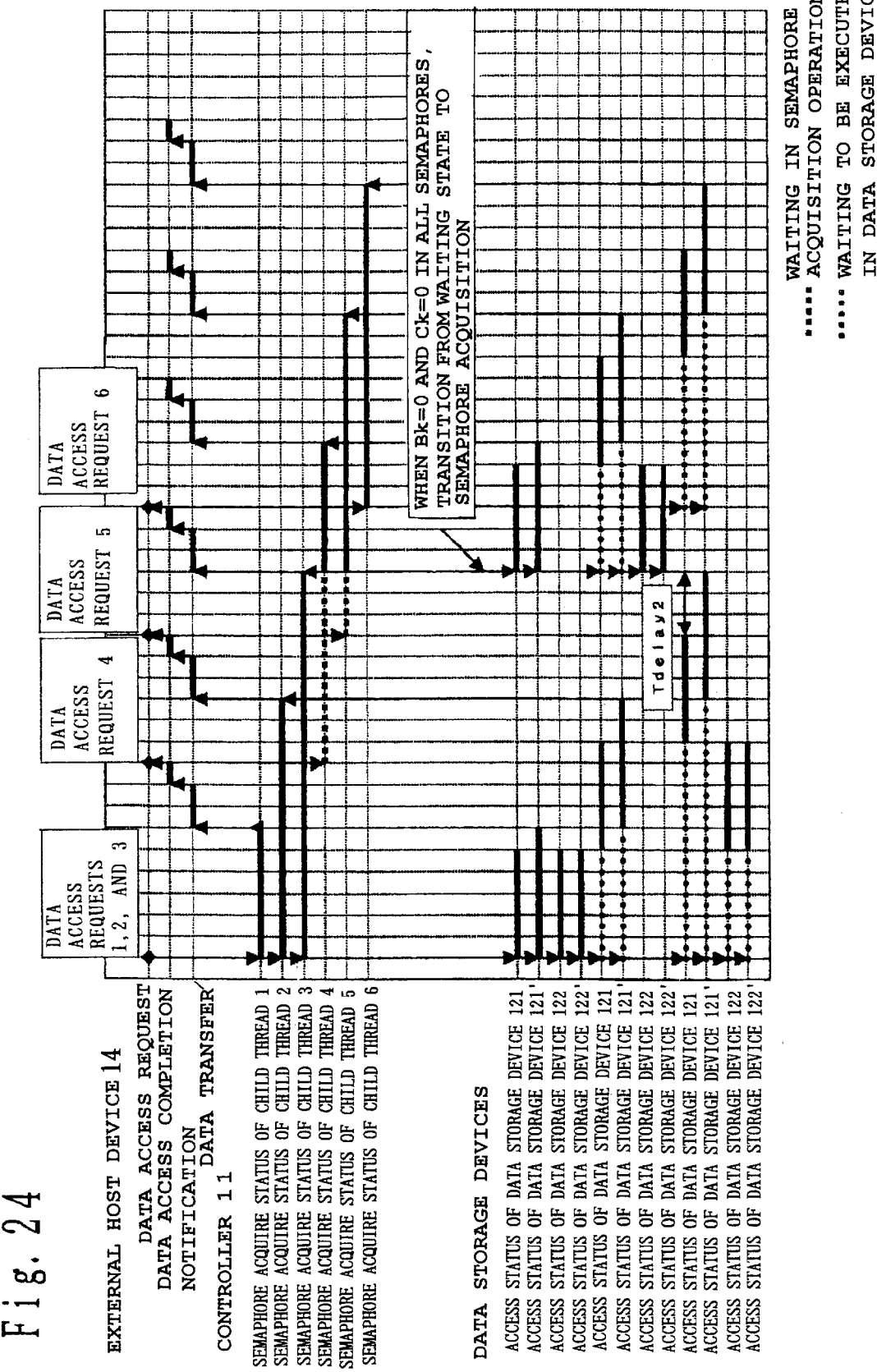
FIG. 24 is an operational chart of the data storage array system according to the fifth embodiment.

As shown in FIG. 24, the external host device 14 issues data access requests 1 to 3, and waits for the completion of the requested access. The controller 11 generates child threads 1 to 3 to process these data access requests.

The child threads 1 to 3 respectively convert the data access requests 1 to 3 into internal data access requests 1 to 3, respectively, and perform the semaphore acquisition operation in the order stated (but in effect, simultaneously) to access the data storage devices 121, 121', 122, and 122'. In the semaphore acquisition operation, since B1<A and B2<A and B3<A and B4<A, any of the child threads 1 to 3 can acquire access to the data storage devices 121, 121', 122, and 122'. When the child thread 3 has performed the semaphore acquisition operation, the numbers, B1 and B2, of accesses currently being made to the data storage devices 121 and 121' both become equal to A, that is, A=B1 and A=B2, whereupon the semaphore flag variables C1 and C2 for inhibiting access to the data storage devices 121 and 121' are set to 1.

The child threads 1 to 3 that have acquired the access rights to the data storage devices 121, 121', 122, and 122' by the semaphore acquisition operation issue the internal data access requests 1 to 3 to the data storage devices 121, 121', 122, and 122'.

Thereafter, when the internal data access request 1 to the data storage devices 121, 121', 122, and 122' is normally completed, the child thread 1 performs the semaphore release operation to release the access rights acquired to the data storage devices 121, 121', 122, and 122', and transfers the readout data to the external host device 14 along with a data access request completion notification 1. Upon receiving the data access request completion notification 1, the external host device 14 issues a data access request 4.

In response to the data access request 4 received from the external host device 14, the controller 11 generates a child thread 4 to process the received request. The child thread 4 converts the request into an internal data access request 4, and performs the semaphore acquisition operation in order to access the data storage devices 121 and 121'. In the semaphore acquisition operation, B1<A, B2<A, and B3<A, but since C1=1 and C2=1, the semaphore acquisition operation waits until C1=0 and C2=0.

Next, when the internal data access request 2 to the data storage devices 121 and 121' is normally completed, the child thread 2 performs the semaphore release operation to release the access rights acquired to the data storage devices 121 and 121', and transfers the readout data to the external host device 14 along with a data access request completion notification 2.

Upon receiving the data access request completion notification 2, the external host device 14 issues a data access request 5.

In response to the data access request 5 received from the external host device 14, the controller 11 generates a child thread 5 to process the received request. The child thread 5 converts the request into an internal data access request 5, and performs the semaphore acquisition operation in order to access the data storage devices 121, 121', 122, and 122'. In the semaphore acquisition operation in the child thread 5, B1<A, B2<A, and B3<A, but since C1=1 and C2=1, the semaphore acquisition operation waits until C1=0 and C2=0.

Finally, when the internal data access request 3 to the data storage devices 121, 121', 122, and 122' is normally completed, the child thread 3 performs the semaphore release operation to complete the access to the data storage devices 121, 121', 122, and 122'. At this time, since B1=0 and C1=0, and since B2=0 and C2=0, the child threads 4 and 5 waiting in the semaphore acquisition operation can now acquire access rights to the data storage devices 121, 121', 122, and 122'.

After performing the semaphore release operation, the child thread 3 transfers the readout data to the external host device 14 along with a data access request completion notification 3, upon receiving which the external host device 14 issues a data access request 6.

By repeating the above-described operations, data access requests can be handled so as not to apply excessive load to the data storage devices 121, 121', 122, and 122', while at the same time, achieving synchronized operations of the data storage devices 121, 121', 122, and 122'. Accordingly, the same effect as obtained in the fourth embodiment can be achieved.

Embodiment 6

Figure 30:
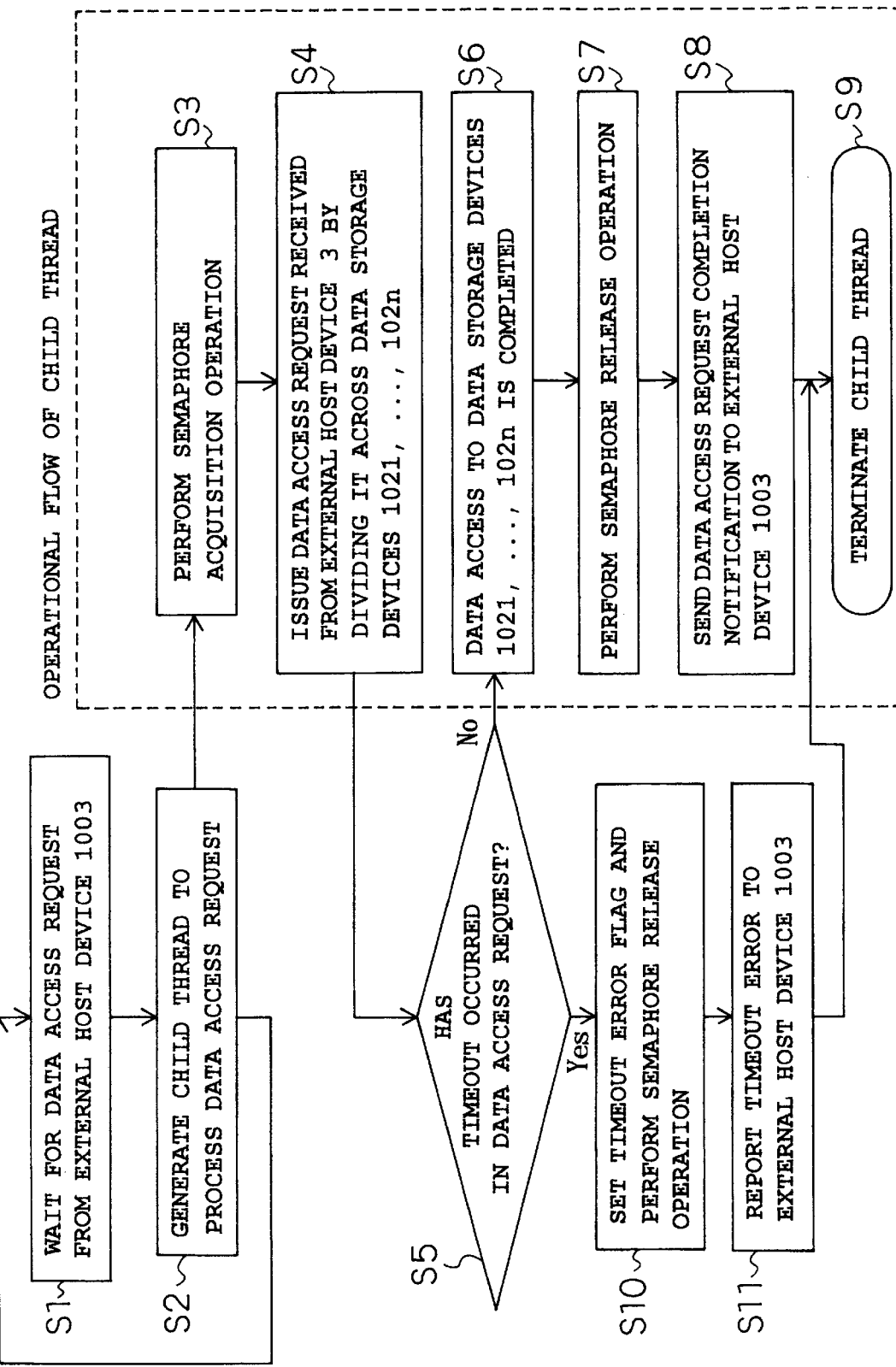
FIG. 30 is an operational flow diagram of a controller according to a sixth embodiment of the present invention.

Next, the configuration and operation of a data storage array system as one embodiment using the data processing control system of the invention will be described by referring primarily to FIG. 30 which illustrates the operational flow of the controller according to the present embodiment. While describing the operation of the data storage array system of this embodiment, one embodiment of a data processing control method according to the present invention will also be described.

The data storage array system of the present embodiment has the same configuration as the data storage array system of the second embodiment, but in the present embodiment, the controller 1001 first waits for a data access request from the external host device 1003 (S1), and then generates a child thread to process the data access request (S2). The controller 1001 then acquires access rights to n data storage devices 1021, ..., 102n by performing the semaphore acquisition operation (S3), issues the data access request received from the external host device 1003 by dividing it across the data storage devices 1021, ..., 102n (S4), and monitors the data storage devices 1021, ..., 102n by using a timer (S5); then, when the data access requests issued to the data storage devices 1021, ..., 102n are all completed without causing a timeout error (S6), the controller 1001 performs the semaphore release operation in the child thread (S7), sends a data access completion notification to the external host device 1003 (S8), and terminates the child thread (S9). If a timeout error occurs, a timeout (error) flag is set and the semaphore release operation in the child thread is performed (S10).

Figure 31:
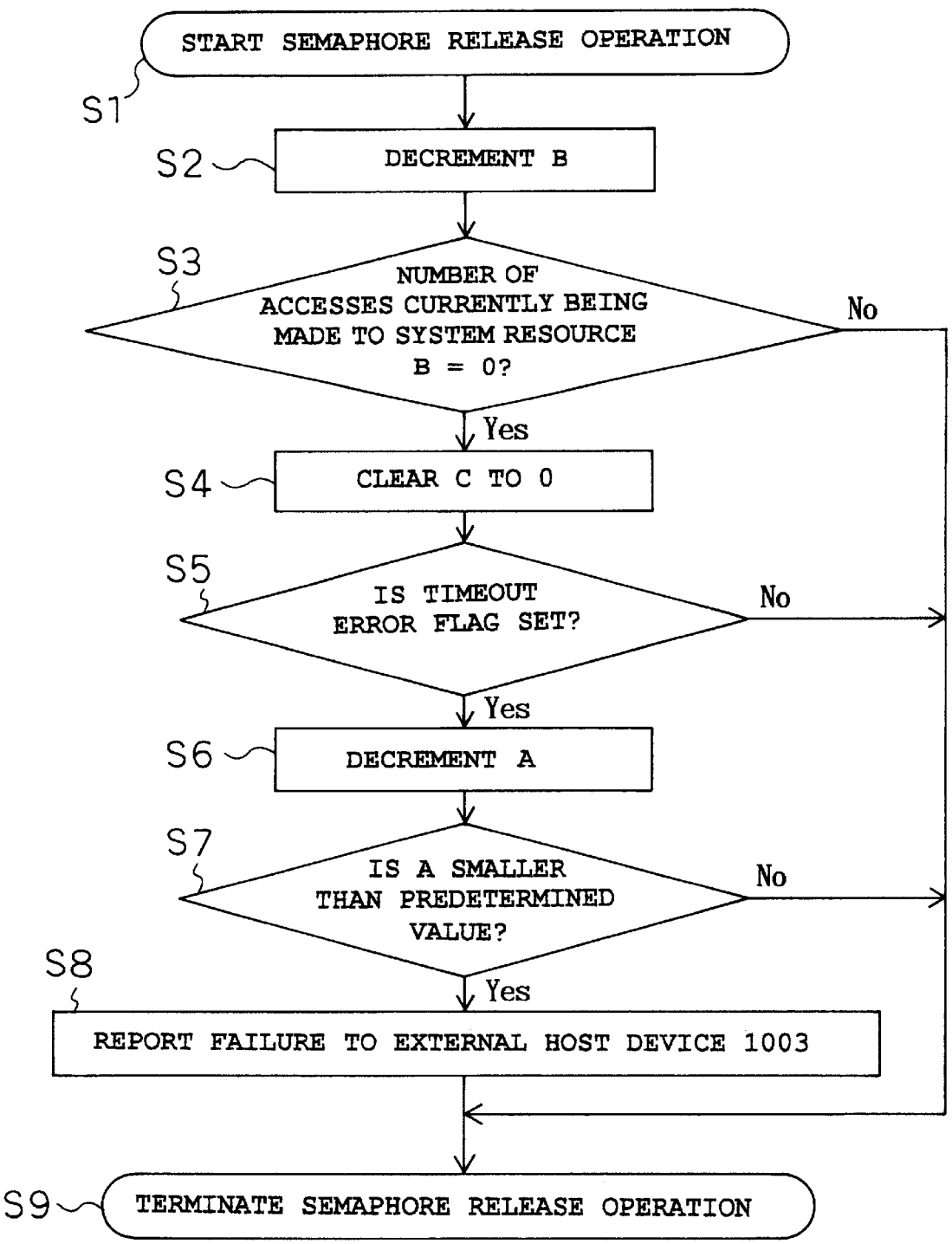
FIG. 31 is an operational flow diagram illustrating a semaphore release operation according to the sixth embodiment of the present invention.

The semaphore acquisition operation in S3 is the same as that described in the first embodiment, but the semaphore release operation in S10 differs. The semaphore release operation in S10 will be described below with reference to the operational flow of FIG. 31 which illustrates the semaphore release operation performed in the present embodiment.

When the semaphore release operation is started and B is decremented (S1, S2), if B becomes equal to 0, then C is cleared to 0 (S3, S4), and further, if the timeout flag is set, A is decremented (S5, S6). If A becomes smaller than a predetermined value, the external host device 1003 is notified of the failure of the data storage array system (S7, S8), and the semaphore release operation is terminated.

In this way, in the present embodiment, when a timeout occurs, control is performed to reduce the maximum number of accesses, A, and if A becomes smaller than a predetermined value, a system failure is reported.

In this way, command queuing can be implemented without applying excessive load to the data storage devices 1021, . . . , 102n. Further, when a timeout occurs, the maximum number of accesses, A, is dynamically reduced, thereby further reducing variations in operation among the data storage devices 1021, . . . , 102n.

The first to sixth embodiments of the invention have been described in detail above.

According to the first to fifth embodiments described above, the invention provides a data processing control system comprising a controller for receiving an instruction directing a data processing operation, and for causing the received instruction to be executed across a plurality of data processing devices, wherein the controller (1) sends every received instruction to the plurality of data processing devices until the number of instructions being executed or waiting to be executed by the plurality of data processing devices reaches a predetermined number, (2) does not send any received instructions to the plurality of data processing devices but holds the received instructions in a queue once the number of instructions being executed or waiting to be executed by the plurality of data processing devices has reached the predetermined number, and (3) when the number of instructions being executed or waiting to be executed by the plurality of data processing devices has become zero by completing the execution thereof, starts sending the queued instructions in sequence to the plurality of data processing devices, and continues to send the queued instructions or every newly received instruction to the plurality of data processing devices until the number of instructions being executed or waiting to be executed by the plurality of data processing devices reaches the predetermined number.

Alternatively, the invention provides a data processing control system comprising a controller for receiving an instruction directing a data processing operation, and for causing the received instruction to be executed across a plurality of data processing devices, wherein the controller (1) detects a difference in execution end timing of the instruction between designated two of the plurality of data processing devices across which the instruction is executed, (2) sends every received instruction to the plurality of data processing devices until the detected difference exceeds a prescribed limit, (3) does not send any received instructions to the plurality of data processing devices but holds the received instructions in a queue once the difference has exceeded the prescribed limit, (4) starts sending the queued instructions in sequence to the plurality of data processing devices when the number of instructions being executed or waiting to be executed by the plurality of data processing devices has become zero by completing the execution thereof, and (5) detects the difference again and continues to send the queued instructions or every newly received instruction to the plurality of data processing devices until the detected difference exceeds the prescribed limit.

The invention also includes a data processing control system comprising a controller for receiving an instruction directing a data processing operation, and for causing the received instruction to be executed across a plurality of data processing devices, wherein the controller (1) detects a difference in execution end timing of the instruction between designated two of the plurality of data processing devices across which the instruction is executed, (2) sends every received instruction to the plurality of data processing devices until the number of instructions being executed or waiting to be executed by the plurality of data processing devices reaches a predetermined number, (3) does not send any received instructions to the plurality of data processing devices but holds the received instructions in a queue once the number of instructions being executed or waiting to be executed by the plurality of data processing devices has reached the predetermined number, and (4) when the number of instructions being executed or waiting to be executed by the plurality of data processing devices has become zero by completing the execution thereof, starts sending the queued instructions in sequence to the plurality of data processing devices, and continues to send the queued instructions or every newly received instruction to the plurality of data processing devices until the number of instructions being executed or waiting to be executed by the plurality of data processing devices reaches the predetermined number, and wherein the predetermined number is varied according to the detected difference.

The data processing operation according to the invention may be (1) a data write operation for writing data containing redundant data which is used to restore data based on successfully readout data when data cannot be read correctly from any one of the plurality of data processing devices, or (2) a data read operation for reading data containing redundant data which is used to restore data based on successfully readout data when data cannot be read correctly from any one of the plurality of data processing devices, or (3) a data write operation for writing data redundantly so that data can be restored in case data cannot be read correctly from any one of the plurality of data processing devices (the plurality of data processing devices are arranged in two or more pairs for writing data redundantly).

In a preferred mode of the invention, the controller determines that a data access delay error has occurred on one of the plurality of data processing devices (1) when the difference is detected again, and the number of the queued or newly received instructions issued until the detected difference exceeds the prescribed limit becomes smaller than a predetermined threshold value, or (2) when the predetermined number which is varied according to the detected difference becomes smaller than a predetermined threshold value.

The invention also provides a program for causing a computer to carry out the functions of all or part of the means (or devices, elements, circuits, blocks, etc.) of the data processing control system or the controller of the invention described above, and the program operates in collaboration with the computer. The computer of the invention described above is not limited to pure hardware such as a CPU, but may include firmware, an OS, or even a peripheral device.

The invention also provides a program for causing a computer to carry out the operations in all or part of the steps (or processes, operations, effects, etc.) of the data control processing method of the invention described above, and the program operates in collaboration with the computer.

Here, part of the means (or devices, elements, circuits, blocks, etc.) of the invention and part of the steps (or processes, operations, effects, etc.) of the invention refer to some of the plurality of means or steps, or some of the functions or operations in one of the means or steps.

Further, some of the devices (or elements, circuits, blocks, etc.) of the invention refer to some of the plurality of devices, or some of the means (or elements, circuits, blocks, etc.) in one of the devices, or some of the functions in one of the means.

A computer readable recording medium with the program of the invention recorded thereon is also included in the present invention. In one utilization mode of the program of the invention, the program is recorded on a recording medium readable by a computer, and is operated in collaboration with the computer. In another utilization mode of the program of the invention, the program is transmitted through a transmission medium, is read by a computer, and is operated in collaboration with the computer. The recording medium includes a ROM or the like, and the transmission medium includes a transmission medium such as the Internet, light waves, radio waves, or sound waves.

The configuration of the invention may be implemented in software or in hardware.

The invention also provides a medium having a program recorded thereon for causing a computer to carry out all or some of the functions of all or some of the means of the data processing control system or the controller of the invention described above, wherein the program readable by the computer is read by the computer and carries out the functions in collaboration with the computer.

The invention further provides a medium having a program recorded thereon for causing a computer to carry out all or some of the operations in all or some of the steps of the data processing control method of the invention described above, wherein the program readable by the computer is read by the computer and carries out the operations in collaboration with the computer.

As described above, the present invention concerns, for example, a data storage array system comprising a plurality of data storage devices and a controller for controlling the data storage devices, wherein the controller manages access instructions to the plurality of data storage devices as access instruction groups, and executes data access by issuing the access instruction groups to the plurality of data storage devices, and wherein when the number of access instruction groups the executions of which have been started but not yet completed on the plurality of data storage devices is designated as the number of groups being executed, the controller permits the issuing of the access instruction groups until the number of groups being executed reaches a predetermined number and, once the number of groups being executed has reached the predetermined number, the controller holds off issuing new access instruction groups to the plurality of data storage devices until the number of groups being executed becomes zero.

The invention also concerns, for example, a data storage array system comprising a plurality of data storage devices and a controller for controlling the data storage devices, wherein the controller receives externally issued data access instructions, converts the data access instructions into internal access instructions to the plurality of data storage devices in accordance with a prescribed algorithm and manages them as internal access instruction groups, and executes data access by issuing the internal access instruction groups to the plurality of data storage devices, and wherein when the number of internal access instruction groups the executions of which have been started but not yet completed on the plurality of data storage devices is designated as the number of groups being executed, the controller permits the issuing of the internal access instruction groups until the number of groups being executed reaches a predetermined number and, once the number of groups being executed has reached the predetermined number, the controller holds off issuing new internal access instruction groups to the plurality of data storage devices until the number of groups being executed becomes zero.

Further, the present invention concerns, for example, a data storage array system comprising a plurality of data storage devices and a controller for controlling the data storage devices, wherein the controller manages access instructions to at least one of the data storage devices as an access instruction group, and executes data access by issuing the access instruction group to the at least one data storage device, and wherein when the number of the access instruction group the executions of which have been started but not yet completed on the at least one data storage device by the access instruction group is designated as the number of instructions being executed, the controller permits the issuing of the access instruction group when the number of instructions being executed on any data storage device belonging to the access instruction group does not reach a predetermined number and, once the number of instructions being executed on any one of the data storage devices belonging to the access instruction group has reached the predetermined number, the controller holds off issuing new access instruction groups until the number of instructions being executed on every one of the data storage devices belonging to the access instruction group becomes zero.

The invention also concerns, for example, a data storage array system comprising a plurality of data storage devices and a controller for controlling the data storage devices, wherein the controller converts externally issued data access instructions into internal access instructions to at least one of the data storage devices and manages them as an internal access instruction group, and executes data access by issuing the internal access instruction group to the at least one data storage device, and wherein when the number of internal access instructions the executions of which have been started but not yet completed on the at least one data storage device by the internal access instruction group is designated as the number of instructions being executed, the controller permits the issuing of the internal access instruction group when the number of instructions being executed on any data storage device belonging to the internal access instruction group does not reach a predetermined number and, once the number of instructions being executed on any one of the data storage devices belonging to the internal access instruction group has reached the predetermined number, the controller holds off issuing new access instruction groups until the number of instructions being executed on every one of the data storage devices belonging to the access instruction group becomes zero.

The number of instructions being executed may also mean the number of internal access instructions the executions of which have been started but not yet completed on the at least one data storage device or for any one of which a timeout error has not occurred.

Further, the invention concerns, for example, a data storage array system comprising a plurality of data storage devices and a controller for controlling the data storage devices, wherein the controller receives data access instructions from an external device to the plurality of data storage devices, converts the data access instructions into internal access instructions in accordance with a prescribed algorithm and manages them as internal access instruction groups, and executes data access by issuing the internal access instruction groups to the plurality of data storage devices, the controller including a means of generating redundant data in a redundant group corresponding to write data in accordance with an externally issued write instruction and for storing the write data and redundant data on the plurality of data storage devices, and means of externally supplying readout data by restoring data as far as possible from successfully readout data and redundant data when a timeout has occurred or data reading has failed on one or more of the plurality of data storage devices during data reading in accordance with an externally issued read instruction, and wherein when the number of internal access instruction groups the executions of which have been started but not yet completed on the plurality of data storage devices, or for any one of which a timeout has not occurred, is designated as the number of groups being executed, the controller permits the issuing of the internal access instruction groups until the number of groups being executed reaches a predetermined number and, once the number of groups being executed has reached the predetermined number, the controller holds off issuing new internal access instruction groups to the plurality of data storage devices until the number of groups being executed becomes zero.

The invention also concerns, for example, a data storage array system comprising a plurality of data storage devices and a controller for controlling the data storage devices, wherein the controller receives data access instructions from an external device to the plurality of data storage devices the number of which is a multiple of 2, converts the data access instructions into internal access instructions to the two or multiples of 2 data storage devices in accordance with a prescribed algorithm and manages them as internal access instruction groups, and executes data access by issuing the internal access instruction groups to the plurality of data storage devices, the controller including a means of writing data by duplicating it across the plurality of data storage devices in accordance with an externally issued write instruction, and a means of externally supplying readout data by restoring data from duplicated data read out of normally operating data storage devices when a timeout has occurred or data reading has failed on one or more of the plurality of data storage devices during data reading in accordance with an externally issued read instruction, wherein the controller converts externally issued data access instructions into internal access instructions to at least one of the data storage devices and manages them as an internal access instruction group, and executes data access by issuing the internal access instruction group to the at least one data storage device, and wherein when the number of internal access instructions the executions of which have been started but not yet completed on the at least one data storage device by the internal access instruction group is designated as the number of instructions being executed, the controller permits the issuing of the internal access instruction group when the number of instructions being executed on any data storage device belonging to the internal access instruction group does not reach a predetermined number and, once the number of instructions being executed on any one of the data storage devices belonging to the internal access instruction group has reached the predetermined number, the controller holds off issuing new access instruction groups until the number of instructions being executed on every one of the data storage devices belonging to the access instruction group becomes zero.

When the externally issued data access instruction is a write instruction, the controller may notify the external device of the completion of the write instruction the moment that the issuing of the internal access instruction group is permitted.

As described above, according to the present invention, since access rights to the system are controlled by performing the semaphore acquisition operation just before accessing the system resources, and the semaphore release operation upon completion of the access to the system resources, in the same manner as in the prior art, the method can be quite easily implemented in software.

Furthermore, since the system is constructed so as to prevent excessive load from being applied to the system resources and avoid the state in which data access requests are being issued to the system resources at any instant in time, synchronized operations of the system resources can be accomplished. Accordingly, in a RAID system for recording continuous media data that requires real time processing, the timeout interval can be set shorter than that in the prior art. Since a data storage array system suitable for continuous media data and capable of reducing the data access time can be constructed, its practical advantage is enormous.

The entire disclosure of the above document is incorporated herein by reference in its entirety.

As is apparent from the above description, the present invention has the advantage of being able to provide a data processing control system that can implement command queuing, for example, for a plurality of data processing devices, enhance the failure prediction/detection accuracy, and appropriately handle continuous media data, etc., and to also provide a data processing control method, a medium, and an information set for use with such a data processing control system.

What is claimed is:

1. A data processing control system comprising a controller for receiving an instruction directing a data processing operation, and for causing said received instruction to be executed across a plurality of data processing devices, wherein
said controller (1) sends every received instruction to said plurality of data processing devices until the number of instructions being executed or waiting to be executed by said plurality of data processing devices reaches a predetermined number, (2) does not send any received instructions to said plurality of data processing devices but holds said received instructions in a queue once the number of instructions being executed or waiting to be executed by said plurality of data processing devices has reached said predetermined number, and (3) when the number of instructions being executed or waiting to be executed by said plurality of data processing devices has become zero by completing the execution thereof, starts sending said queued instructions in sequence to said plurality of data processing devices, and continues to send said queued instructions or every newly received instruction to said plurality of data processing devices until the number of instructions being executed or waiting to be executed by said plurality of data processing devices reaches said predetermined number.

2. A data processing control system comprising a controller for receiving an instruction directing a data processing operation, and for causing said received instruction to be executed across a plurality of data processing devices, wherein said controller (1) detects a difference in execution end timing of said instruction between designated two of said plurality of data processing devices across which said instruction is executed, (2) sends every received instruction to said plurality of data processing devices until said detected difference exceeds a prescribed limit, (3) does not send any received instructions to said plurality of data processing devices but holds said received instructions in a queue once said difference has exceeded said prescribed limit, (4) starts sending said queued instructions in sequence to said plurality of data processing devices when the number of instructions being executed or waiting to be executed by said plurality of data processing devices has become zero by completing the execution thereof, and (5) detects said difference again and continues to send said queued instructions or every newly received instruction to said plurality of data processing devices until said detected difference exceeds said prescribed limit.

3. A data processing control system comprising a controller for receiving an instruction directing a data processing operation, and for causing said received instruction to be executed across a plurality of data processing devices, wherein said controller (1) detects a difference in execution end timing of said instruction between designated two of said plurality of data processing devices across which said instruction is executed, (2) sends every received instruction to said plurality of data processing devices until the number of instructions being executed or waiting to be executed by said plurality of data processing devices reaches a predetermined number, (3) does not send any received instructions to said plurality of data processing devices but holds said received instructions in a queue once the number of instructions being executed or waiting to be executed by said plurality of data processing devices has reached said predetermined number, and (4) when the number of instructions being executed or waiting to be executed by said plurality of data processing devices has become zero by completing the execution thereof, starts sending said queued instructions in sequence to said plurality of data processing devices, and continues to send said queued instructions or every newly received instruction to said plurality of data processing devices until the number of instructions being executed or waiting to be executed by said plurality of data processing devices reaches said predetermined number, and wherein said predetermined number is varied according to said detected difference.

4. A data processing control system according to any one of claims 1 to 3, wherein said data processing operation is a data read or data write operation.

5. A data processing control system according to claim 4, wherein said data processing operation is a data write operation for writing data containing redundant data which is used to restore data based on successfully readout data when data cannot be read correctly on any one of said plurality of data processing devices.

6. A data processing control system according to claim 4, wherein said data processing operation is a data read operation for reading data containing redundant data which is used to restore data based on successfully readout data when data cannot be read correctly on any one of said plurality of data processing devices.

7. A data processing control system according to claim 4, wherein said data processing operation is a data write operation for writing data redundantly so that data can be restored in case data cannot be read correctly on any one of said plurality of data processing devices, and wherein said plurality of data processing devices are arranged in two or more pairs for writing data redundantly.

8. A data processing control system according to claim 2, wherein when said difference is detected again, and the number of said queued or newly received instructions issued until said detected difference exceeds said prescribed limit becomes smaller than a predetermined threshold value, said controller determines that a data access delay error has occurred on one of said plurality of data processing devices.

9. A data processing control system according to claim 3, wherein when said predetermined number which is varied according to said detected difference becomes smaller than a predetermined threshold value, said controller determines that a data access delay error has occurred on one of said plurality of data processing devices.

10. A controller for receiving an instruction directing a data processing operation, and for causing said received instruction to be executed across a plurality of data processing devices, wherein said controller (1) sends every received instruction to said plurality of data processing devices until the number of instructions being executed or waiting to be executed by said plurality of data processing devices reaches a predetermined number, (2) does not send any received instructions to said plurality of data processing devices but holds said received instructions in a queue once the number of instructions being executed or waiting to be executed by said plurality of data processing devices has reached said predetermined number, and (3) when the number of instructions being executed or waiting to be executed by said plurality of data processing devices has become zero by completing the execution thereof, starts sending said queued instructions in sequence to said plurality of data processing devices, and continues to send said queued instructions or every newly received instruction to said plurality of data processing devices until the number of instructions being executed or waiting to be executed by said plurality of data processing devices reaches said predetermined number.

11. A controller for receiving an instruction directing a data processing operation, and for causing said received instruction to be executed across a plurality of data processing devices, wherein said controller (1) detects a difference in execution end timing of said instruction between designated two of said plurality of data processing devices across which said instruction is executed, (2) sends every received instruction to said plurality of data processing devices until said detected difference exceeds a prescribed limit, (3) does not send any received instructions to said plurality of data processing devices but holds said received instructions in a queue once said difference has exceeded said prescribed limit, (4) starts sending said queued instructions in sequence to said plurality of data processing devices when the number of instructions being executed or waiting to be executed by said plurality of data processing devices has become zero by completing the execution thereof, and (5) detects said difference again and continues to send said queued instructions or every newly received instruction to said plurality of data processing devices until said detected difference exceeds said prescribed limit.

12. A controller for receiving an instruction directing a data processing operation, and for causing said received instruction to be executed across a plurality of data processing devices, wherein said controller (1) detects a difference in execution end timing of said instruction between designated two of said plurality of data processing devices across which said instruction is executed, (2) sends every received instruction to said plurality of data processing devices until the number of instructions being executed or waiting to be executed by said plurality of data processing devices reaches a predetermined number, (3) does not send any received instructions to said plurality of data processing devices but holds said received instructions in a queue once the number of instructions being executed or waiting to be executed by said plurality of data processing devices has reached said predetermined number, and (4) when the number of instructions being executed or waiting to be executed by said plurality of data processing devices has become zero by completing the execution thereof, starts sending said queued instructions in sequence to said plurality of data processing devices, and continues to send said queued instructions or every newly received instruction to said plurality of data processing devices until the number of instructions being executed or waiting to be executed by said plurality of data processing devices reaches said predetermined number, and wherein said predetermined number is varied according to said detected difference.

13. A data processing control method for receiving an instruction directing a data processing operation, and for causing said received instruction to be executed across a plurality of data processing devices, comprising the steps of:

sending every received instruction to said plurality of data processing devices until the number of instructions being executed or waiting to be executed by said plurality of data processing devices reaches a predetermined number;

not sending any received instructions to said plurality of data processing devices but holding said received instructions in a queue once the number of instructions being executed or waiting to be executed by said plurality of data processing devices has reached said predetermined number; and starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number.

14. A data processing control method for receiving an instruction directing a data processing operations and for causing said received instruction to be executed across a plurality of data processing devices, comprising the steps of:

detecting a difference in execution end timing of said instruction between designated two of said plurality of data processing devices across which said instruction is executed;

sending every received instruction to said plurality of data processing devices until said detected difference exceeds a prescribed limit;

not sending any received instructions to said plurality of data processing devices but holding said received instructions in a queue once said difference has exceeded said prescribed limit;

starting sending said queued instructions in sequence to said plurality of data processing devices when the number of instructions being executed or waiting to be executed by said plurality of data processing devices has become zero by completing the execution thereof; and detecting said difference again and continuing to send said queued instructions or every newly received instruction to said plurality of data processing devices until said detected difference exceeds said prescribed limit.

15. A data processing control method for receiving an instruction directing a data processing operation, and for causing said received instruction to be executed across a plurality of data processing devices, comprising the steps of:

detecting a difference in execution end timing of said instruction between designated two of said plurality of data processing devices across which said instruction is executed;

sending every received instruction to said plurality of data processing devices until the number of instructions being executed or waiting to be executed by said plurality of data processing devices reaches a predetermined number;

not sending any received instructions to said plurality of data processing devices but holding said received instructions in a queue once the number of instructions being executed or waiting to be executed by said plurality of data processing devices has reached said predetermined number;

starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number; and varying said predetermined number according to said detected difference.

16. A program for causing a computer in the data processing control method of claim 13 to carry out all or part of the steps of: sending every received instruction to said plurality of data processing devices until the number of instructions being executed or waiting to be executed by said plurality of data processing devices reaches a predetermined number; not sending any received instructions to said plurality of data processing devices but holding said received instructions in a queue once the number of instructions being executed or waiting to be executed by said plurality of data processing devices has reached said predetermined number; and starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number.

17. A program for causing a computer in the data processing control method of claim 14 to carry out all or part of the steps of: detecting a difference in execution end timing of said instruction between designated two of said plurality of data processing devices across which said instruction is executed; sending every received instruction to said plurality of data processing devices until said detected difference exceeds a prescribed limit; not sending any received instructions to said plurality of data processing devices but holding said received instructions in a queue once said difference has exceeded said prescribed limit; starting sending said queued instructions in sequence to said plurality of data processing devices when the number of instructions being executed or waiting to be executed by said plurality of data processing devices has become zero by completing the execution thereof; and detecting said difference again and continuing to send said queued instructions or every newly received instruction to said plurality of data processing devices until said detected difference exceeds said prescribed limit.

18. A program for causing a computer in the data processing control method of claim 15 to carry out all or part of the steps of: detecting a difference in execution end timing of said instruction between designated two of said plurality of data processing devices across which said instruction is executed; sending every received instruction to said plurality of data processing devices until the number of instructions being executed or waiting to be executed by said plurality of data processing devices reaches a predetermined number; not sending any received instructions to said plurality of data processing devices but holding said received instructions in a queue once the number of instructions being executed or waiting to be executed by said plurality of data processing devices has reached said predetermined number; starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number; and varying said predetermined number according to said detected difference.

19. A computer readable medium having a program recorded thereon for causing a computer in the data processing control method of claim 13 to carry out all or part of the steps of: sending every received instruction to said plurality of data processing devices until the number of instructions being executed or waiting to be executed by said plurality of data processing devices reaches a predetermined number; not sending any received instructions to said plurality of data processing devices but holding said received instructions in a queue once the number of instructions being executed or waiting to be executed by said plurality of data processing devices has reached said predetermined number; and starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number.

20. A computer readable medium having a program recorded thereon for causing a computer in the data processing control method of claim 14 to carry out all or part of the steps of:

detecting a difference in execution end timing of said instruction between designated two of said plurality of data processing devices across which said instruction is executed;

sending every received instruction to said plurality of data processing devices until said detected difference exceeds a prescribed limit; not sending any received instructions to said plurality of data processing devices but holding said received instructions in a queue once said difference has exceeded said prescribed limit; starting sending said queued instructions in sequence to said plurality of data processing devices when the number of instructions being executed or waiting to be executed by said plurality of data processing devices has become zero by completing the execution thereof; and detecting said difference again and continuing to send said queued instructions or every newly received instruction to said plurality of data processing devices until said detected difference exceeds said prescribed limit.

21. A computer readable medium having a program recorded thereon for causing a computer in the data processing control method of claim 15 to carry out all or part of the steps of:

detecting a difference in execution end timing of said instruction between designated two of said plurality of data processing devices across which said instruction is executed;

sending every received instruction to said plurality of data processing devices until the number of instructions being executed or waiting to be executed by said plurality of data processing devices reaches a predetermined number; not sending any received instructions to said plurality of data processing devices but holding said received instructions in a queue once the number of instructions being executed or waiting to be executed by said plurality of data processing devices has reached said predetermined number; starting sending said queued instructions in sequence to said plurality of data processing devices when the number of instructions being executed or waiting to be executed by said plurality of data processing devices has become zero by completing the execution thereof, and continuing to send said queued instructions or every newly received instruction to said plurality of data processing devices until the number of instructions being executed or waiting to be executed by said plurality of data processing devices reaches said predetermined number; and varying said predetermined number according to said detected difference.

\* \* \* \* \*